(12) United States Patent
Jobin

(10) Patent No.: US 11,250,445 B2
(45) Date of Patent: Feb. 15, 2022

(54) METHOD AND SYSTEM FOR DEVELOPING AND EVALUATING AND MARKETING PRODUCTS THROUGH USE OF INTELLECTUAL CAPITAL DERIVATIVE RIGHTS

(76) Inventor: Bernard Jobin, Saint-Lazare (CA)

( * ) Notice: Subject to any disclaimer, the term of this patent is extended or adjusted under 35 U.S.C. 154(b) by 2255 days.

(21) Appl. No.: 12/523,427

(22) PCT Filed: Dec. 21, 2007

(86) PCT No.: PCT/CA2007/002319
§ 371 (c)(1),
(2), (4) Date: Jul. 16, 2009

(87) PCT Pub. No.: WO2008/086594
PCT Pub. Date: Jul. 24, 2008

(65) Prior Publication Data
US 2010/0114664 A1    May 6, 2010

(30) Foreign Application Priority Data
Jan. 16, 2017 (CA) ..................... 2575063

(51) Int. Cl.
*G06Q 30/02* (2012.01)
*G06Q 30/06* (2012.01)
*G06Q 50/18* (2012.01)
*G06Q 10/06* (2012.01)

(52) U.S. Cl.
CPC ............. *G06Q 30/02* (2013.01); *G06Q 10/06* (2013.01); *G06Q 30/0201* (2013.01); *G06Q 30/0601* (2013.01); *G06Q 50/184* (2013.01)

(58) Field of Classification Search
None
See application file for complete search history.

(56) References Cited

U.S. PATENT DOCUMENTS

2004/0186738 A1 *  9/2004  Reisman ......................... 705/1

* cited by examiner

Primary Examiner — John Van Bramer

(57) ABSTRACT

Method and system for developing and marketing valuable products, advertisements and other new or improved realizations. Independent remote participants contribute to the creation of data and instructions for output devices. The technical feasibility of combining open and potentially conflicting individual contributions is enabled through the method and system determining input data compromises while participants are taking stakes in a potential resulting value of their input contribution through rights. By creating and using databases of complementary or mutually exclusive intellectual capital items, a promoter asks participants to collaborate on common desired outcomes. Participants submit new, select, move or rate alternative items. Using valuation criteria, these new or amended collective input items are compiled and reassembled, with potentially other related information stored in the database, to prepare and feed output data and instructions to output devices. Participants are communicated the compilation results and potentially compensated by selling their rights.

30 Claims, 16 Drawing Sheets from 610

615

PROMOTER creates Potential Contribution Rights and Entitlement Options based on the promotional campaign objectives and constraints

CAMPAIGN SCHEDULE
- The promotional campaign will last 12 months and consist of two 6 months periods;
- CONTRIBUTORs will be invited to submit their contributions in the first 6 months;
- First period results will be compiled after 6 months;
- First period potential compensations can be claimed during the second 6 month period;
- CONTRIBUTORs will be invited to submit new contributions in the second 6 month period;
- Second period results will be compiled at the end of the second period;
- Second period potential compensations can be claimed during the 6 months following the end of the second period;

**POTENTIAL COMPENSATION RIGHTS - *FIRST PERIOD* (Derivative Rights) :**
emission date : 0 to 6 months after the beginning of the campaign
expiry date : 12 month after the beginning of the campaign
open market trading : no
acquisition price : USD 0.00 (*SPONSOR* Credit of USD 10.00 or USD 50.00 rebate)
limitations / restrictions : nominative (one Potential Compensation Right per *CONTRIBUTOR*)
- ***FRANCHISEE* Right License Option**
  - option description : when granted, a Conditional Derivative Right can be exercised using the *FRANCHISEE* License Option and gives its owner a limited license to use and repeat the present promotion process, during the second period of the promotional campaign, and to collect 50% of the Promoter fees
  - grant condition : right is granted and can be exercised only if the the single most popular selection branches of alternative intellectual capital items were chosen in the contibution: a set of branches selected from the possible selection tree represents a unique tree subset
  - minimum exercise value : n/a
  - maximum exercise value : n/a
  - exercise value calculation method :n/a
- *Monetary Compensation Option:* *monetary buyback value*
  - option description : when granted, a Derivative Right can be exercised using this Monetary Compensation Option and gives its owner a share of the total Sponsorship Monetary Credits allocated to the promotion content evaluation instead of acquiring any *FRANCHISEE* License to the promotion content
  - grant condition : right is granted and can be exercised only if the single most popular selection branches of alternative intellectual capital items were chosen in the contibution: a set of branches selected from the possible selection tree represents a unique tree subset
  - total Sponsorship Monetary Credits : based on pure Sponsorship funding and calculated by multiplying the number of *CONTRIBUTORs* by a "per participant" *SPONSOR* subsidy (see *SPONSOR* Credit)
  - minimum exercise value : USD 10.00
  - maximum exercise value : n/a
  - buyback value : calculated by dividing the total Sponsorship Monetary Credits by the number of insightful *CONTRIBUTORs* (according to the above condition criteria), after retreiving 10% to cover the *PROMOTER* fees

(Continuation in next step)

METHOD AND SYSTEM FOR DEVELOPING AND EVALUATING AND MARKETING PRODUCTS THROUGH USE OF INTELLECTUAL CAPITAL DERIVATIVE RIGHTS

FIELD OF THE INVENTION

The present invention relates generally to the development, management, evaluation and distribution of products and related intellectual properties represented in any media including broadcast and interactive video or animation, print and audio as well as in any sensory format such as vision, hearing, smell, touch and taste, more specifically, to methods and systems for developing and managing products and product value by involving individuals and organizations in their collective development and in the ownership of entitlements to related intellectual capital.

BACKGROUND OF THE INVENTION

Domain

Organizations and businesses are created because they can offer products and services to markets demanding such products and services. However, organizations can only survive if they are financially sustainable or profitable. Therefore, they must always ensure that their offerings remain in demand and that the costs of developing and selling their products or services do not exceed the price that the market is willing to pay.

Consequently, the critical elements to a sustainable organization is its product development and marketing activities based on valuable knowledge, know how, trade secrets, inventions, patents, trademarks, copyrights, etc. Otherwise said, an organization's success relies on its capability to maintain up to date and valuable intellectual capital to develop markets, products or services.

Need

In the 1950s and 1960s, the number of organizations and more specifically, their business production capabilities were limited. Marketing was developed as a business function to persuade customers to buy what businesses and industries wished to produce and sell. With the rise of disposable income and the introduction of new communication media such as TV broadcasting, product demand increased. The economics of this "production-driven era" relied on the principle of market share acquisition as it was shown to be directly linked to sales and profitability. To grow their market share given the limited product availability, businesses mainly needed to get customers' attention and raise customers' awareness of their products and services. Businesses invested their promotional budgets and efforts in mass media such as radio, television, outdoor advertising and prints. This access to "eyeballs" was providing them large and rapidly growing customer bases. By continuously associating emotional messages with "catchy" product names and logos, people started to recognize and identify certain Brands. Branding was born and the use of mass media lead to such amazing brand awareness that some major brand names became synonymous to product categories.

In that production-driven era, organizations relied on the intellectual capital behind their production capabilities to develop exclusive products or services. They also developed intellectual capital about markets by conducting research on market demographics. That knowledge was used to create brand messages and adapt them to target markets within the mass media audience.

As demand kept growing even further, businesses were responding by simply expanding their production capabilities. However, the economic downturn of the 1970s had a major impact on customers who revised their spending habits. Affected by a more intelligent customer audience and reduced customer spending, products and markets were maturing faster. The answer to this situation from industries and businesses was to re-evaluate their target markets and accordingly their products' appeal. This led to more product differentiations. It also prompted an increased focus on added value such as product related services. The new emphasis was on customer retention. In fact, customer loyalty was then shown to be linked to improved profitability. The pursuit of market shares morphed into the pursuit of shares of customers' disposable income. Businesses increased their attention on existing customers by shifting from a transaction marketing to a relationship marketing or in other words, to a customer-influenced Marketing. The new strategy was relying on long term repeat sales. This approach was supported by the fact that better knowledge of market needs and expectations leads to more adapted and in-demand product and service offerings.

This new emphasis on relationships provided a way for businesses to deepen their understanding and to increase their intellectual capital related to target markets. Their intellectual capital on products and services also expanded as businesses were required to keep developing new and differentiated offerings.

Today, with the growth in technological innovations, notably with powerful personal computers and servers and all kinds of output or production devices, the Internet and mobile communications, individuals and businesses are benefiting from an incredible capability to explore, discover, research, learn, educate and exchange with each other. Technologies have opened the door to pools of creation resources from practically anywhere on the globe.

In this abundant product environment, product developers are now in a constant competition to introduce differentiating, but often relatively trivial product features. Due to that growing competition, many companies feel pressured to quickly deliver simple product improvements and consequently assume a commodity status that conveniently limits their potential risk exposure from more balanced innovation spending.

New enabling technologies have also triggered an outburst in new product information and a multiplication of the media channels available to distribute that information. Today, there is an over-abundance of information and media channels. Media channels too are pressured to differentiate themselves by specializing and presenting distinct offerings. This in turn further contributes to the proliferation of more differentiated information and media content. As a result, businesses are witnessing an increased customer fragmentation: each fragment representing a distinct characteristic in customer preferences. It is getting much harder to reach broad customer groups and to identify valuable market segments.

This over-abundance of information and media channels forces businesses to spend a significant portion of their efforts into market research and related techniques to find the best time and place to broadcast brand messages. Message placement is becoming as critical as the message itself. As a result, marketing has become a competition to reach customers and to position differentiating messages. This happens while the diverse media channels used to reach these customers are not only more numerous but they have become more interactive, more on demand and less dependent on the timing of events. As a result, interactivity is further taking away the control that marketing used to have on where and when customers would be reached.

Consequently, businesses are now heavily investing in sophisticated marketing technologies. For example, tracking users clicks on the Internet gives knowledge about the habits, demographics and current buying decision stage of potential customers. Such capability allows advertisers to design and send targeted and timely messages. Interactive and targeted marketing are seen as today's solution to reach the masses at the individual level and to aggregate customers into markets that are nonetheless, still broken up and highly heterogeneous.

Since businesses constantly need to resynchronize their market and product knowledge in this new reality, interactive technologies have become the preferred marketing tools to acquire that essential intellectual capital. The significant shift in advertising budgets towards the Internet clearly demonstrates that trend. Customer and market information are constantly added and updated in databases while complex computer programs are trying to find correlations in order to predict customers' expectations and buying behaviors.

In parallel, with the help of interactive technologies, the interconnected world has become an open meeting place. The nature of open environments is to be free of controlling agents who collect fees for using their products or services. They allow rich exchanges on any subject matter without the traditional constraints from gate keepers. In this open environment, it is now possible for small businesses, independent players and even customers to create products and services adapted to their wants and needs. This is a major change compared to traditional commercial offerings mainly developed around business capabilities and their own agendas.

Some of these open meeting places are called virtual communities. They are composed of people linked by hobbies, value systems or by a need to fix or improve perceived product or service deficiencies. From a marketing perspective, theses groups can be micro-segmented in a multitude of ways. But as technologies are increasing interactions between individuals and communities, individuals are becoming more knowledgeable and sophisticated customers. Customer needs and the rational behind their choices are continuously evolving. Therefore, the information about customers preferences and behaviors is also constantly changing. Similarly, individual profiles and market segments are constantly evolving with changing contexts resulting from that increasing level of knowledge and interest customers have in given subject matters.

Virtual communities can have a real influence on markets. They are actively participating in background exchanges about products and services and sometimes in official business exchanges. Using their knowledge and even the expertise they acquired through such virtual communities, customers have evolved from being passive buyers of product and services to being skilled contributors. Open environments and virtual communities are a major source of intellectual capital where knowledge keeps growing and evolving independently of controlling organizations or businesses.

In these open environments, the protection of knowledge and more specifically, of intellectual property, is left out to the participating individuals. This is a major difference from the traditional world where the protection of intellectual property is usually linked to the control of the supporting medium. Therefore, it is becoming impossible in these open environments to effectively monitor and sanctions millions of potentially contravening individuals.

Shortcoming

With all these changes happening in markets, organizations and businesses must still find ways to operate efficiently in order to remain sustainable and profitable. To guide them, they rely on marketing's analysis of markets, selection and development of products and services and promotions and sales. However, there is a growing and documented evidence that executives in organizations do not perceive that marketing is delivering and picking up the right signals. This is happening on two fronts:

Firstly, one of the expressed concerns is the lack of alignment between marketing and business objectives. For example, executives are complaining that marketing's focus, including its product development activities, is too tactical and disconnected from the CEO's agenda. Marketing is a cost center that does not support its expenditure with business results such as Return On Investment, net income, stock price, cash flow, etc.

Secondly, marketing must address its deficiencies in effectively measuring the outcome of its initiatives. As noted, most companies can't measure the Return On Investment related to marketing campaigns. Even when the results of marketing campaigns are measured, they are most often questionable. Moreover, it is often impossible for marketing to convert acquired customer information into customer insights.

Marketing's lack of capability to clearly equate marketing initiatives to business objectives makes it the most probable target of cost cutting and productivity improvement measures. As a cost center, marketing is in an increasingly weak position since it can't demonstrate its value and accountability within organizations. It is also why Chief Marketing Officers are rare, often don't report to the top executives and have restricted mandates. In fact, conflicts between business imperatives and product imperatives often clash even though the constantly evolving markets should push marketing activities to increasingly become the real driving force behind the sustainability and profitability of organizations and businesses.

To improve its alignment with business objectives, marketing must implement strategies that aim at increasing market shares and customer retention over time. However, the need for immediate operating revenues and the pressure from shareholders to constantly show positive results and growth, hamper long term strategies. As a result, to address business imperatives in this changing world, marketing is forced to merely keep improving the productivity of its initiatives by minimizing risks and using more process automation.

Given the growing market fragmentation and abundance of products, marketing increasingly relies on complex technological tools to support immediate sales requirements. These tools combined with the acquisition and use of intellectual capital related to customers, products and services are the basis of a database marketing. While one of the stated objectives of this database marketing is to establish better relationships with customers, it is mainly a technological approach that converts customer interactions back into transactions. It relies on customer information to make targeted messages and to deliver them at the right time using the most appropriate medium and not to quickly adapt or improve products.

Database marketing prefers to assume that customer relationships can still be managed like passive broadcast television. In markets that are increasingly fragmented, database marketing is used to re-aggregate customer profiles. This aggregation tries to identify mass markets out of individuals by engaging them, one at a time, into thousands of voices and ears searching for the same thing. In other words, it presumes that it is possible to effectively segregate individual customers and regroup them into market segments adapted to their profiles. However, in today's abundant world, customer preferences are continuously evolving and the traditional use of static demographic and psychographic segmentations has to be revised.

To deploy these complex database technologies, more tools and resources are required. The result is growing costs yielding immediate but progressively fading benefits. Moreover, marketing has to face the fact that it cannot keep track of continuously changing customer profiles and market segments. In the interconnected world, customers endlessly re-organize around temporary and evolving interests. Trying to understand and manage this complexity and diversity is a gigantic and costly task. Minute changes in the initial assumptions of a marketing strategy can lead to outcomes that are nowhere close to predictions. Real time information and so many factors can contribute to increasingly chaotic results. Trying to predict market behaviors can only be effective within short term perspectives, if at all.

Given the continuously evolving nature of our open world, organizations using marketing systems mostly based on databases and predictive tools would face infinitely rising costs, efforts and complexity that would ultimately become impossible to sustain.

However, organizations favor database marketing and prediction tools since they give them a sense of control over their products and markets, and more specifically over their destiny. In the same way, they don't want customers to be too involved in the direct assessment and expression of their own needs. From a business perspective, there are limits to what customers can say or do. Marketing wants to minimize the risks of having customers expressing needs that cannot be fulfilled by the organization.

It is known that customers make choices according to perceived differences between options and not based on the expected value of products and services. Therefore, while remaining in control of its products, services and internal costs, marketing must display differences from other offerings. To do so, marketing relies on the development of incremental improvements and differentiating features. It also greatly relies on branding to create the perception that the differences of their products or services will deliver the benefits expected from their customers.

Because that approach depends on controlling the options presented to customers instead of asking them for their real opinions, it creates a disconnect from customer expectations and further aggravates a commoditization trend that impedes on pure innovations and long term benefits. Not surprisingly, there is documented evidence that the concept of business growth from innovations instead of from pure productivity initiatives is still new for many incumbent businesses. Yet marketing is supposed to be the source of the innovation and creativity needed in a world where the cost and impact of switching from one product to another has become so low. Marketing needs to foster the innovation that can trigger long term customer retention and business profitability.

Interestingly, after re-aggregating customers into bigger market segments, database marketing habitually reverts to one-way promotional approaches such as broadcasted TV like commercials. Despite the omnipresence of interactivity, marketing still relies on the attention-awareness model that prevailed when promotions were mostly made through unidirectional mass media.

By creating and timely communicating emotional messages, marketing hopes to create the necessary product awareness in customers' mind to trigger buying actions. The aim is to sell by creating the expectation that real or intangible benefits can be provided when buying the proposed products or services. However, marketing relies on emotional stories that increasingly don't resonate well with customers who also expect long term value and honesty when making their buying decisions.

In fact, attention-awareness-emotion approaches are not sufficient to trigger customer actions anymore. This worked at a time when the number of media, the diversity of information and the number of customer options were limited. However today, creating awareness of products has limited buying influence. The use of these timely messages, based on predictions of buying behaviors, can somewhat improve the effectiveness of the awareness factor but today's interconnected customers ultimately make choices by considering many other variables. Based on personal motivations, each customer can now develop his own knowledge about products and services. For customers, open access to information is very valuable. It gives them an opportunity to compare alternative and potentially contradictory facts that in turn improve their chances of choosing more valuable products or services.

In fact today, the awareness factor is being replaced by a knowledge factor. Unless it succeeds to control all sources of information, marketing will not control knowledge. Similarly, marketing cannot develop lasting customer relationships if these relationships can only tolerate information pertaining to its own organization, products or services.

Most marketing methods rely on acquiring, owning and using meaningful knowledge about markets and products. This intellectual capital is perceived as a source of market control and competitive edge. The craving that organizations have to control intellectual capital will only get stronger in an economy where ideas and creativity increasingly become the real value behind products and services.

However, today's open environments, virtual communities and more specifically consumers communities are all about the lack of control marketers can have on them. Their strengths comes from their knowledge gained through the shared experiences customers have with products and services. Open environments are disruptive for organizations because they give customers the opportunity to influence and determine market evolutions. They are the opposite of proprietary technologies with protected intellectual capital that so far gave organizations control over their markets.

Markets are not only made of customers anymore. Businesses and markets are in fact merging. Customers are sophisticated, knowledgeable, skilled and can themselves act like full fledge organizations. Therefore, from a marketing perspective, trying to manage markets as isolated and controlled groups of customers is impractical. Marketing cannot keep believing that it is just an outside observer looking into a market "box" without disrupting it. Marketing is an integral part of the market ecosystem and its moves and actions are being watched. Similarly, customers are an integral part of that market ecosystem and their moves and actions should not only be studied but also followed.

While customers have become very conscious of the inconsistencies between their needs and marketing stratagems, marketing still persists to believe in the effectiveness of its market predictions and in its definite capability to influence customers. Such disconnected operational, marketing and customer perspectives result in a marketing model that increasingly demonstrates two confronting beliefs: A growing organization's need for increased market control through the acquisition and use of protected intellectual capital versus an open market's growing sense of authority and ability to redefine and decide what represent valuable intellectual capital.

There is an abundance of literature pointing to the importance for organizations to shift their focus from pure control and management tactics to a customer dialogue and collaboration attitude. There is a need for a realignment of business operations, including product creation, towards a more balanced mix of control and openness.

Addressed Issues

While organizations and businesses are blaming everything on marketing and its lack of alignment with business imperatives, those same imperatives are closely linked to, and are responsible for the denunciated situation. By being expected to contribute to short term imperatives as well as to the long term sustainability and profitability of organizations, marketing faces many struggles. It cannot effectively provide the expected tight operational control while also being made responsible in the long run to manage open and increasingly changing markets. The increasing use of complex and costly technologies to enable some level of operational measurement and control further entrenches marketing in its position as a cost center. The focus on customer aggregation endorses a traditional one-way attention-awareness-emotion approach that ignores the new dynamic nature of markets and the rich exchanges customers have in an open interconnected world. The hope of being able to predict and control customer behaviors is neglecting the fact that customers are increasingly sophisticated and that such marketing controlling tactics are themselves influencing customer behaviors and reactions. It also neglects the tremendous or even impossible challenge of effectively predicting behaviors while managing constantly changing customer profiles.

The efforts to keep control and ownership of the technological and production means, media channels, information and intellectual capital related to markets, products and services further weaken the trust markets have in organizations that are still, in parallel, displaying mission statements about their customer care and priority. In open environments, such efforts to establish tight control are often countered with further disloyalty, disregards towards rules and disrespect of tangible and intellectual property ownerships. By trying to improve its management of markets while minimizing product development risks, marketing uses controlling approaches that hinder innovation. The result is a lack of adequate products and services with growing negative reactions and disconnects from these markets. Furthermore, this disconnect from markets and the lack of innovation contribute to the growing perception of a widening gap between what customers expect from organizations and what organizations can really deliver.

There are methods and systems that are trying to address some of the above issues. They are efforts to improve traditional marketing mostly limited to the advertising and entertainment fields and to some other specific media. For example, a system for rewarding viewers of interactive commercial advertisement is disclosed in U.S. Pat. No. 6,529,878 B2 issued to De Rafael et al. A user connects to a computer system, sets up an account and selects one of the offered advertisements. After viewing the advertisement, the user is asked a set of questions based on the advertised message and on her cumulated profile information. The potential benefit for an advertiser is the improved understanding of customer demographics and of the effectiveness of its advertisements. In exchange for her effort, the user is rewarded with points that she can redeemed in cash, in purchase certificate or by becoming eligible to draws. That system basically uses an attention-awareness-emotion marketing approach. It offers rewards as an incentive to attract a customer's attention, to make her aware of a product or service and to get her actively involved and therefore emotionally tied to the advertisement. The system also provides information such as demographics, customer exposure and customer reactions that will subsequently be used to measure the effectiveness of marketing initiatives. However, the system does not ensure that the customer cares about the advertisement and that she provides truthful answers since the reward is linked to the participant's action, independently of the accuracy or value of that participation. As a result, there is an appreciable element of risk when using such a system to derive accurate measurements of the effectiveness of an advertisement campaign. For the same reason, the systems is not sufficient to establish safe marketing initiatives. Moreover, there is a need to find an advertiser willing to invest or fund the production, use and broadcast of such advertisements.

Other related products are tools for trading copyrighted materials, designing advertisements, rewarding users of incentive programs, or creating purchase or play incentives. One such method and apparatus for generating purchase incentives based on price differential is disclosed in Canadian Patent No CA 2279236 issued to Giuliany, Vandevelde and Alatraqchi. However, the method and apparatus refer mainly to the use of existing relative price differences between competing items. It does not get the customer to actively participate in the item valuation process or to contribute to the development of valuable and saleable results such as new products and offerings.

Other related products are tools for trading copyrighted materials, designing advertisements, rewarding users of incentive programs, or creating purchase or play incentives. One such method and apparatus for generating purchase incentives based on price differential is disclosed in Canadian Patent No CA 2279236 issued to Giuliany, Vandevelde and Alatraqchi. However, the method and apparatus refer mainly to the use of existing relative price differences between competing items. It does not get the customer to actively participate in the item valuation process or to contribute to the development of valuable and saleable results.

Other promotion and advertising methods use remuneration to support content creation or funding initiatives. Other methods include financial contribution to support traditional content and intellectual property development and marketing. One such assured archival and retrieval system for digital intellectual property is disclosed in Canadian Patent Application No CA 2479755 requested by Zee and in corresponding U.S. Patent Application No. 20030065642 requested by Zee. This method aims at funding the permanent digital archival of intellectual property of any kind. While it also facilitates the protection of intellectual property rights through the use of centralized intellectual property right management features, it is not primarily designed for value creation or to provide related incentives to all participants or content audiences. This method and others do not offer a built-in mechanism to give participants the opportunity to collectively be in charge of evaluating what is offered to them while rewarding them according to the level of potential value of their collective contributions. They do not have a built-in capability to attract and select genuinely interested and valuable participants, to use collective thoughts and insights on what represent valuable product information and intellectual properties, to simultaneously develop and market products based on those intellectual properties and insights while simultaneously measuring a potential commercial market value of products and of the related intellectual capital or to creating an implicit incentive to protect intellectual property ownerships and rights. They do not either offer a built-in mechanism to end-up developing new or improved output products and services, including advertisements, that can be offered or sold to businesses and markets. They are not integrated methods and systems that can identify markets or fund and support marketing initiatives while simultaneously diagnosing the health of those same initiatives.

Given the clash between the expectations that organizations have of marketing and of its role to support sustainable and profitable organizations, there is a need for innovative organizations to provide marketing and product development activities with viable method and system to maneuver outside of the current business constraints. Big organizations with their use of traditional methods and systems are all experiencing, at different scales, the break down of their often long lasting business models. While still being widely used, their approach of increasingly doing more of the same only deepens their problem and postpone the inevitable need for solutions. It is desirable to have method and system that can enable marketing to efficiently focus on its most valuable asset: its intellectual capital about products, services and markets. It would be beneficial if marketing could explore consolidate through a system all customer insights related to their product initiatives and strategies instead of reverting to pre-cooked offerings and development approaches. It is necessary that organizations have a way to reconcile the rapid evolution of markets' expectations and reactions with their need to control their operations and finances.

Finally, it would be essential for evolutional method and system to be able to support the upcoming imagination society that is predicted to become the new source of sustainability and profitability in the future economy. This means that a use of method and system based on intellectual capital would require to be commercially useful and financially sound while remaining flexible and adaptable to changing and open environments. This could be possible by using a mechanism supporting ongoing collaborative sponsorship of pure and valuable product innovations including their prototyping, market trials or production capabilities.

These problems and issues are felt in the art and abundantly documented and the present invention brings a solution in the manner described below.

SUMMARY OF THE INVENTION

Method Overview

The present invention improves over the prior art and solves the above problems by providing a compelling and comprehensive way to collectively develop, manage and market products and product improvements. It provides for a new method and system that also offers potential compensation rights and entitlement options to participants and contributors in exchange for their involvement in the collaborative development and valuation of products and related intellectual capital. This innovative cooperation and interaction between contributors, products features, product development, collaborative contributions and potential ownerships and entitlements for participants creates a new and appealing incentive that ensures valuable results. With the present invention, it is possible to get worthy input and commitment from participants since the future value of their entitlements is related to a commercial value for their contributions. Anyone who desires to contribute to the advancement of societies, regardless of culture or language, should get to benefit from the present invention.

The present invention enables the constant and predictable development of new products and services as commanded by today's constantly evolving markets of knowledgeable and skillful customers. The present invention is not a lottery, a popularity contest, a trivia game, an interactive forum or just another co-creation project or a project funding exercise. It does not reward participants or make them eligible to rewards simply based on their participation or merely give them more or less rewards depending on their level of participation. The present invention is a predictive development and marketing method and system based on collective knowledge, beliefs, insights value, intellectual property rights and other entitlement ownership incentives. The reproducible results of the use of the present invention are the inevitable identification and development of product innovation and value, especially in changing markets and environments. The present invention gives individuals, organizations or businesses a new tool to commission or receive proposals and instructions for the development and marketing of products and services, product and service features, advertisements, games and other valuable or creative realizations. The present invention relies on participants such as experts, communities, customers and any other relevant organization, business or individual to contribute to, and to take stakes in these realizations. These realizations are based on the use of intellectual capital items inputted or contained in a dynamic and potentially open database. A promoter requests participants to contribute to the development of desired product outcomes by using their knowledge and insights and by proposing, evaluating or rating alternative options or by making a selection from the proposed sets of alternatives. Independent remote participants contribute to the creation of data and instructions for output devices. These new or amended alternatives serve as collective input focusing on realizing proposed common desired product outcomes. Compilations, based on participants' complementary or conflicting contributions, are prepared by sorting, filtering and/or reassembling alternatives using popularity, distinctiveness or any other chosen valuation criteria or contribution related instructions. The technical feasibility of combining multiple open and potentially conflicting individual input contributions is enabled through the present invention by determining input and output data and instructions compromises. The resulting compilations constitute new items that are added to the intellectual capital database and output data and instructions that are fed to output devices. In parallel, the intellectual capital involved in the process acquires a traded or commercial value that results from the preexisting value of each intellectual capital item, from their collective valuation through contributions made by all participants and from the compilation process. In exchange for their participation, contributors are offered potential compensation rights consisting of derivative rights with entitlement options related to their evaluation of intellectual capital in their contributions. Contributors are compensated when their contributions rank as relatively insightful by timely exercising or selling their granted compensation rights (also called granted rights).

System Overview

A database that can consist of a standalone database or of a network of computer databases, includes intellectual capital items or links to them. Whenever the method and system of the present invention refers to the use of intellectual capital, it refers to concepts and ideas, including intellectual properties, and of any other marketable or saleable intangibles that can be represented or embodied or produced as marketable or saleable products or product improvements by using any appropriate support medium, output or production device and related format such a printed text and images, olfactory or gustatory or potent strips or substances, live or recorded or broadcast audio and video, interactive multimedia content or any other producible sensory support and format. Contributions from participants can be made using any appropriate sensory support or format that can subsequently be documented or described in the database of a computer. The potential compensation rights and their associated entitlement options can be offered to participants using printed paper or electronic certificates. A compensation right represents a right to use or dispose of an underlying entitlement under certain conditions. These compensation rights and entitlements can comprise different clauses, terms and conditions such as the suitable level of contribution insightfulness required to be granted, activation or expiry dates or conditions, a minimum or maximum exercise and selling values, a duration of ownership rights, a type of ownership right, a royalty clause related to the sale of resulting features or products and any other possible term and condition. The value and validity of a compensation right will result from a compilation by a promoter computer (the promoter for short) of all contributions and of all associated compensation rights including all terms and conditions. Depending on these terms and conditions and on the embodiment of the present invention, participants may use private or public auction and trade facilities to sell and trade these compensation rights and entitlements. Depending on the embodiment of the present invention, participants and any approved collaborator may use money or credit instruments to invest in their own contributions and in contributions from others. Promoters and sponsors may sponsor or subsidize contributions from participants or even trade rights through credit instruments. After contributions are prepared, each contribution will be assigned a contribution code. Participants, contributions, rights and entitlement related information are processed by the promoter and stored in a database. Depending on their nature, products, product improvements, data, statistics and content resulting from this process are delivered to sponsors or offered for sale to interested buyers as prototypes, as printed or electronic representations including right and entitlement certificates or, as instructions fed to output devices or fully embodied, manufactured and finished products.

Targeted Benefits

The present invention brings multiple benefits to organizations and individuals. Contrary to current business practices, the present invention is an innovative reversal of the traditional business imperatives of control over products, strategies, marketing, market information and market participation. Organizations are increasingly requiring and requesting inputs and contributions from customers to run their businesses. However, they normally do so while also controlling and grabbing the results, the ownership and the benefits from such customer collaboration. With the present invention, business operations can still by conducted by businesses, products can still be produced by production and manufacturing entities, services can still be offered by service organizations and the stock market and venture capitalists can still provide capital to finance such organizations. However with the present invention, the use of intellectual capital and of benefits for customer and market contributions transform the traditional product development method into a process that does not necessarily only favor traditional organizations but also customers and the market as a whole. With the method and system of the present invention, the traditional organizations are not anymore the only beneficiaries of solutions based on market and customer inputs. Through the use of the present invention, customers and markets can now propose and choose alternatives and sell their contributions to organizations and businesses while reaping financial and/or other ownership benefits. From the organization stand point, the present invention offers the necessary customer and market incentives to guarantee that businesses will have access to a much needed source of product ideas and innovations that cannot be depleted.

Marketing Effectiveness and Accountability:

The present invention reconciles organizations with their marketing initiatives. In continuously changing markets, marketing can keep exploring new and often uncertain markets, products and services while remaining aligned with business objectives. This is possible by allowing marketing activities, from the ideation and product development phase to the promotion and selling phase and beyond, to gain financial autonomy. Furthermore, in addition to potentially financing the acquisition of valuable intellectual capital, marketing activities historically recognized as cost items can now become a new source of revenue.

Marketing Initiatives Measurements:

The present invention addresses the concerns expressed by organizations regarding the current lack of measurement of the results from marketing initiatives. The nature of the present invention is a measurement process for developing and marketing potential intellectual capital value. Therefore, when using the present invention, the success of marketing initiatives and the health of marketing strategies are unavoidably being measured. The present invention recognizes that customers are ultimately paying for all marketing efforts. However, by combining the timing of all customer contributions with the execution of marketing initiatives, the present invention simplifies the measurement process and makes it more effective.

Focus on Dynamic Market and Customer Insights and Simplification of Database Marketing:

The present invention ensures that evolving markets, customers and product requirements are continuously identified and timely understood. By being a tool to constantly discover new markets and market demands, the present invention provides the leadership instrument needed to create and grow markets. The present invention does not require the use of demographics, psychographics or even "motigraphics" however it can generate such data for wanting organizations while compensating participants according to the potential value of such data contributions. The present invention simplifies database marketing and consequently, reduces the costs, efforts and delays introduced by complex and resource intensive data mining and analysis technologies. This is made possible by using the most accurate and comprehensive source of data, the market itself, to contribute in real-time to the development and selection of what it perceives to be valuable and relevant information regarding customer preferences and behaviors. The market is the best source of intellectual capital and the market involvement in the determination of intellectual capital value and in the selection of desired outcomes is the best prediction tool. With the present invention, marketing can have a strong confidence in its initiatives since they are intrinsically based on the value of collective knowledge and insights instead of on the sheer quantity of information and data it possesses.

Knowledge is based on ideas that have been challenged and have evolved over time. Most static ideas are basically sets of unverifiable facts or commoditized information. The present invention will allow the future brokers of ideas and product innovations to grow their businesses by relying on ideas that keep evolving and generating new ones instead of mostly by relying on the use of overwhelmingly growing quantities of continuously aging and consequently irrelevant information.

Development and Marketing of Value:

The present invention helps organizations adapt to a new market environment where demand is the driving force and offer becomes a result. It builds intellectual capital that represents value for customers instead of relying on quick and inadequate product or service fixes made to match an expected value. By putting the emphasis on the demand side of the equation, it becomes possible to develop requirements until they match the characteristics of an existing offer or until they match an organization's desire to address that demand. In addition, by getting participants involved and committed in the creation of intellectual capital and product value, the present invention is an intrinsic development and marketing tool that simultaneously creates and promotes that same intellectual capital and the related products while being developed. The present invention looks at marketing and more specifically, at branding and product development activities being a derivative product where "Branding is the Brand" and therefore where brand products are expected to keep evolving with market expectations.

Open Branding and Customer Commitment:

The present invention creates an open market where participants can propose and appraise their insights, their knowledge, their needs and maybe their own products and services in order to directly influence organizations and offerings. The present invention also expands the possibilities for the more traditional markets. By allowing organizations to propose any intellectual capital in addition to their products and services, they can increase their offerings and potentially discover new markets. By requesting contributions based on values, beliefs and pride and by sharing the ownership and the potential commercial benefits of such contributions, the present invention ensures that motivated and interested participants are being attracted. Therefore, the present invention can become the foundation of an open branding approach using an open market to contribute to the development and marketing of brand intellectual capital. By conferring participants the responsibility and the authority to demand value in their dealings with organizations and individuals, the present invention converts participation from a mostly reactive interaction to a committed engagement to develop desired and valuable outcomes.

The present invention also leverages some fundamental human needs in order to build value and to gain commitment from participants. By addressing universal needs such as the need to belong and the need for self esteem, the present invention attracts motivated participants and gives them real active roles. It combines the opportunity to be part of something potentially exclusive and bigger than themselves with the possibility to influence that something. It gives participants a sense of status and recognition, a chance to be in the "know" and not miss out, and even a potential access to frame amongst their peers. While consumer communities are all about the lack of traditional control marketers can have on them, they are about the influence they feel they can have on markets.

By enabling an open branding and product development philosophy, the present invention is the cornerstone of a new thinking where customers don't only buy products anymore but instead they contribute to and invest in product value and product success according to their own knowledge, beliefs and insights. A philosophy where customers profit from the acquisition of such perceived value. It enables a philosophy where customers participate themselves to the creation, promotion and sale of that product value. The present invention reverses the traditional business operation where customers now become active suppliers of information and insights and where organizations now represent the demand side by needing valuable information from customers. With the present invention, customers have a new way to be heard. It adds to the traditional approach where they had to invest in company equity and then hope that their voices would be heard in a crowd of major stockholders and speculative traders. Customers become the major value maker and holder. With the present invention, customers are not uncontrollably giving away information about their behaviors and habits in exchange for fidelity points. Instead, customers are acquiring the rights to get the attention of suppliers, to get value in their transactions and to benefit from their insightful contributions and investments.

Customer Loyalty:

The present invention provides organizations with a tool to grow market shares and to implement an effective retention strategy by creating customer loyalty. Market shares and relationships cannot be owned. They can be developed, maintained and lost. This is even more true in highly competitive, abundant and knowledgeable markets where retention is substantially challenged by relatively low switching costs. The present invention creates loyal relationships between organizations and customers by developing intellectual capital based on common objectives, beliefs and values, by offering entitlements and ownership related to that intellectual capital and by sharing the potential benefits of that ownership. The present invention enables the establishment, preservation and safeguarding of trustworthy relationships. In a world where it has never been easier to infringe on intellectual property rights, the present invention, with its focus on intellectual capital and on ownership and loyalty incentives, can become the basis of a solution to protect such rights.

Innovation:

The present invention fosters the innovation and creativity required to generate long term benefits for individuals and organizations while promoting the solidarity and advancement of the society as a whole. The present invention can reduce and even eliminate risks often associated to product innovations by ensuring that innovations are chosen in response to identified market interests and needs, by limiting the financial burden of innovative initiatives and by reducing the obstacles constantly imposed on innovation by business priorities. With the present invention, the innovation process can even be converted into a revenue stream where potential innovations that would have been discarded in early stages could get a second chance. The present invention helps minimizing the use of cost cutting initiatives by supporting business growth and improved productivity through ongoing innovation. The present invention supports flexible and adaptable product development and innovation environments since it builds on dynamically evolving intellectual capital and consequently on evolving market sponsorship. It enables product development activities to focus on developing value instead of simply adding commodity features. While the present invention can be used to help discriminate which ideas about, products or services are worth developing, licensing or even patenting, it can also be used to inquire on "worst product features" that should be eliminated in future innovations.

Being a market leader means that hordes of followers are doing the same thing. However, the present invention is a market maker tool that limits static thinking and supports the ongoing innovation required to let followers wonder who and what they should imitate. Numerous organizations that have traditionally relied on the production of limited durability and disposable goods to support constant sales and revenue growth can now instead rely on constant innovations to renew and even increase the demand for durable goods. Real quality products and services could be offered with long term warranties while innovations would ensure that the market keeps demanding for the next valuable versions and add-ons. This approach would also raise the real living standards of customers by ensuring that their spending are increasing their overall value instead of being wasted on disposable replacements.

Organization Sustainability and Profitability:

Using the present invention, innovative organizations are not just gaining temporary market shares or a customer retention tool. Instead, the present invention is a tool that can be used to enable a profitable business model through the sustained development of product innovation and the creation of committed markets of loyal partners. Innovative organizations can use the present invention as a support, or as the foundation tool for a valuable marketing strategy. The present invention can protect their marketing initiatives from the often obstructive short term business imperatives. Using the present invention, organizations can monitor on an ongoing basis the efficiency and effectiveness of their initiatives and hence identify the best course of actions. By really becoming customer centric, organizations can ensure that their products, services and their identity always remain relevant to their markets. Using the present invention, organizations can minimize their research and innovation costs. They can even convert research and innovation into revenue streams or give that opportunity to outside organizations. In a time when everyone is scrambling to determine who owns what and when valuable intellectual assets can instantly and globally be copied or shared, the present invention brings a significant element of answer to the processes aiming at capitalizing on innovation and creativity.

Some Additional or Specific Benefits for Different Embodiments

The present invention also bring the following non-exhaustive list of additional or specific benefits related to different embodiments.

Benefits for Branding and Advertising Embodiments:

Every marketer wants to create loyalty towards its products and services. The present invention is an innovative tool that can also trigger commitment and loyalty towards advertising and branding initiatives. It does so by offering participants ownership and potential benefits in exchange for their collaboration to branding activities. It converts traditional linear and reactive marketing approaches into contributive and ongoing brand development initiatives. It converts interactive advertising and advertisement development into an interactive branding process. Using the present invention, "Branding is the Brand" and "Choosing is Branding" as inferred by some brand development services.

The present invention also understands and addresses the reality that trying to change beliefs in people is extremely challenging and improbable. It is furthermore challenging to try to influence beliefs in the course of a promotional campaign or during a short advertisement. The present invention builds on short and long term engagements triggered by the perception of value based on beliefs. It uses existing beliefs as a foundation for promotional content. Since customers contribute with their own knowledge and insights, they can automatically feel a connection between their beliefs, values, interests and the developed advertised message.

The present invention doesn't necessarily use aggregation to identify mass markets out of individuals. Instead, it relies on individuals to choose which market communities they want to belong to. The present invention doesn't force messages, questions or participation nor does it expect predetermined answers. It invites participants to choose which message is worth developing, participating and rewarding. It converts advertising into a center of interest. It creates an advertising environment where participants accept being exposed to messages because they can develop, evaluate and even own them. It creates branding communities where product placement is welcomed by participants who want to keep exploring, developing and benefiting from new advertising angles or stories. The present invention addresses the fact that static brand stories bore people, eventually loose their attention and don't survive. Using contributive and open branding with unique incentives and market approaches, the present invention is a tool for inspiring and developing new products and services.

The present invention addresses other identified concerns. In the online world, the majority of people want control over their advertising experience and don't want to be tracked online. The present invention provides participants with the control they believe is necessary to foster the trust they expect in their relationship with advertisers.

The present invention bring an alternative method in a saturated advertising world where customers have the capability to easily skip advertisements or tune out. In this world, adding more tools to capture audiences only adds new traps customers will very quickly learn to avoid. Similarly to Experiential Marketing that attracts audiences instead of forcing messages on them, the present invention brings significance and relevance to advertised brands. Contrarily to Buzz Marketing which is based on creating temporary noise around products and services, the present invention can trigger lasting word of mouth promotions and create a sense of value and meaning around collaborations. Buzz Marketing uses customers as channels to promote products while the present invention uses voluntary insights and beliefs as a channel to promote products and innovation ideas. This is an important feature since Buzz Marketing has sometimes been accused of pushing customers to play mind games with their social contacts and of violating personal spaces and relationships.

Using the present invention, a promoter can create an advertisement about a generic product before a specific advertiser is signed up. This method creates a strong incentive for a promoter to ensure its advertisement is successful. In essence, the present invention can convert promoters into Brand Equity Managers and Brand Equity Brokers. While it enables organizations to finally give some brand control to customers, it can also relieve them from the fear that negative words of mouth can spread up to ten times faster than good ones.

The applicability of the present invention is not limited to any specific media or technology. It can be used to reach participants wherever they are. It can address the harder to reach commuter and pedestrian markets using bill boards and mobile phones. Combined with mobile telephony and messaging, it can also be used to reduce the increasing frustration about advertisements in movie theaters by offering an entertaining and rewarding participation. The possibilities are staggering.

The present invention supports online advertisement that can use a different measurement and reward approach based on value instead of exposure. It provides advertisers with a method to evaluate the success of their online advertising and to calculate the consequent fees. Today, most advertisers measure their online advertisement exposure and pay their advertisement fees based on the number of user clicks they attract. "Click frauds" happen when heavy clicks on online advertisements are voluntary efforts that increase an advertiser's fee. Since the present invention is based on motivated customer contributions and investments instead of user clicks, it can protect advertisers from such "click fraud" schemes.

Benefits for Programming and Scheduling Embodiments:

The present invention brings the possibility to identify niche and even mass markets. It creates the incentives for a new programming model where participants collectively express and program their desires in terms of preferred products or content. In the tourism industry, it mean that customers benefit from submitting their dream trip while travel agencies can better prepare and produce travel packages. In the broadcasting and netcasting industry where programming schedules can be prepared more than a year in advance or as late as a few seconds prior to transmission, audiences can make decisions on both content and broadcast timing instead of using pre-established schedules. The present invention differs from the customizable or personalized options that are available with some interactive or online media. The present invention is a foundation for future "Programming Communities" where the need of groups of customers are expressed and where common interests and values are rewarded. Such "Programming Communities" can collaborate to program any interactive output or production device.

Benefits for Copyrighted Material and Other Intellectual Property Trading Embodiments:

The ease of sharing and reproducing media content is challenging the intellectual property protection model that related industries understandably wants to maintain. For example, the music industry is confronted with a need and desire to control the use of content while they are loosing their traditional control of the support media. Amongst the current remedies used to keep some control over intellectual property rights, there are combinations of increasingly complex and sometimes even questionable security features, drastic price cuts and ongoing legal lobbying and battles.

The present invention offers an alternative foundation for the protection of intellectual property rights. It shifts the traditionally controlled ownership of those rights to a shared ownership. The present invention relies on the knowledge that in a community, the likelihood to respect intellectual property rights is higher when participants also contribute themselves to the creation of intellectual property or content. As a future mechanism to protect and promote the protection of intellectual property, the present invention also relies on pride, fair use, product ownership, loyalty incentives and on the eventual ease of acquiring and transferring ownership rights, independently of their acquisition, reproduction or delivery method.

With the present invention, intellectual property development brings the emphasis on selling or trading rights instead of just selling support media and platforms. The present invention can work on the premise that increasingly everything that can be produced contains elements of intellectual capital that could be sold as a form of intellectual property rights. It relies on the creation of incentives for customers to themselves protect the value of their own intellectual properties.

Between the belief that intellectual properties must be controlled by using complex technologies and regulations and the recognition that a tremendous explosion of creativity was brought upon us by open media, the present invention aims at establishing some balance and compromise to the protection of intellectual property rights and of product entitlements.

Benefits for Educational, Political and Social Issues and Other Embodiments:

The present invention can become a tool to create Social Education and Responsibility Communities, to subsidize actions from authorities and to prioritize them according to ever changing contexts. Using the present invention, community members can fund and create incentives to address urgent or sensitive issues. Tapping on these communities, organizations are also given access to inexhaustible sources of new opportunities. They can also keep developing and adapting their offering as priorities keep evolving.

Additional benefits can be expected when the above embodiments are adapted into new ones or with other embodiments not described in this document but evident for one of ordinary skill in the art.

DETAILED DESCRIPTION OF THE INVENTION

The method of the present invention offers potential compensations that create real incentives to get the engagement and commitment from a plurality of knowledgeable contributors to develop and evaluate products and/or product improvements. In this description, an emphasis is given to these compensations because they convey incentives and guidelines to contributors regarding the input filtering and compromising method and system of the present invention. The offered potential compensations have a built-in capability to adapt to the perceived value of product related intellectual capital. The method and system of the present invention uses potential compensation rights as a mean to transfer that value to contributors. These potential compensation rights could have been named differently as can be readily apparent to those skilled in the art. These potential compensation rights are derivative rights different from the known stock market options or warrants in that the underlying instrument is an entitlements based on a relative value of intellectual capital. The intellectual capital valuation mechanism works like a collaborative auction however, the value creation does not come from aggregated purchase volume savings but from the adaptive and predictive ability of coordinated collective insights to evaluate a relative level of appropriateness of given intellectual capital regarding the support of a desired outcome. The initial investment required to acquire these potential compensation rights can be arbitrary and hence not match any real market value. In some cases, the final value of underlying entitlements may mainly depend on the level of investments in the related potential compensation rights. In all cases, the allocation of an underlying entitlement depends on participants' contributions that ultimately influence the perceived value of associated intellectual capital and the potential applicability to generate tradable material and products.

Figure 1:
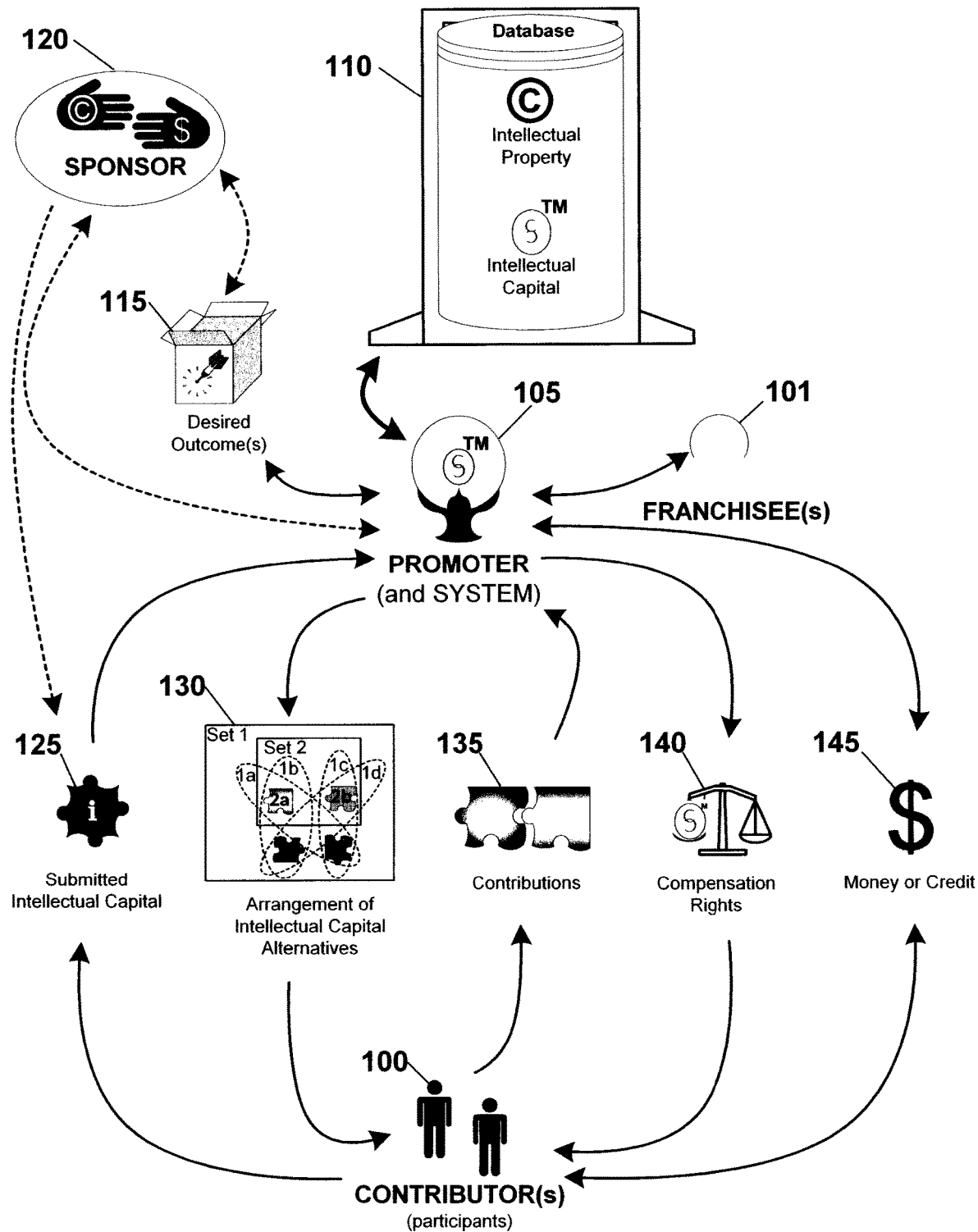
FIG. 1 illustrates an overview of exemplary constituents involved in the method and system of the present invention and of exemplary interactions between these constituents.

The following description relates to FIG. 1 and is an overview of exemplary interactions between exemplary constituents of the method and system of the invention. More details on these constituents and a more detailed exemplary process of the method of the invention are provided below. A Promoter 105 wants to explore or achieve desired Outcome(s) 115 based on the use of Intellectual Capital 110. This objective may or may not be subsidized by the Promoter 105 or by a Sponsor 120. The Promoter 105 begins by identifying and selecting Intellectual Capital items from a database 110 and creates an arrangement of Intellectual Capital alternatives 130 to be evaluated. The Promoter 105 then invites participants 100 to make their Contributions 135 to the exploration and/or achievement of the desired Outcome(s) 115. To make these Contributions 135, the participants become Contributors 100 who select and evaluate the proposed Alternatives 130 in an effort to identify which of these Alternatives 130 is(are) better suited to explore and/or achieve the desired Outcome(s) 115. In parallel, Contributors 100 can also submit their own individual Intellectual Capital items 125 that may be selected by the Promoter 105 and used as additional Alternatives 130, the whole being further described in details below. Once they have prepared their Contributions 135, Contributors 100 must register themselves and their Contributions 135 in contributor accounts in order to be offered potential Compensation Rights 140 tied to their Contributions 135, or more specifically to the relative level of Insightfulness of their Contributions 135 as described in more details below. Contributors 100 can invest in these potential Compensation Rights 140 using a Credit Instrument or through a Monetary transaction 145. In other embodiments of the present invention, these investments in compensation rights 140 can also occur prior to the actual preparation and/or submission of contributions. Using the submitted Contributions 135 and the related Investments 145, the Promoter 105 makes a compilation of the all collected information and determines the perceived relative suitability of each proposed Alternative 130 to support or be associated with the desired Outcome 115. A correlation between this compiled perceived relative suitability based multiple contributions 135 and the evaluation provided by a Contributor 100 in her contribution, identifies the knowledge and the predictive ability of each Contributor 100, the relative level of Insightfulness of their Contributions 135 and the resulting value of their acquired potential Compensation Rights 140. Consequently after the compilation, depending on the assessed relative levels of Insightfulness, the pre-established required relative levels of Insightfulness and on the terms and conditions tied to each acquired potential Compensation Right 140, the Promoter 105 identifies which potential Compensation Rights 140 can become granted Compensation Rights comprising granted entitlements. Depending on the embodiment of the method and system of the present invention, these granted Compensation Rights 140 may be exercised to acquire licenses, Intellectual Property rights or monetary compensations, the whole being further described in details below.

This subsequent description related to FIG. 1 gives further details about the constituents of the present invention. As indicated previously, the method and system of the present invention rely on Contributors 100 to make Contributions 135 as requested by a Promoter 105. These Contributions 135 consist of evaluations of Intellectual Capital Alternatives 130 chosen from a database of Intellectual Capital 110, in an effort to explore or achieve desired Outcome(s) 115 and produce some desired output 111. Contributors 100 are also requested to Invest 145 in their Contributions 135 by acquiring related potential Compensation Rights 140.

Depending on the embodiment of the present invention, the Contributors 100 may consist of any general public or of a selected public. This public may in turn consist of individuals and/or of organizations. The Promoter 105 consists of any individual and/or of an organization, and of a Promoter Computer 105 linked to a Database 110 and to an Output or Production Device 111. The Promoter also uses communication device to interact with Sponsors 120, Contributors 100 and potentially other promoters (for example Franchisee 101). The Promoter and its Promoter Computer 105 is the owner of the process used to explore or achieve the desired Outcome 115. The Sponsor 120, who can also be the Promoter 105, is any individual and/or organization that funds or commissions the exploration and/or the achievement of the desired Outcome 115, usually in exchange for rights to statistics and results of the contribution and compilation process, including the right to use the output device 111 data and instructions, or for promotional exposure.

The desired outcome 115 consists of any tangible or intangible goal or result related to commercial avenues or to products or product improvements and which can be aimed at or achieved by exploring and/or developing some proposed arrangements of Intellectual Capital Alternatives 130 and feeding the output to a Device 111.

The Database 110 used to prepare the proposed Intellectual Capital Alternatives 130 comprises Intellectual Capital that can be Acquired or Submitted 125 from any source including the Promoter 105, the Contributors 100 and the Sponsor 120. Therefore, the Database 110 contains intellectual capital items which may include, or be associated to records or links to: ownership and intellectual property right and the status of such right; usage terms and conditions; origin or source information; other imbedded intellectual capital items; ties to other intellectual capital items and; any other information or link to information related to usage and restriction provisions. The database may also include information or links to information on potential arrangements of intellectual capital items. The database may also include information or links to information on one or more potentially overlapping sets of intellectual capital items and on one or more potentially overlapping subsets of items belonging to each of these sets. The database may also include information or links to information on compensation rights and entitlement options, themselves being associated to the above sets of intellectual capital items. The database may also include information or links to information on valuation criteria, themselves being associated to the above sets and subsets of intellectual capital items. The database may also include information or links to information on levels of insightfulness of each contributions, themselves being associated to the above sets and subsets of intellectual capital items, to compensation rights, to contributions and to contributors accounts.

The database may also include account information which may comprise account owner profile information, credit or credit instrument information, ownership, right and entitlement information, contribution information and other related statistics and logged information.

In one embodiment, the compilation process may generate new separate records or even result in the creation of a flat file that would summarize the information necessary to execute the method of the present invention. While that are many variants into which information is needed and how it should be linked or stored, the use of the present invention relies on a basic data relationship structure when used. Such an exemplary data structure describing data record relationships follows.

Arrangements of intellectual capital items relate to:
  Proposed sets of intellectual capital items:
    Subsets of intellectual capital items (or alternatives):
      Intellectual capital items including any associated restriction;
      Valuation criteria.
    Potential compensation rights (options):
      Terms and conditions;
      Required relative levels of insightfulness;
      Licenses or monetary compensations entitlement.
  Compiled sets of intellectual capital items:
    Subsets of intellectual capital items (or alternatives):
      Intellectual capital items;
      Compiled perceived relative suitability of alternatives.
  Evaluated sets of intellectual capital items in individual contribution:
    Subsets of intellectual capital items (or alternatives):
      Intellectual capital items;
      Chosen valuation criteria
      Achieved relative level of insightfulness.
Accounts:
  Profiles;
  Credit instrument and credit information;
  Ownership:
    Potential compensation rights (and options);
    Granted or worthless compensation rights (and entitlements);
    Acquired licenses.

Given the reciprocity of the above elements of the relationship structure, many other ways to reflect or express the same relationships data structure are possible while still respecting the same database relational structure used by the present invention. For example, without changing the desired relationships, the "potential compensation rights" could relate to the "sets of intellectual capital items" instead of the other way around. In addition, the database may comprise other data and information records that are not listed above given their independence or their looser relationship with other data records. One such data record contains the desired outcomes which serve as a guide to the contribution process of the present invention and which is usually somewhat structurally independent from the other data elements.

In addition to the above data relationship structure of the database, a similar data structure is used to represent the physical implementation of the data model which can be stored on a computer readable medium while supporting the contribution process of the method of the present invention.

The contribution process comprises the following data record structure:
1. Arrangement of intellectual capital items;
   a. Comprising a plurality of intellectual capital items alternatives;
     i. Some of the alternatives comprise links/pointers to other alternatives;
     ii. Some of the alternatives comprise valuation criteria;
       1. Some of the valuation criteria comprise links/pointers to other alternatives;
     iii. Some of the alternatives comprise links/pointers to a contribution code By creating and storing the above data structure on a computer readable medium such as a general purpose computer memory or a DVD (Digital Video Disk) or a Portable Media Device (sometimes called POD) Memory, the computer or DVD player or POD can make use the structure as an inventive method to produce new economic combinations and results that can be sold, traded or used by organizations as valuable information for future initiatives. The above contribution process data structure, when read from a computer readable medium, allows for an arrangement of interlinked alternative intellectual capital items to be presented to a participant. By selecting the presented alternatives that comprise links to other alternatives, the participant can peruse the arrangement. By selecting the presented alternative valuation criteria that comprise links to other alternatives, the participant can effectively evaluate these alternatives and then peruse other alternatives. By selecting the presented links to contribution code, the participant can finalize her contribution and be presented with a unique contribution code based on all previous evaluation selections. This contribution code is a representation, or a pointer to such representation of the new economic combination or result that can be sold or traded and fed to a target Output or Production Device 111.

The Intellectual Capital 110 from the database comprises intellectual capital items consisting of representations of any intangible thoughts or concepts of the mind that can be represented as tangible expressions, manifestations or realizations of products. Therefore, intellectual capital items used in the present invention include any representation of embodiments of existing or new concept, idea, thought, theory, hypothesis, approach, goal, objective, question, mystery, assessment, conclusion, appraisal, judgment, value, preference, emotion, choice, right, entitlement, intellectual property, knowledge, word, symbol, data or information as well as any compilation, arrangement or set thereof.

The intellectual capital items proposed to Contributors 100 consist of sets of Alternative 130 that can be compared, selected and evaluated. These Alternatives 130 are presented to Contributors 100 as an arrangement of intellectual capital items in any appropriate sequence, hierarchy or combination thereof. These sets of alternatives consist of subsets of one or more intellectual capital items. Therefore, subsets are intellectual capital alternatives within given sets and they can be compared, selected and evaluated. Moreover, these sets and subsets can overlap and any intellectual capital items from a given set or subset may also belong to any other set or subset. Hence, subsets of intellectual capital items can comprise common intellectual capital items while still representing distinct Alternatives 130 used for Contributions 135.

Contributions 135 consist of relative evaluations, ratings and selections of one or more Alternatives 130 from the proposed arrangement, using valuation criteria. These valuation criteria comprise any qualifier, quantifier, selection directive, comparison directive or Investment 145 level indicating a perceived relative suitability for Intellectual Capital Alternatives 130 to support the desired Outcome 115. As indicated above, this evaluation of a relative suitability to support the desired Outcome 115 is later used to determine the relative level of Insightfulness of a Contribution 135.

Contributors 100 make Investments 145 to acquire potential Compensation Rights 140 tied to eventual relative level of Insightfulness of their Contributions 135. In another embodiment of the present invention, Contributors 100 may also acquire these potential Compensation Rights 140 tied to Contributions 135 from other Contributors 100 or they may declare Contributions 135 from other Contributors 100 equivalent to their own. The Investment 145 in these potential Compensation Rights 140 is made by using a credit instrument 145. In other embodiments, monetary 145 transaction may be used. The credit instrument 145 can comprise real or fictitious currencies and is identified in each Contributor account. These currencies may be acquired by the Contributor 100 through membership fees and/or credits purchase and/or sponsorship from a Sponsor 120; the Sponsor possibly being the Promoter 105. The Contributor 100 may also acquire Credits 145 from the Promoter 105 in exchange for submitting new Intellectual Capital items 125. Similarly, the Promoter 105 may offer Credits 145 to Contributors 100 whenever a submitted Intellectual Capital items 125 is used in the proposed Intellectual Capital Alternatives 130. In another embodiment of the present invention, Contributors 100 may acquire Credits 145 or may make investments 145 in these potential Contributions Rights 140 when registering the purchase of a tangible or intangible good or service. In such a case, these credits or investments 145 are most probably sponsored or subsidized from a Sponsor 120 through such goods or services.

Potential Compensation Rights 140 are derivative rights with their underlying instrument consisting of one or more entitlement options comprising licenses and/or monetary compensations entitlements. Each option is in turn associated to one or more of the above described sets of Intellectual Capital Alternatives 130. Depending on the embodiment of the present invention, these derivative rights and their entitlement options may be acquired, sold, exercised, traded or exchanged through transactions involving the credit instrument 145. Licenses may also be sold to interested buyers. Derivative rights and entitlements may also be kept when there is a possibility to make a more profitable sale in the future. They may also be traded for other derivative rights, entitlement options or licenses. Transactions involving changes of ownerships or status of these derivative rights, options and licenses are registered in the corresponding accounts of each owner.

The details and the exact nature of potential Compensation Rights 140 that are defined prior to having Contributors make their Investments 145 could, in another embodiment, be established at another time and could be established through the use of the method and system of the present invention. In the preferred embodiment of the present invention, a potential Compensation Right 140 is a derivative right that would only be granted if, as a result of the compilation process, the contribution 135 tied to that derivative right presents a predetermined relative level of Insightfulness. As explained above, a derivative right comprises one or more entitlement options. These options are in turn linked to sets of Intellectual Capital Alternatives 130. Furthermore, to assess the relative level of Insightfulness related to a derivative right, it is necessary to assess the relative level of Insightfulness related to the options of that derivative right based on the contribution tied to that derivative right. The compilation process will determine if a derivative right and its options can become a granted right (also called granted Compensation Right 140) by identifying if, and which options of that derivative right are tied to an Insightful contribution and which become granted options.

When a granted Compensation Right (also referred to as a granted right) is exercised, its owner may acquire one or more licenses and/or other monetary compensation. Acquired licenses may offer different qualified permissions such as: a Usage Right providing its owner the right to use some identified intellectual capital; a Distribution Right providing its owner the right to use and distribute or sell some identified intellectual capital; a Modification Right providing its owner the right to modify and embed some identified intellectual capital, to create derivative work based on some intellectual capital, to use and to distribute some identified intellectual capital. Other licenses such as a Franchisee Right and a Royalty Right are possible. Again depending on the embodiment of the present invention, a Contributor 100 may exercise a granted rights 140 to acquire licenses that confer direct or indirect monetary compensations. For example, an acquired license may entitle its owner to Royalty Rights related to future sale of compensation rights or of licenses. An acquired license 140 may also entitle its owner 100 to gain limited promoter rights in assigned markets of their choice and to become a Franchisee 101. The owner of a Franchisee 101 Right may promote a desired Outcome 115 using Intellectual Capital Alternatives 130 while collecting some promoter fees. Other licenses can be readily apparent to those skilled in the art.

In different embodiments of the present invention, activation and expiry conditions may be assigned to derivative rights, granted rights, entitlements and licenses. Therefore, these different rights, entitlements and licenses can be exercised only when they have fulfilled all activation conditions such as an activation date. Similarly, they can only be exercised if they have not yet fulfilled any expiry condition such as an expiry date.

In a preferred embodiment, Compensation Rights 140 may present entitlement options to return value compensations that are monetary compensations 145 for their owners 100 when they exercise such granted entitlement options. In a preferred embodiment, Compensation Rights 140 may also present entitlement options to buyback value compensations that are monetary compensations 145 for their owners 100 in exchange for selling back to Promoter 105 or relinquishing some of their compensation rights, entitlements or licenses. A return or a buyback value can be a fixed pre-established value or it can be a calculated value representing a share of the total Contributor 100 investments in potential Compensation Rights 140 tied to all contributions and to given sets of Intellectual Capital Alternatives 130. The value of that share is related to the relative level of Insightfulness of a Contribution 135 tied to that Compensation Right 140. In yet another embodiment, a return or a buyback value entitlement may provide monetary compensations 145 that includes shares of Sponsorship 120 funding and/or investments. For example, a Sponsor 120 may decide to buy 145 some or every derivative rights, entitlements options and licenses to all intellectual capital resulting from all contributions 135.

Figure 2:
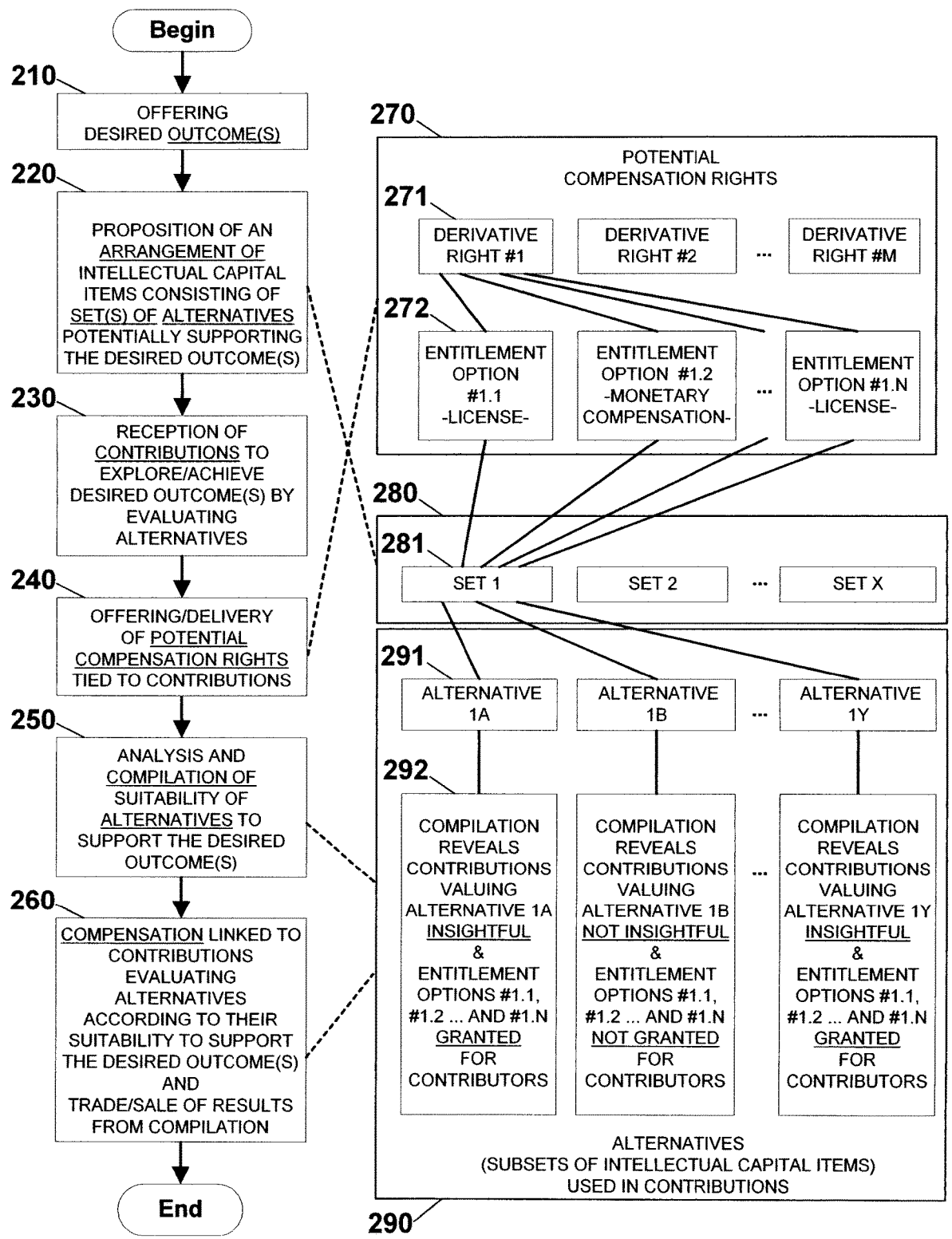
FIG. 2 is a flowchart and description illustrating an exemplary process overview of the method of the invention by which target outcome(s) is(are) established and explored by evaluating set(s) of alternative intellectual capital items in order to identify the most suited alternatives to achieve the desired outcome(s) and to compensate the participants who contributed to identify these most suited alternatives through potential compensation rights tied to compiled results.
Figure 3A:
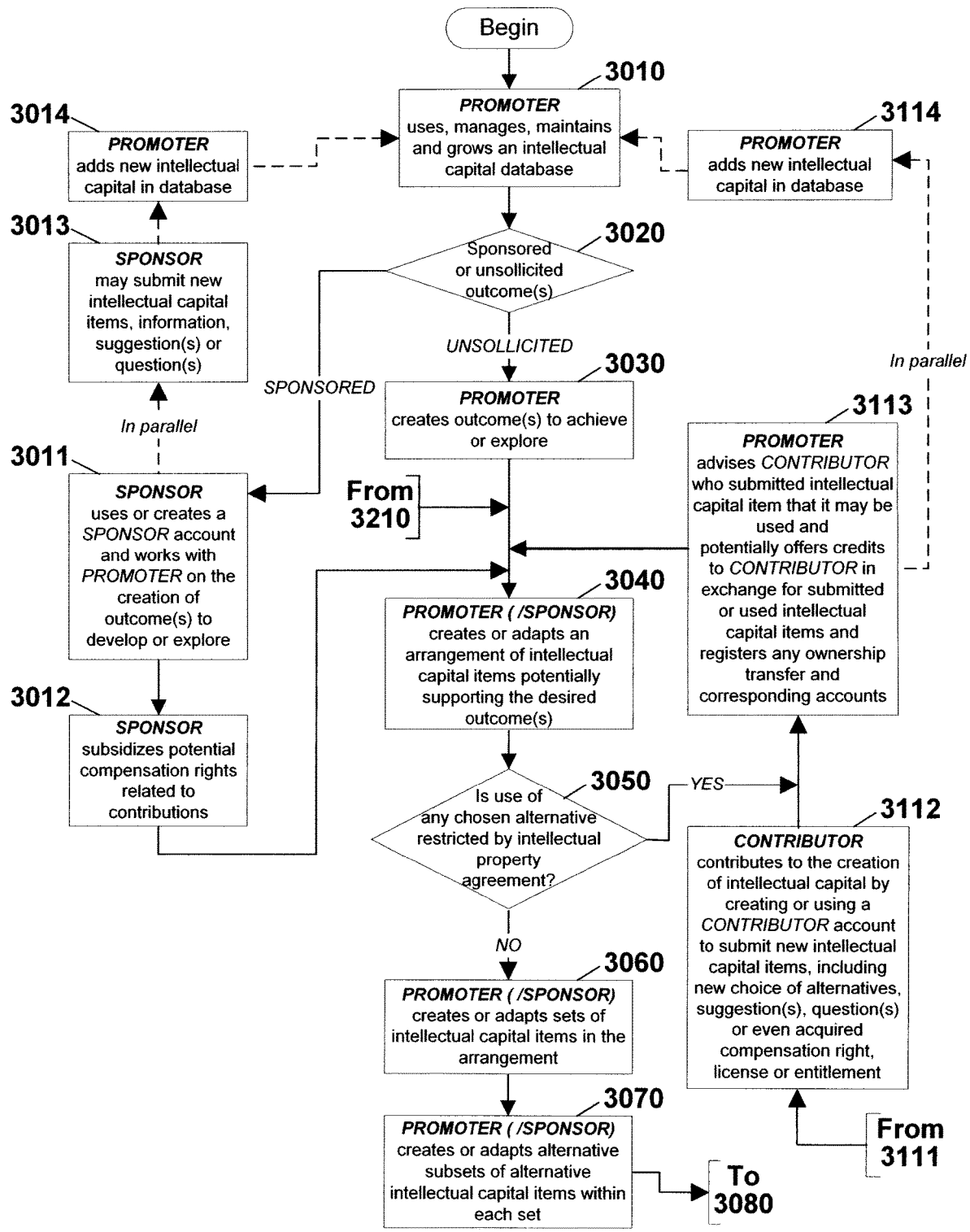
FIG. 3 consisting of FIG. 3A, FIG. 3B, FIG. 3C and FIG. 3D, is a flowchart illustrating a detailed exemplary process of the method of the invention by which a public is enticed to peruse, submit new and select intellectual capital items and contribute to the development of a product through the evaluation of product related intellectual capital in order to reach a desired product related outcome and to be compensated for insightful contributions.
Figure 3B:
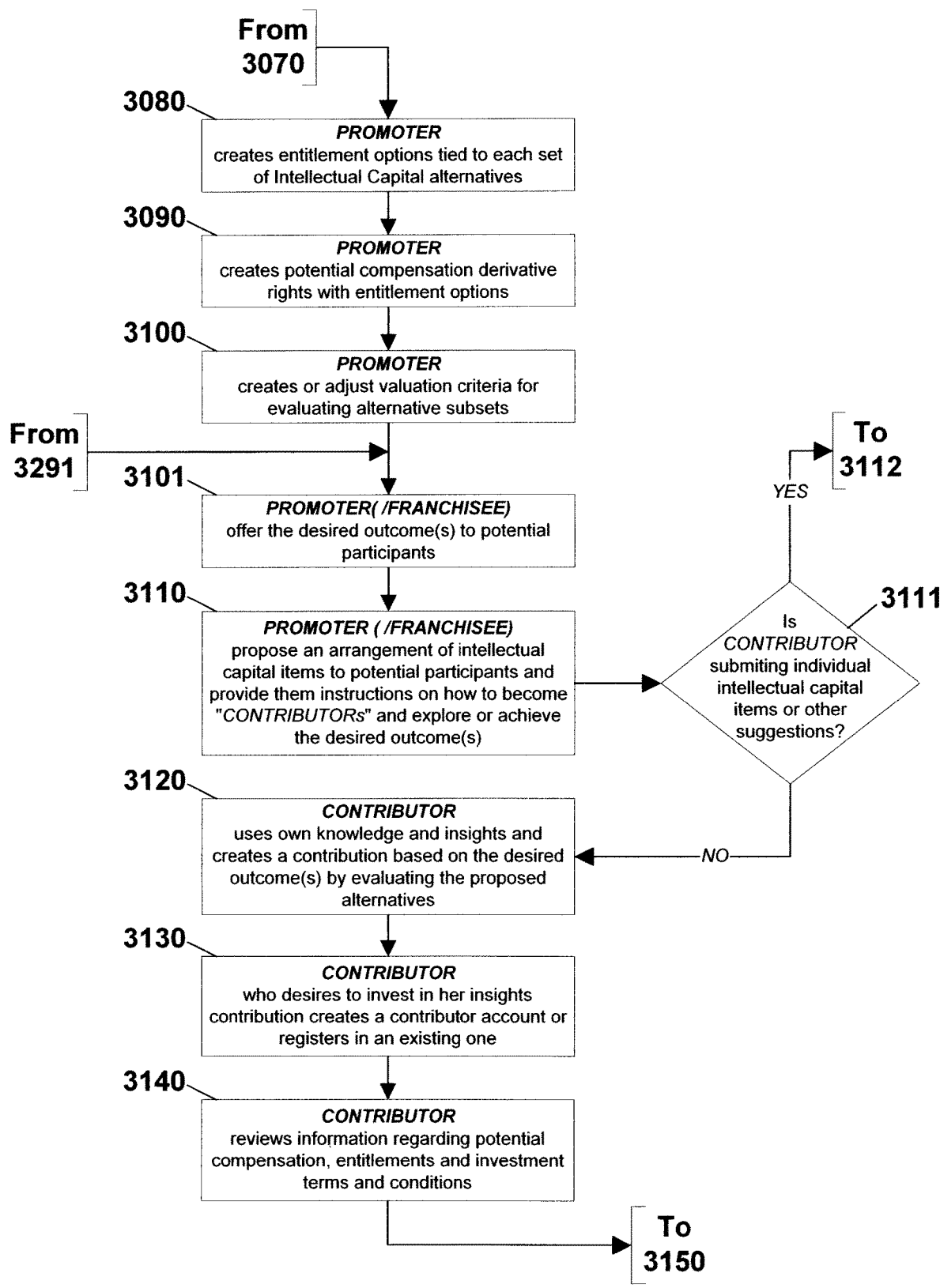
Figure 3C:
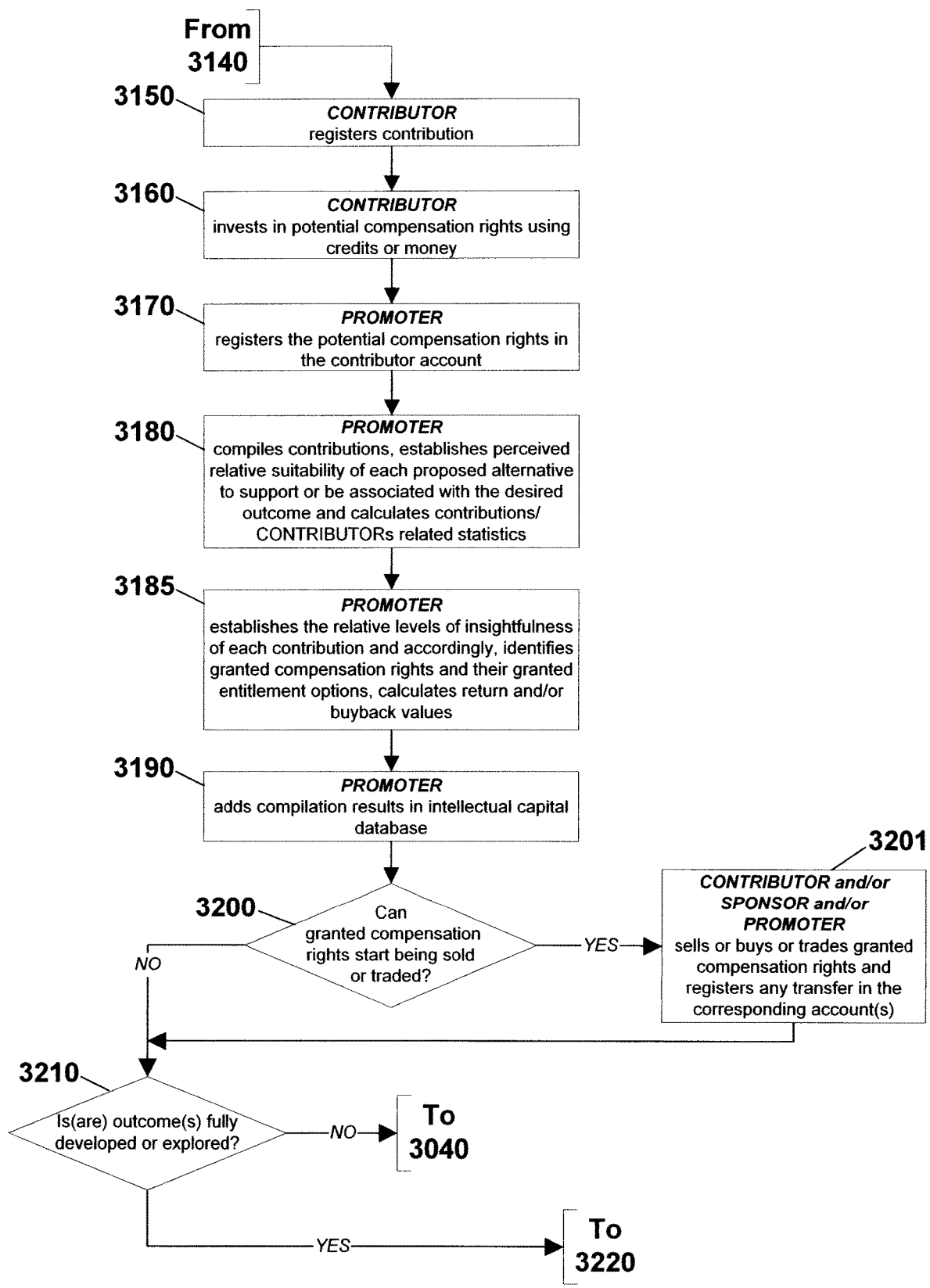
Figure 3D:
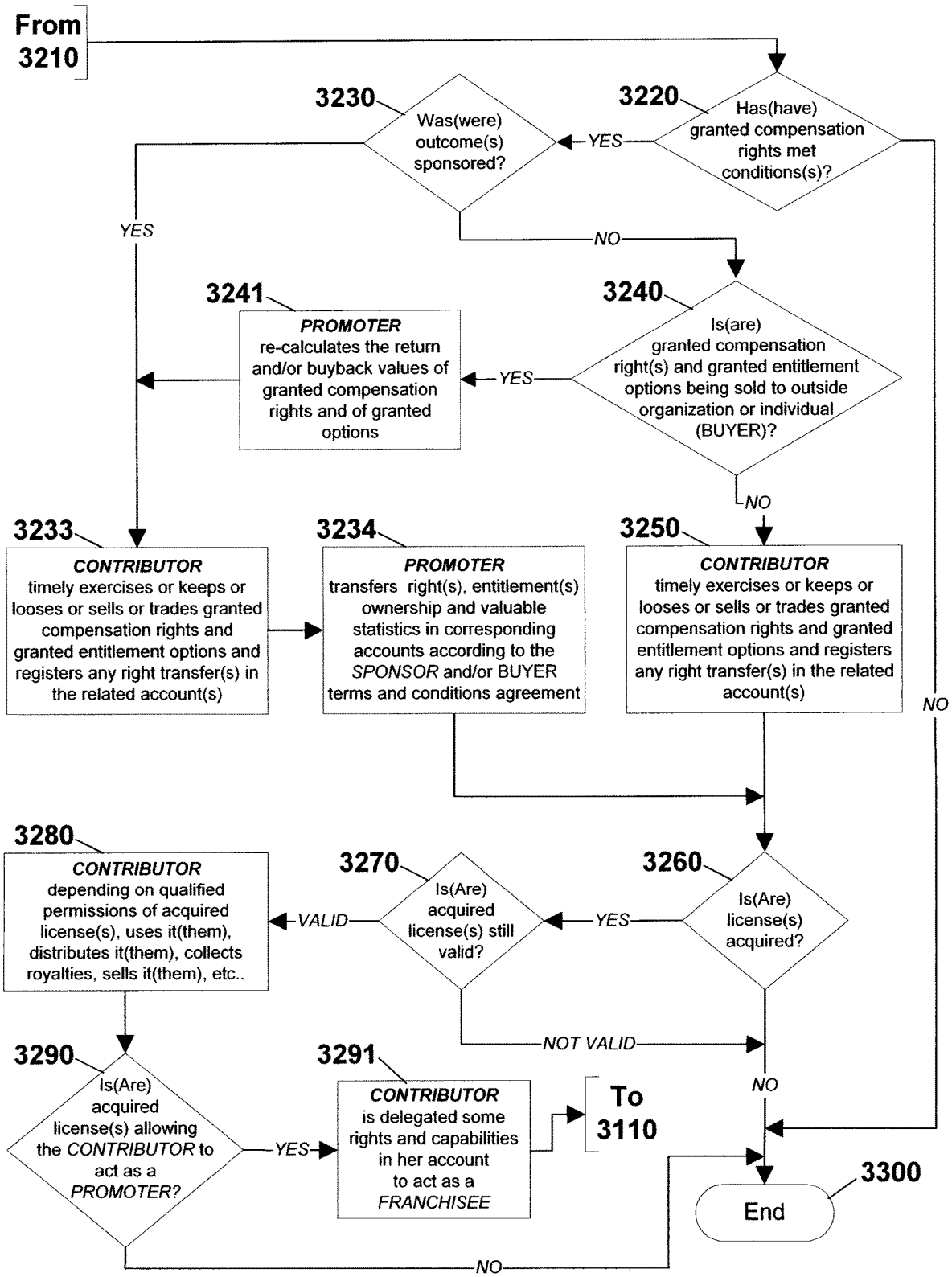

FIG. 2 illustrates an exemplary process overview of the method of the present invention in support of some details regarding the data structure links between contributions and compensations. A more detailed exemplary process is described below. Different embodiments of the process and data structure can be readily apparent to those skilled in the art. In one embodiment, participants could be requested to contribute to new versions of this process and data structure and any suggestion still supporting the method and system of the present invention would also be included in the present invention. The main features of the method of the present invention relates to the use of Sets 280 of Intellectual Capital Alternatives 290 for exploration and development work around a desired outcome and to the use of Potential Compensation Rights 270 for contributors of valuable contributions.

Therefore, a first step in the exemplary process is the offering of desired target outcome(s) 210 that represent the objective behind the execution of the process. Based on the desired outcome(s), Intellectual Capital items that have been selected and assembled into Set(s) 280 of intellectual capital alternatives are proposed to contributors 220. Contributors are then requested to participate and submit their contribution 230 to the exploration and/or achievement of the desired outcome(s). They contribute by providing their insights through their evaluation of the relative suitability or likelihood for Intellectual Capital Alternatives 290 to support or be associated with the desired outcome(s). Once Contributors have submitted their contributions, they acquire rights 240 to Potential Compensation 270 related to their contributions. These Potential Compensation Rights 270 are Derivative Rights 271 offering one or more entitlement options 272 such as entitlements to licenses and entitlement to monetary compensations. While each Entitlement Option 272 is associated to one Set 281 of Alternative Intellectual Capital 291, more than one Derivative Right 271 and more that one Entitlement Option 272 can be associated to the same Set 281. A compilation of all contributions 250 results in the identification of the Alternative 291 Intellectual Capital items relatively perceived most suited to support or be associated with the desired outcome(s). Finally, a correlation between the results from the compilation and the relative level of Insightfulness 292 of each evaluation in each contribution, establishes which acquired Derivative Rights 271 may grant compensation to contributors. Insightful Contributors can then claim their compensation while compensation rights, entitlements and other results or information from the compilation of contributions can be used to feed an output or production devices and produce the results 265, sold or traded 260 to others who will product these results.

FIG. 3 illustrates a more detailed exemplary process of the method and system of the present invention. Different implementations of the process can be readily apparent to those skilled in the art. In some embodiments, participants could be requested to contribute to new versions or features of this process and any suggestion still supporting the method of the present invention, would also be part of the present invention. The process of the method of the invention relies on a process owner, the Promoter who can, in exchange for its services, collect fees, acquire rights and entitlements related to intellectual capital items and derive benefits from those rights and entitlements. The Promoter uses, manages, maintains and grows a database consisting of intellectual capital items which includes intellectual property rights and information on participants and sponsors as shown in step 3010. Further details about intellectual capital 110 are provided above. These intellectual capital items can be provided by the Promoter, by a Sponsor as indicated in step 3013 or by a Contributor (participant) as indicated in step 3112. The Promoter ensures that any submitted intellectual capital, including any intellectual property disclaimer or restrictions, are added in the database as indicated in steps 3014 and 3114. Step 3020 is the initiation of the insightful collaboration of the method of the present invention. The Promoter may decides to explore and/or achieve desired unsolicited outcome(s) alone, without any Sponsor 3030. The promoter may also proceed with a Sponsor 3011 in which case the Sponsor creates or uses its Sponsor account and works with the Promoter to determine the desired outcome(s). For clarity reasons, only one outcome will be considered in this description even though multiple outcomes can be used to drive the process. The desired outcome represent a desire to explore and/or achieve some goal or result using the present invention, that something potentially being the identification of another desired outcome. Hence, in another exemplary embodiment, this desired outcome could be the result of prior contribution work. If an outcome is sponsored, the Sponsor in step 3012 subsidizes the development process by creating credits that can be used or shared by Contributors (participants). These credits can be associated to real or fictitious money. Then in step 3040, the Promoter with, if applicable, the Sponsor select and assemble intellectual capital items that could potentially support the achievement of the desired outcome. In another embodiment, this arrangement of intellectual capital could also be the result of prior contribution work or could even be completely random. An intellectual capital item selected for the arrangement may have been submitted by a Contributor and therefore in some cases, may comprise intellectual property restrictions or other right constraints as indicated in step 3050. If so, the Promoter in step 3113 may alert the Contributor that her submitted intellectual capital item will be used and the Promoter may also offer credits to that Contributor in exchange for the right to use that intellectual capital item. Then in step 3060, the Promoter with, if applicable, the Sponsor identify set(s) of items that could potentially support the exploration and/or the achievement of the desired outcome. Later in the process, these sets will be associated to potential compensation rights. As described in step 3070, individual intellectual capital items in each set are grouped by the Promoter with the potential collaboration of a Sponsor, into subsets of one or more items that represent intellectual capital alternatives. Later in the process, these subsets or alternatives will be selected, evaluated or compared by Contributors according to their suitability to support the desired outcome. Also later in the process, that suitability to support the desired outcome will dictate which potential compensation right can be converted into a granted compensation right (or granted right). In step 3080, the Promoter creates entitlement options comprising licenses and other monetary compensations associated to each set of alternatives. In step 3090, the Promoter creates potential compensation rights that comprise one or more entitlement options with specific terms and conditions related to these entitlements. Later in the process, these potential compensation rights will be acquired by Contributors depending on which sets of alternatives they evaluate. More details on rights and entitlement options are provided above. In step 3100, the Promoter identifies evaluation criteria that will be used in the coming evaluation of the proposed sets of alternatives. Later in the process, these evaluation criteria will be used by Contributors to select, qualify and/or quantify the suitability of given alternatives within each set in support of the exploration and/or the achievement of the desired outcome. In step 3101, the Promoter, and/or potentially the Franchisee who acquired that status in step 3291, offer to potential participants, the possibility to participate to the exploration and/or the achievement of the desired outcome. In step 3110, the Promoter and/or Franchisee propose to the potential participants the arrangement of intellectual capital items and explain the how to become Contributors by collaborating to the creation and/or evaluation of intellectual capital with the objective to explore or achieve the desired outcome. For all subsequent steps, the Insights Franchisee will not be mentioned again since most of her actions are executed through the Promoter's services.

As indicated in step 3111, the Contributor (participant) may be invited to submit intellectual capital items prior or during the evaluation process. To do so, the Contributor uses or creates a Contributor account and registers her profile and any submitted intellectual capital item as indicated in step 3112. Depending on the embodiment of the present invention, that intellectual capital item can be new work, derivative work based on available intellectual capital or even acquired rights, licenses and entitlements related to intellectual capital. If the submitted intellectual capital is accepted, the Promoter registers any ownership right transfer and may offer credits to the Contributor in exchange for the right to use the submitted item as shown in step 3113. The Promoter may then decide to immediately use the submitted item and add it as a new component or alternative in the current execution of the process in step 3040. In parallel in step 3114, the item is put in the database for future use. Step 3120 is the beginning of the evaluation process where, based on the desired outcome and using her knowledge and the valuation criteria, the Contributor selects, evaluates, compare and rate intellectual capital alternatives from the proposed sets of alternatives. This evaluation process can be made by perusing alternatives, by temporarily putting a selection, a quantitative and/or a qualitative tag on alternatives, by temporarily keeping alternatives aside for further evaluation, by immediately selecting alternatives, by further exploring the potential sequence of alternatives and/or by rejecting unwanted alternatives. To peruse alternatives, a Contributor will interact with them by potentially touching, viewing, hearing, smelling, tasting them, buying them, talking to them and/or through any other form of applicable interaction. Once alternatives have been evaluated, the Contributor uses or creates a Contributor account 3130, reviews the offered potential compensation rights and entitlement options 3140 and registers her contribution consisting of her evaluation of the proposed alternatives 3150. To register the contribution, the Contributor uses a contribution code identifying the chosen alternative(s) and associated valuation (s). This contribution code may be created manually or otherwise according to a specified procedure. For example, the contribution code identifying a tangible product associated to a contribution could be based on its UPC code and on a personal identifier. More complex contribution codes could comprise hashing and recombination data processing techniques including identifiers related to evaluation criteria and to the Contributor, the Sponsor, the Promoter, the outcome and any other useful information. The registration process may be done using an electronic or traditional interface such as the Internet, an interactive phone service. The timing of that registration may be immediate, for example when buying the item(s), or deferred, depending on the embodiment. In step 3160, the Contributor invests in potential compensation rights related to her contribution using credits or money. More details about investments, credits and credit instruments are provided above. Prior to investing in these potential compensation rights, a Contributor may be required to buy the presented alternatives or to demonstrate a proof that she has perused them. The Promoter then registers the acquired potential compensation rights which are registered in her Contributor account as shown in step 3170.

At step 3180, the Promoter compiles all contributions to establish the perceived relative suitability of each alternative to support or be associated with the desired outcome and to calculate statistics related to Contributors, Contributions and other insights. In step 3185, the Promoter identifies the relative level of Insightfulness of each contribution evaluation. More details are provided above regarding this level of Insightfulness. To evaluate the relative suitability and the Insightfulness factors, discriminating information are use and may comprise the valuation criteria, amount of credits or money invested to acquire given potential compensation rights, and any other information or statistical data collected during the contribution as well as any pre-established weight factor for given intellectual capital alternatives. In addition to establishing the level of Insightfulness of each contribution, the process establishes which of the potential compensation rights and entitlement options will grant licenses and/or monetary compensations to their owners. Using correlations between the results of the compilation and the number of granted options, the Promoter will also calculate a return and/or buyback values for these granted compensation rights and granted options. In step 3190, all results from the compilation are put in the intellectual capital database and represent new intellectual capital.

Step 3200 questions if Contributors, the Sponsor and/or the Promoter can start selling, in an open or private market, the granted compensation rights before an outcome is deemed fully explored or achieved. If immediate open market trading is allowed as indicated in step 3201, the price of these rights can start fluctuating depending on their estimated or speculated return or buyback value. Wherever the bidding process is done, these trading transactions are registered by updating any change of status and ownership of the granted compensation rights in the respective accounts. In another embodiment of the present invention, even potential compensation rights that have not yet been granted could be openly traded based on pure speculation.

However to make economical sense, this would only be possible if all contributions are halted while no compilation result is being published.

Depending on the embodiment of the present invention and on the desired outcome, the process to explore and/or achieve that outcome can consist of multiple contribution iterations before the desired outcome is deemed fully explored. At step 3210, if multiple iterations are required after at least the first evaluations of alternatives has been compiled, the Promoter reverts back to step 3040 in the method of the present invention, adapts or creates new arrangement of intellectual capital items and proceed from there with the process. If only one iteration is required or if all iterations have been completed, the next step, as indicated in step 3220, depends on whether or not the compilation process determined that a potential compensation right does grant entitlements to its owner. Potential compensation rights that grant nothing to their owners are basically disregarded when reaching step 3300. Conversely, if a potential compensation right and its option does grant compensation, the next step 3230 of the process depends on whether or not the execution of the process was sponsored.

When the exploration and/or the achievement of an outcome is not sponsored, it is unsolicited. The totality of the granted compensation rights can then either be preserved or sold to any interested buyer comprising organizations or individuals as depicted in step 3240. If the totality of these granted compensation rights and of the underlying entitlements is sold, the proceeds from the sale is allocated to a calculated return and/or buyback value to be distributed to the owners of these granted compensation rights as shown in step 3241. When granted compensation rights and their options are preserved, a Contributor can sell or trade her granted compensation right, she can keep her granted compensation right or she can timely exercise one or more of her granted entitlement options to acquire licenses or to receive monetary compensations as shown in step 3250. When the development and exploration of an outcome is sponsored, the terms and conditions of the sponsorship will affect the potential compensation rights. Depending on these terms and conditions, a Contributor may still sell or trade her granted compensation right, she may keep her granted compensation right or she may timely exercise one or more of her granted entitlement options to acquire licenses and/or to receive monetary compensations as shown in step 3233. However most probably, the totality or a portion of the granted compensation rights and of their entitlement options will be transferred to the Sponsor or Buyer, in addition to compiled statistics and all other results, as depicted in step 3234. Once the Sponsor or Buyer has acquired the right to commercially exploit the compilation results, these results are fed to the output or production device to generate new or improved material or products as shown in step 3235. In all cases, changes of status or ownership for rights or entitlements in steps 3233, 3234 and 3250, are reflected by updating the corresponding accounts.

Once Sponsor or Buyer have been transferred the rights to commercially exploit the compilation results, these results are sent to and used by the output or production device to generate the new or improved material or product(s) as shown in step 3235.

In any case, granted compensation rights, their options and related licenses and monetary compensations may comprise activation and expiry conditions. When licenses are acquired 3260 and as long as an expiry condition has not yet been met 3270, the Contributor owning licenses may benefit from their qualified permissions as described above. Therefore, a Contributor with acquired license(s) may keep exploiting it(them) as long as it is (they are) valid as depicted in step 3280. As indicated in step 3290, a Contributor may have acquired a license that give her a Franchisee Right. In step 3291, such a license delegates to the Franchisee permission to act, with restrictions, like a promoter. Depending on the embodiment of the present invention, this license give its owner limited right to use the services from the promoter, starting in step 3110, to further develop and explore the desired outcome in different and/or assigned markets, collect some promoter fees and potentially other promoter benefits. This Franchisee status and other permission related to its capability would also be reflected in her account.

Figure 4:
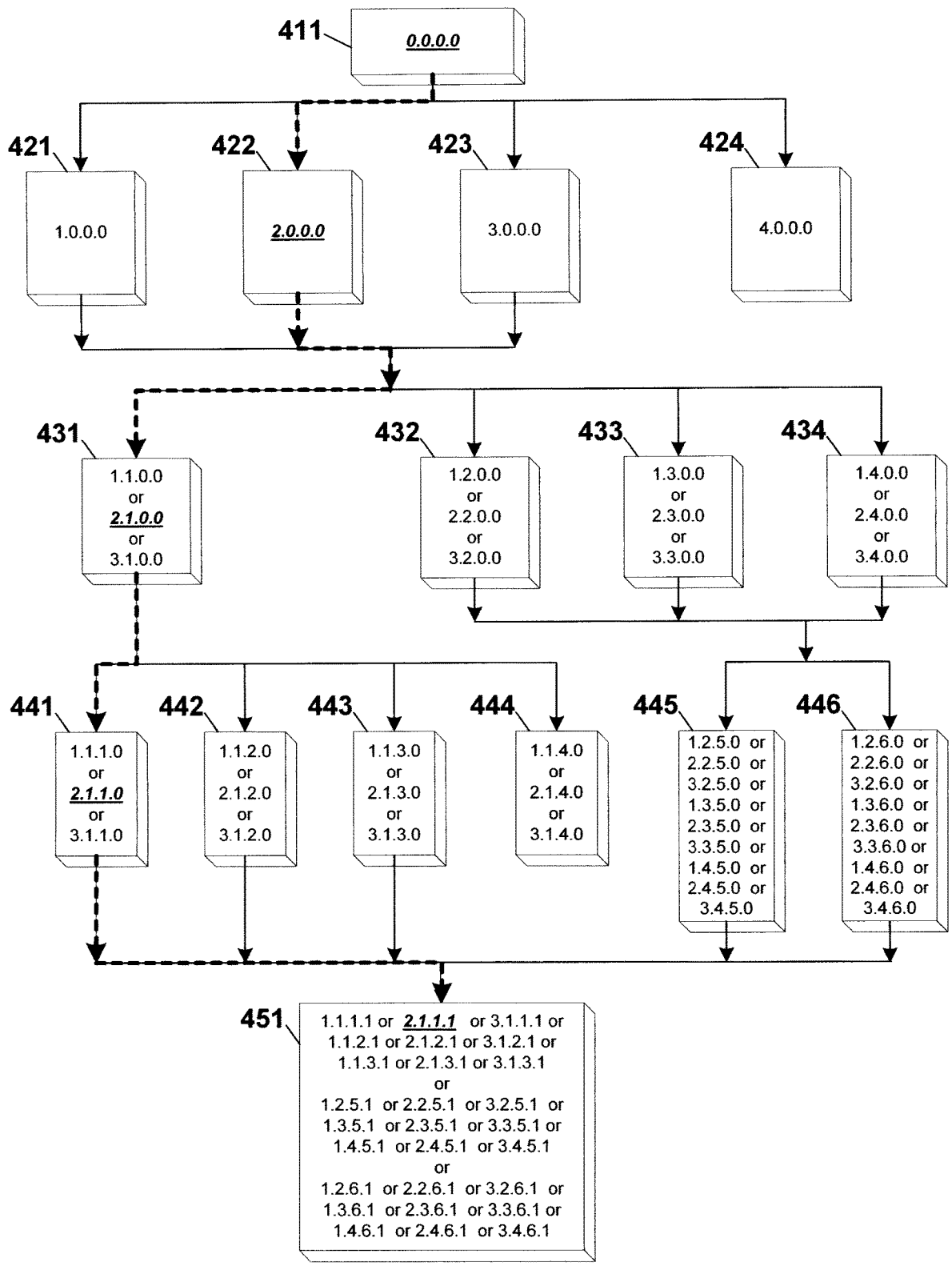
FIG. 4 is an org chart illustrating an exemplary arrangement of selected Intellectual Capital items to be used by participants in their contribution to a desired outcome as referred to by a method of the invention.

FIG. 4 illustrates an exemplary arrangement of intellectual capital items that can be represented as a set of items comprising any combination of content and applicable formats to be used to work on contributions. Different implementations of this arrangement can be readily apparent to those skilled in the art. In this example, the items are represented by boxes and are numbered and organized in a four-level hierarchy that dictates the potential four-level alternative subset(s) participants can peruse and select. In other embodiment, the arrangement could be random, without levels, with levels but no hierarchy, etc. In yet other embodiments, the arrangement work itself could be part of a participant's requested contribution and any suggested arrangement or change in arrangement would be included in the present invention. The numbering scheme in boxes uses four-digit numbers that represent each item of a subset in relation to all previously selected items in the hierarchy. Therefore, this scheme allows for any given item at a given hierarchy level to be identified by multiple unique four-digit numbers representing a selection path. In this example, every possible complete selection paths (or alternative subsets) are shown in the last box labeled 451 where each four-digit number represents a distinct alternative subset.

As described at step 3120 of the detailed process of FIG. 3, a Contributor uses her knowledge and insights on a desired outcome to evaluate if offered intellectual capital alternatives represent potential value. If so, she can select or evaluate them. Depending on the embodiment of the present invention, the Contributor may decide to stop the valuation process anytime her insights tells her that she has exhausted all valuable possibilities. However, in an example using the structure of FIG. 4, a Contributor must peruse each hierarchical branches and make a unique choice at each of level.

In this example, the dotted lines on top of the connection arrows indicate the selection path chosen by the contributor. The box labeled 411 shows number 0.0.0.0 which indicates that no item has yet been chosen at the beginning of the valuation process. The contributor is then offered four intellectual capital items to choose from. Item number 1.0.0.0 labeled 421, item number 2.0.0.0 labeled 422, item number 3.0.0.0 labeled 423 and item number 1.0.0.0 labeled 424. In this example, item labeled 424 is a special item offered for perusal but it does not represent a valid item to choose from. Instead, 424 can offer help information or even, depending on the embodiment, an embedded advertisement. Therefore in this example, upon selecting any of the three valid items, the contributor is presented with a new set of four items. As shown by the connecting arrows, independently of which of the three valid items the contributor previously chose, she is subsequently presented with the same four next items. Therefore, after selecting item number 2.0.0.0, or the box labeled 422, the contributor is offered four more items for valuation. At that point, if the contributor had chosen the item represented by the boxes labeled 432 or 433 or 434, she would have been presented with a new set of two items respectively labeled 445 and 446. However in this example, the contributor chooses the first item labeled 431. Since the previously chosen item was number 2.0.0.0, the new hierarchical number of the chosen item is 2.1.0.0. Again, the different four-digit numbers shown in each box represents different selection paths used to reach that item. The contributor is then further offered four items labeled 441, 442, 443 and 444 to peruse. Item labeled 444 is another special item to peruse similar to the one labeled 424 and cannot be evaluated or selected as a preferred item. At this point, the contributor chooses item labeled 441 and consequently numbered 2.1.1.0. In the example, the next and last item offered is the same independently of the previous selection path. This unique intellectual capital item represented by the box labeled 451 represents the selection path number 2.1.1.1 for our contributor. Again, the full selection path is shown by the thick dotted line in FIG. 4. Since this last item is common for all selection paths, it could consist of a wrap-up component used in a sponsored outcome. In this example, this last item could comprise a list of products offered by the sponsor in response to the desired outcome or, it could simply be a fact sheet or an advertisement about the brand name behind the sponsored contributions. In this example, the compilation of intellectual capital contributions represented by step 3180 of the detailed process of FIG. 3, will identify the subset number(s) (selection path number) that represents the most valuable alternative subset(s).

Figure 5A:
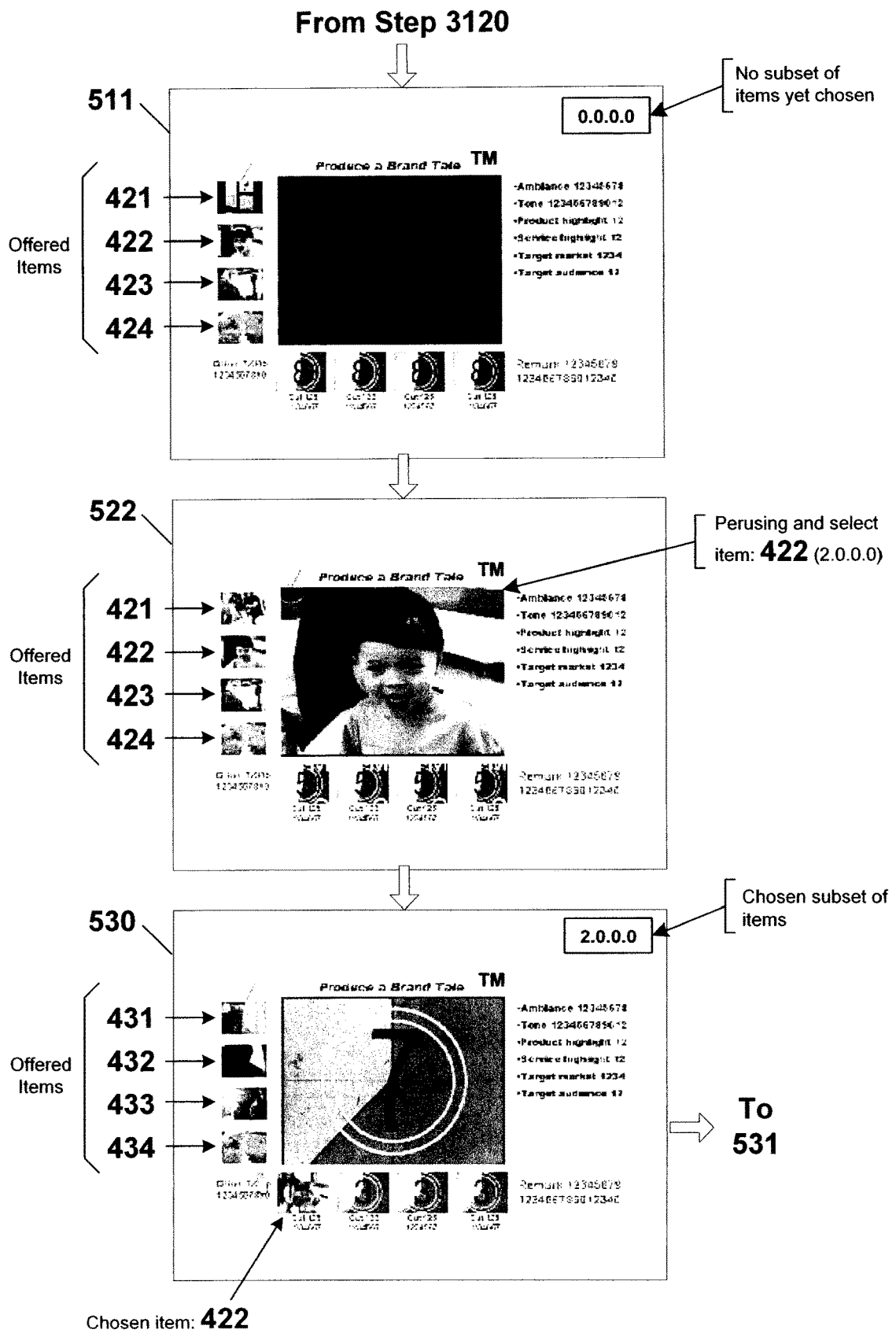
FIG. 5 consisting of FIG. 5A, FIG. 5B and FIG. 5C, contains a flow of screen shots of an exemplary interface to a system of the invention illustrating a single participant contributive interaction with a list of intellectual capital items that results in desired output data valuation work being performed.
Figure 5B:
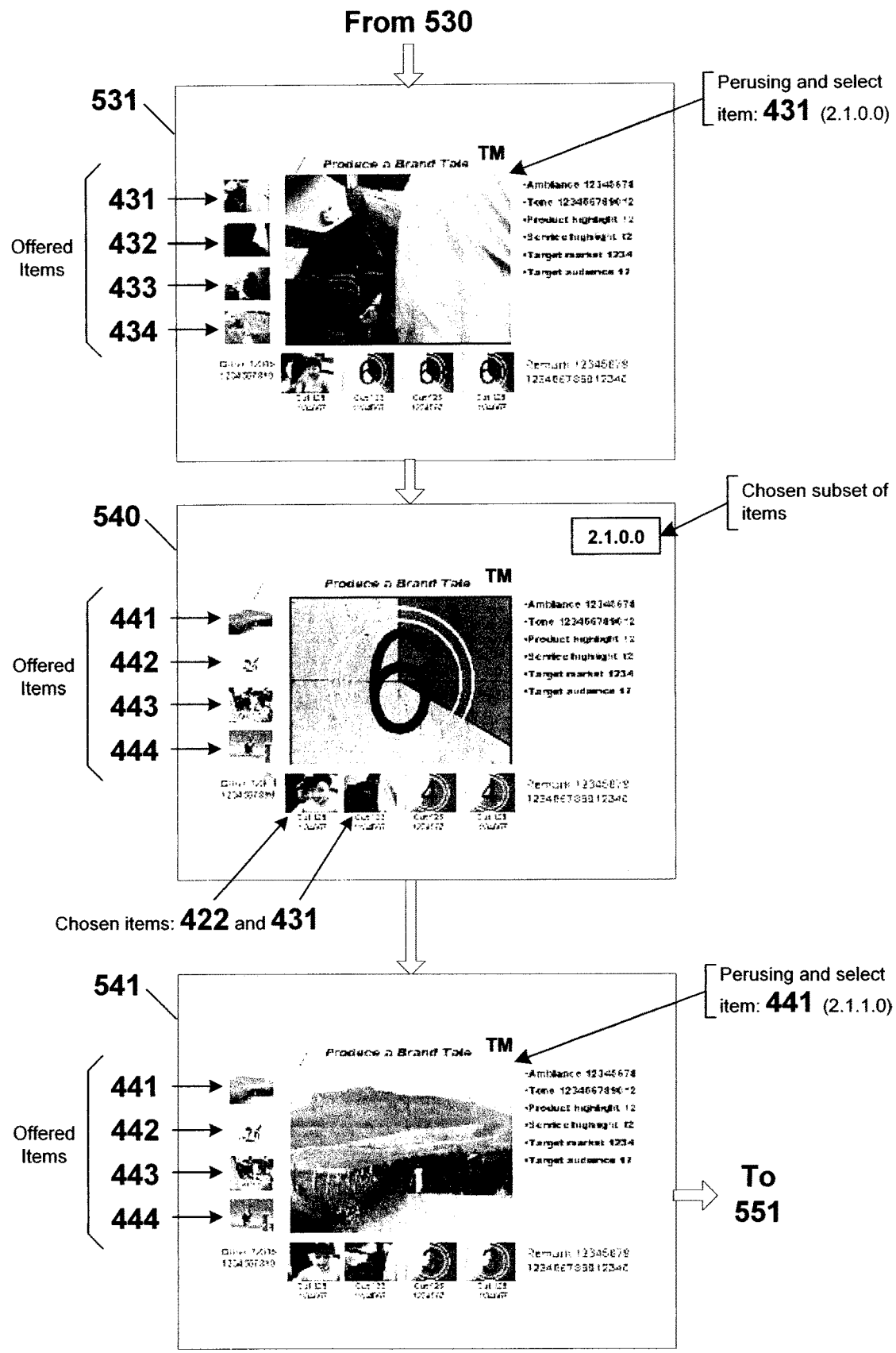
Figure 5C:
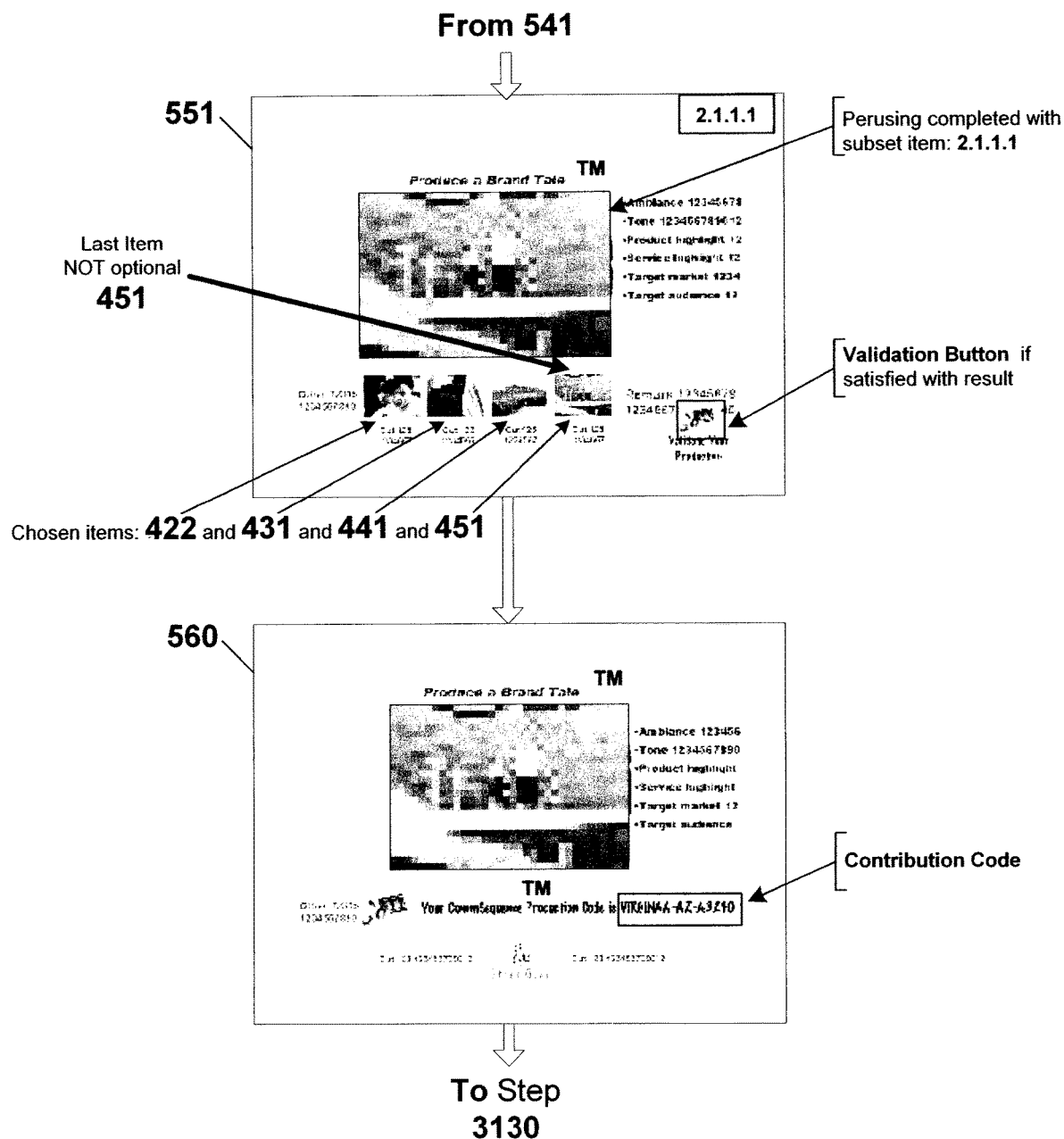
Figure 6A:
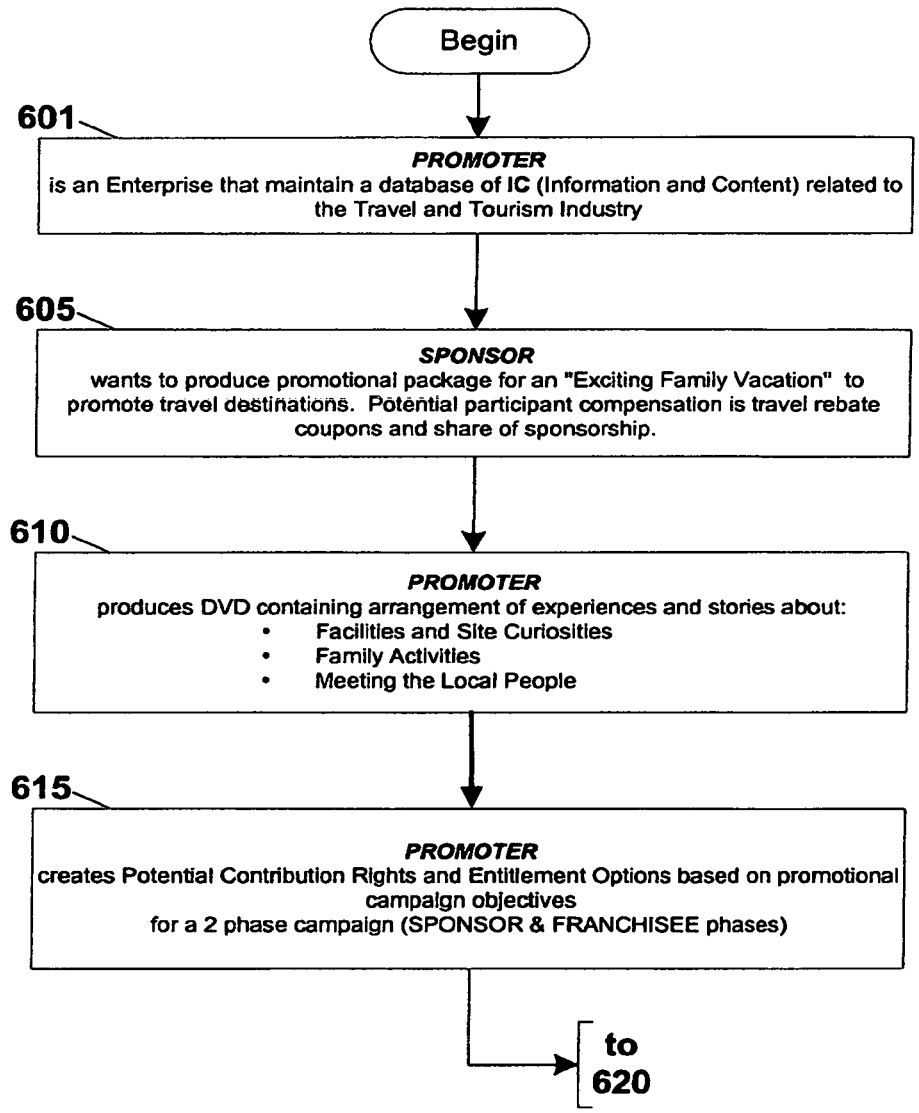
FIG. 6 consisting of FIG. 6A, FIG. 6B, FIG. 6C, FIG. 6D, FIG. 6E and FIG. 6F, contains a flowchart illustrating an exemplary process of an embodiment of the invention.
Figure 6C:
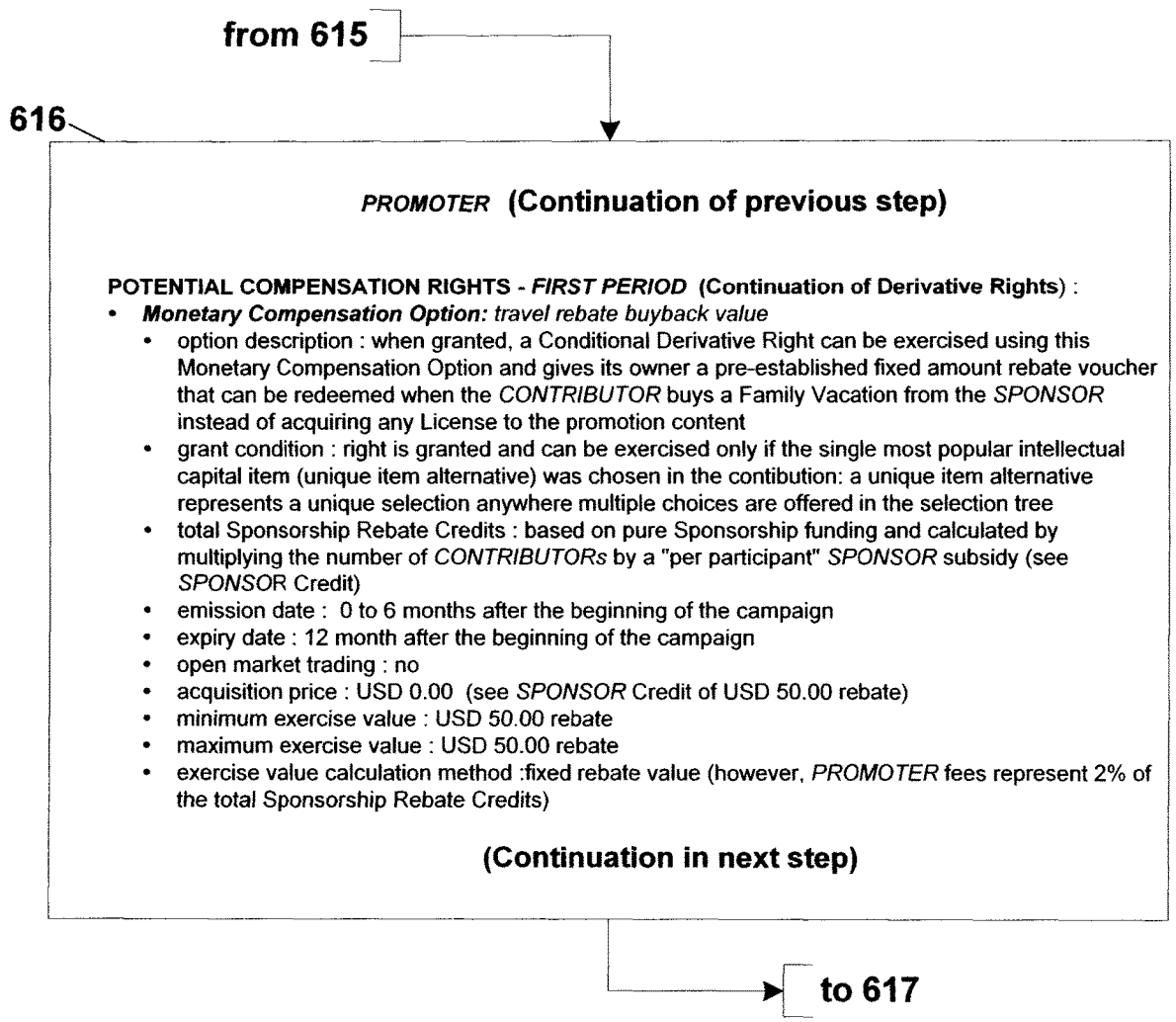
Figure 6D:
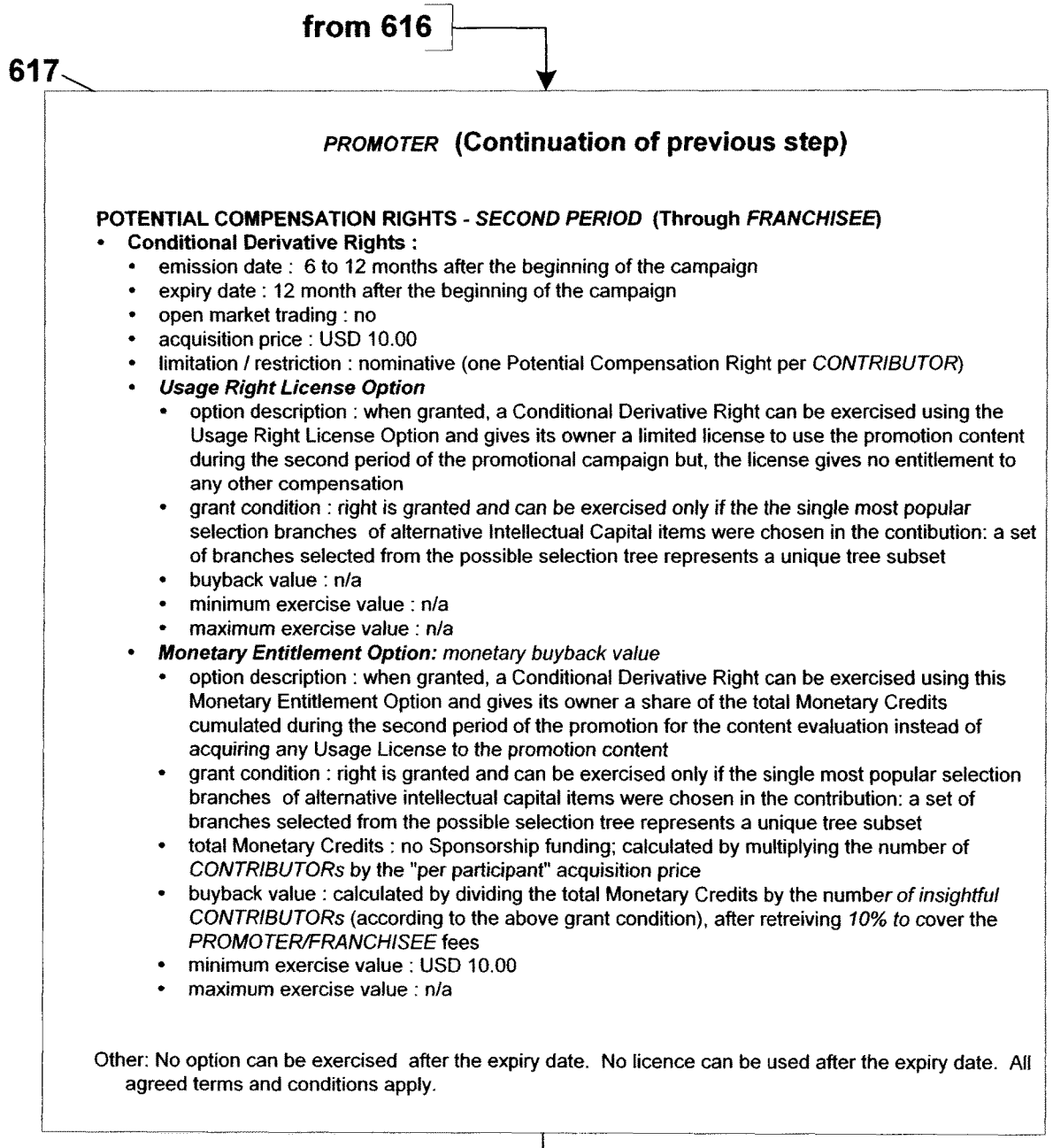
Figure 6E:
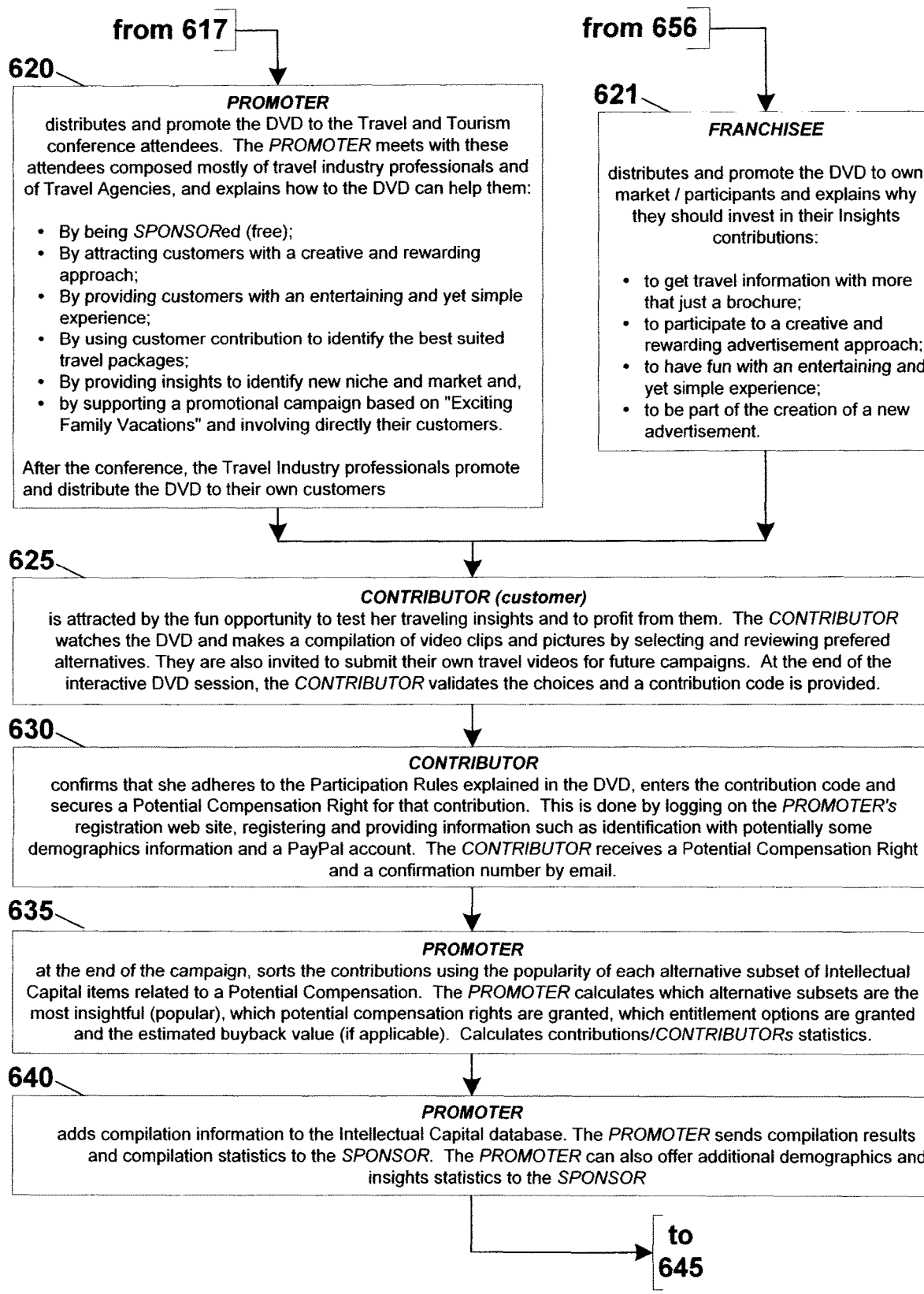
Figure 6F:
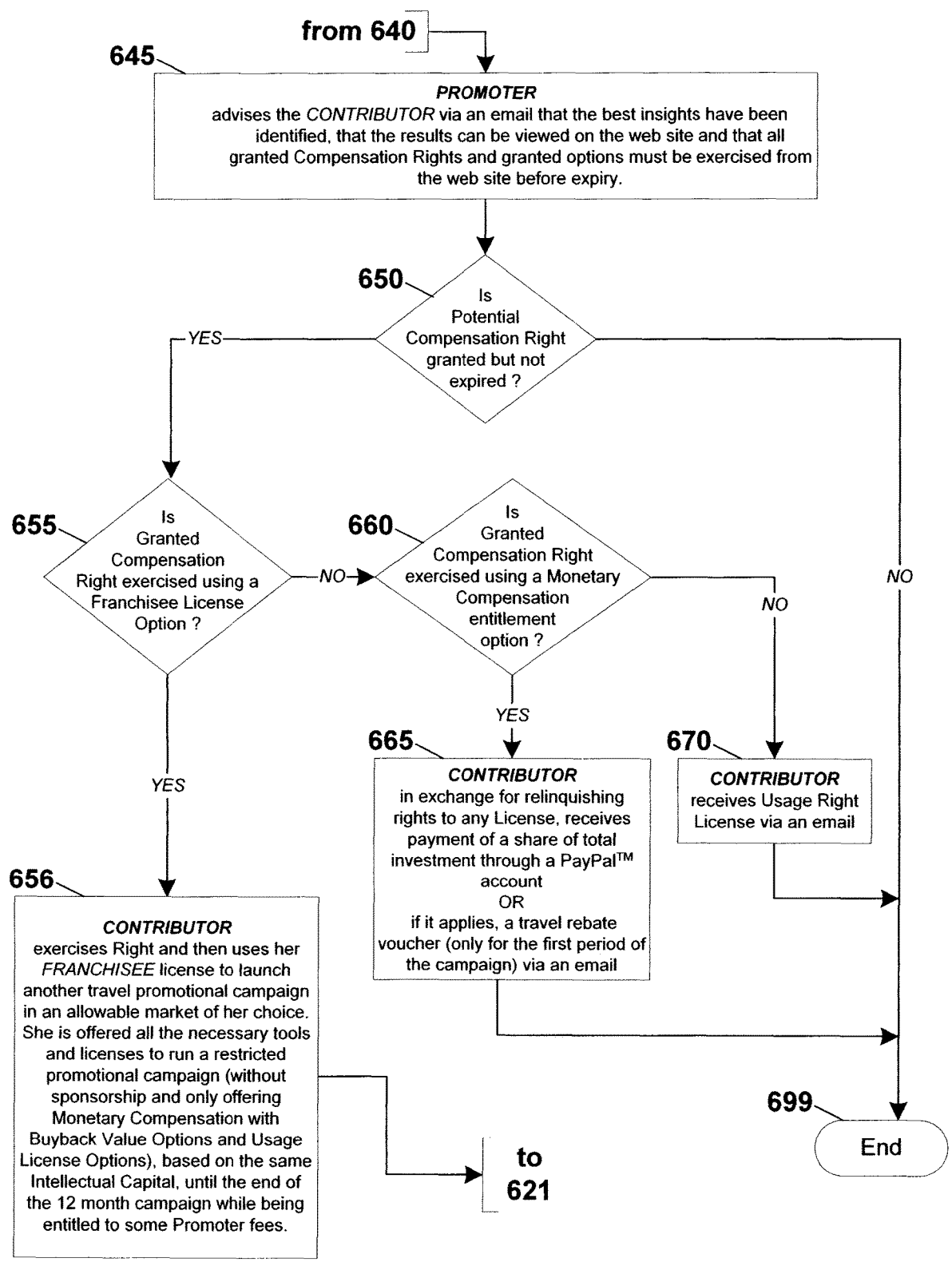

FIG. 5 shows an exemplary interface of the method and system of the present invention which give participants the ability to work on their contributions and to evaluate intellectual capital items. Different implementations of this interface can be readily apparent to those skilled in the art. In other embodiments, work on this interface could itself be part of a participant's requested contribution and any suggested interface would be included in the present invention. As described at step 3120 of the detailed process of FIG. 3, a contributor uses her knowledge and insights on a desired outcome to evaluate if some offered intellectual capital alternatives represent potential value. For clarity, this example of FIG. 5 reuses the same alternative hierarchical arrangement, the same alternative selection path (subset) numbering scheme and the same labeling used in FIG. 4.

A contributor is presented an interactive image 511 consisting of four items on the left (repeated labels 421, 422, 423 and 424 from FIG. 4). In this example, these items are video clips. The contributor clicks each item to peruses them, including the one labeled 422 as shown in 522. After choosing the item labeled 422 by clicking on it in the center window, the contributor is presented the interactive image 530 with a new set of four items on the left. The previously chosen item 422 is also shown at the bottom of the image 530 and can be clicked on if the contributor wants make a change to that selection. Again, the contributor peruses all items including the one labeled 431 as shown in 531. After choosing item labeled 431, the contributor is presented the interactive image 540 with a new set of four items. The two previously chosen items 422 and 431 are also shown at the bottom of the image 540 and can be clicked on if the contributor wants to change her selection. Once more, the contributor peruses all items including the one labeled 441 as shown in 541. After choosing item labeled 441, the contributor is presented the interactive image 551 with a final and non-optional item at the bottom of the image which is labeled 451. In that image, the contributor is shown a video in the center window that comprise all chosen items in sequence. This video represent the chosen alternative subset of items. The three previously chosen items 422, 431 and 441 in addition to the mandatory item 451 are all shown at the bottom of the image 551. After reviewing her choices while considering the desired outcome, the contributor can make changes to previous selections by clicking on the item at the bottom of the image 551. When the contributor is satisfied with her choices, she clicks on the validation button. The contributor is then presented a last image showing the final selection and the associated contribution code based on the unique selection path (or alternative subset number). In another embodiment, the interactive image could offer a scrolling capability to increase the number of items and selections. In yet another embodiment, the interactive image could include text and sound descriptions.

FIG. 6 shows an exemplary process of a preferred embodiment of the present invention where some of the steps from the detailed exemplary process of FIG. 3 are combined for clarity. Again, this implementation of the present invention is provided as an example and different embodiments can be readily apparent to those skilled in the art. This embodiment demonstrates multiple aspects of the present invention, from the creation of multiple participant incentives and contribution evaluation criteria to the development and production of advertisement material. In this example, a Promoter who is an independent publisher uses an intellectual capital database containing professional or amateur items related to the travel domain 601 and works with a Sponsor 605 to develop a value add travel industry marketing campaign and advertisement such as new material, brochures, photos, videos clips and web pages. After agreeing with the Sponsor on the need to promote different destinations and to get insights from potential customers, the Promoter selects content from the database and builds an arrangement with different alternatives subsets of intellectual capital items based on three advertisement themes 610. These subsets, hierarchically assembled as proposed in FIG. 4, are burned on a promotional DVD. More details of the data structure used on the DVD are specified in the description of the Database 110 above. In other embodiment, this arrangement could be the result of a prior contribution and compilation process. It could also be stored in any computer readable medium or be presented as a physical arrangement of products or product improvements used to work on contributions and to a create new economically sound product combination. The Promoter then creates potential compensation rights with license and buyback entitlement options for all of the proposed subsets of intellectual capital items associated to potential compensation as shown in 615. The promotional campaign in this example consists of two consecutive periods. During the first period, the created potential compensation rights present two types of buyback options and a Franchisee Right license option. During the second period, only one type of buyback option and a Usage Right license option are presented. When granted and depending on its type, a buyback option gives its owner the right to a calculated share of the sponsored promotional funding or the right to a pre-established promotional value incentive. The Franchisee Right license option is offered during the first period of the campaign and is valid during the second period while the Usage Right license option is offered during the second period. All potential compensation rights are nominative (one per distinct Contributor) and will be allocated to identifiable customers who register and contribute to the creation of the advertisement. More specifically, the evaluation criteria and the potential compensation rights are:

Campaign Schedule:
- The promotional campaign will last 12 months and consist of two 6 months periods (SPONSOR and FRANCHISEE phases);
- CONTRIBUTORs will be invited to submit their contributions in the first 6 months;
- First period results will be compiled after 6 months;
- First period potential compensations can be claimed during the second 6 month period;
- CONTRIBUTORs will be invited to submit new contributions in the second 6 month period;
- Second period results will be compiled at the end of the second period;
- Second period potential compensations can be claimed during the 6 months following the end of the second period;

POTENTIAL COMPENSATION RIGHTS—FIRST PERIOD (Derivative Rights):
- emission date: 0 to 6 months after the beginning of the campaign
- expiry date: 12 month after the beginning of the campaign
- open market trading: no
- acquisition price: USD 0.00 (SPONSOR Credit of USD 10.00 or USD 50.00 rebate)
- limitations/restrictions: nominative (one Potential Compensation Right per CONTRIBUTOR)

1. FRANCHISEE Right License Option
   - option description: when granted, a Conditional Derivative Right can be exercised using the promotional content and the FRANCHISEE License Option and gives its owner a limited license to use and repeat the present promotion process, during the second period of the promotional campaign, and to collect 50% of the Promoter fees
   - grant condition: right is granted and can be exercised only if the single most popular selection branches of alternative intellectual capital items were chosen in the contribution: a set of branches selected from the possible selection tree represents a unique tree subset
   - minimum exercise value: n/a
   - maximum exercise value: n/a
   - exercise value calculation method: n/a 2. Monetary Compensation Option: monetary buyback value
   - option description: when granted, a Derivative Right can be exercised using this Monetary Compensation Option and gives its owner a share of the total Sponsorship Monetary Credits allocated to the promotion content evaluation instead of acquiring any FRANCHISEE License to the promotional content
   - grant condition (evaluation criteria): right is granted and can be exercised only if the single most popular selection branches of alternative intellectual capital items were chosen in the contribution: a set of branches selected from the possible selection tree represents a unique tree subset
   - total Sponsorship Monetary Credits: based on pure Sponsorship funding and calculated by multiplying the number of CONTRIBUTORs by a "per participant" SPONSOR subsidy (see SPONSOR Credit)
   - minimum exercise value: USD 10.00
   - maximum exercise value: n/a
   - buyback value: calculated by dividing the total Sponsorship Monetary Credits by the number of insightful CONTRIBUTORs (according to the above condition criteria), after retrieving 10% to cover the PROMOTER fees 3. Monetary Compensation Option: travel rebate buyback value
   - option description: when granted, a Conditional Derivative Right can be exercised using this Monetary Compensation Option and gives its owner a pre-established fixed amount rebate voucher that can be redeemed when the CONTRIBUTOR buys a Family Vacation from the SPONSOR instead of acquiring any License to the promotional content
   - grant condition: right is granted and can be exercised only if the single most popular intellectual capital item (unique item alternative) was chosen in the contribution: a unique item alternative represents a unique selection anywhere multiple choices are offered in the selection tree
   - total Sponsorship Rebate Credits: based on pure Sponsorship funding and calculated by multiplying the number of CONTRIBUTORs by a "per participant" SPONSOR subsidy (see SPONSOR Credit)
   - emission date: 0 to 6 months after the beginning of the campaign
   - expiry date: 12 month after the beginning of the campaign
   - open market trading: no
   - acquisition price: USD 0.00 (see SPONSOR Credit of USD 50.00 rebate)
   - minimum exercise value: USD 50.00 rebate
   - maximum exercise value: USD 50.00 rebate
   - exercise value calculation method: fixed rebate value (however, PROMOTER fees represent 2% of the total Sponsorship Rebate Credits)

POTENTIAL COMPENSATION RIGHTS—SECOND PERIOD (Through FRANCHISEE) Conditional Derivative Rights (provided by FRANCHISEE to participants):
- emission date: 0 to 12 months after the beginning of the campaign
- expiry date: 12 month after the beginning of the campaign
- open market trading: no
- acquisition price: USD 10.00
- limitation/restriction: nominative (one Potential Compensation Right per CONTRIBUTOR)

1. Usage Right License Option
   - option description: this right is immediately granted when acquired (not conditional) and deemed exercised (participant immediately gets that license)
   - Usage Right License Option and gives its owner a limited license to use the promotion content during the promotional campaign and participant can use it to compare and compete with friends on their opinion about the resulting advertisement
   - grant condition: right is immediately granted independently of the contribution or the coming results
   - buyback value: n/a
   - minimum exercise value: n/a
   - maximum exercise value: n/a 2. Monetary Entitlement Option: monetary buyback value
   - option description: when granted, a Conditional Derivative Right can be exercised using this Monetary Entitlement Option and gives its owner a share of the total Monetary Credits cumulated during the second period of the promotional content evaluation
   - grant condition: right is granted and can be exercised only if the single most popular selection branches of alternative intellectual capital items were chosen in the contribution: a set of branches selected from the possible selection tree represents a unique tree subset total Monetary Credits: no Sponsorship funding; calculated by multiplying the number of CONTRIBUTORs by the "per participant" acquisition price buyback value: calculated by dividing the total Monetary Credits by the number of insightful CONTRIBUTORs (according to the above grant condition), after retrieving 10% to cover the PROMOTER/FRANCHISEE fees minimum exercise value: USD 10.00 maximum exercise value: n/a

Other: No option can be exercised after the expiry date. No license can be used after the expiry date. All agreed terms and conditions apply.

During a conference for the travel and tourism industry, the Promoter promotes the Sponsor and its products by explaining the objective and value of the promotional campaign and by distributing the promotional DVD to conference attendees 620. The PROMOTER meets with these attendees composed mostly of travel industry professionals and of Travel Agencies, and explains how to the DVD can help them: By being SPONSORed (free); By attracting customers with a creative and rewarding approach; By providing customers with an entertaining and yet simple experience; By using customer contribution to identify the best suited travel packages; By providing insights to identify new niche and market; and, by supporting a promotional campaign based on "Exciting Family Vacations" and involving directly their customers. Back home, the conference attendees themselves use this innovative promotional approach, distribute the DVDs to their own end customers and promote the Sponsor and the promotional approach. These customers are attracted by the opportunity offered by this campaign and decide to become Contributors (active participants) for the campaign 625. In addition to be entertaining and informative, this promotional campaign gives customers a sense of ownership by making them feel that they are contributing to the creation of new brochure and other promotional material and by compensating the best suited traveling insights in cash, with rebates or even with some promotional license rights. Each Contributor uses the DVD to create a preferred travel advertisement. The interface used could resemble the one shown in FIG. 5. Once a final choice of alternatives is made and validated, the Contributor is shown a contribution code on her screen. The DVD also invites the Contributor to submit personal travel content for potential future advertisements. Using instructions and participation rules provided on the DVD and other features if the DVD is used on a networked device, the Contributor goes to the Promoter's Internet web site, logs in or create her Contributor account 630 and enters the contribution code. The Contributor account is used to identify the Contributor and any required transactional information such as an email address and a payment method. As a result of entering all the required information, an email containing the potential compensation right is sent to the Contributor. At the end of the first period of the promotional campaign, the advertisement creation is closed to any further contribution.

The Promoter compiles the most valuable advertisements (a specific alternative subset), the preferred single item based on all valid contributions as well as contribution/contributor statistics 635. The Promoter also calculates the estimated value of the monetary buyback option. The resulting most popular advertisement and any new knowledge acquired from this compilation is added to the intellectual capital database and also sent to the Sponsor along with other compiled data, instructions and statistics 640. Promoter also uses production devices such as DVD burners, professional printing devices and automatic web page generators to produce new value add promotional material such as DVDs, brochures and web pages. All Contributors are contacted by email and invited to go see the compilation results 645. The most Insightful Contributors, meaning those owning potential compensation rights that have met the grant condition as explained in steps 615 and 616, can then exercise their granted compensation rights before their expiry date 650. During the first period of the campaign and depending on the grant conditions that have been met, granted compensation rights can be exercised using the monetary buyback option or the travel rebate buyback option 660 or the Franchisee License Right options 655. The Contributor exercising her granted compensation right using the monetary buyback option 660 collects a share of the total sponsored monetary credit funding as explained in more details in step 615 of FIG. 6. The subsequent payment 665 to the Contributor is executed through PayPal™. The Contributor exercising her granted compensation right using the travel rebate buyback option however will receive a travel rebate voucher through email 665.

Alternatively, a Contributor may decide to exercise her granted compensation right using the Franchisee License option as explained in step 615. In such case, the Contributor receives a license that gives her the right to act as a Franchisee 656 of the promotion campaign. During the second period of the promotional campaign and with the support from the Promoter and of her services, the Franchisee promotes the Sponsor and its products to a new market that may be assigned by the Promoter. A Franchisee web page, copies of the DVD with their own unique contribution codes and other services may be provided by the Promoter for assisting the Franchisee in handling the campaign. Optionally, this second period of the campaign could be carried completely over a different medium such as the Internet. Similarly to the role of the Promoter during the first period, the Franchisee must approach her market by explaining the objective and value of the promotional campaign and by distributing the promotional DVD 621. The main difference of this second period of the campaign is that the offered potential compensation rights can only be exercised in step 660 using a monetary buyback option 665 or a Usage License Right option 670 as explained in more details in step 615. In exchange for promotional efforts, the Franchisee is entitled to 50% of the Promoter fees. In step 675, since Promoter owns the intellectual capital and the licenses to the new value add material, Promoter sells that produced material to parties in the travel industry who want to offer this new type of product offering to their own customers. Step 699 represents the end of the process where no more Contributor compensation is due.

Other Preferred Embodiments

The following description is presented to enable one of ordinary skill in the art to make and use the invention. Descriptions of specific embodiments, field of embodiment and applications are provided only as examples and various modifications or crossover embodiments will be readily apparent to those skilled in the art. The general principles described herein may be applied to other embodiments and applications including products from other output or production devices without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Product and Service Development Embodiments:

The unique contributive nature of the present invention improves the effectiveness of the identification, creation, development and marketing activities around products and services. This is achieved by attracting sponsorship and funding for these activities, by generating customer engagement and commitment and by rewarding valuable insights through ownership incentives related to the resulting creations. Without being limited to them, the potential applications of the present invention range from decision making actions to product and service development in any domains of activity such as the retail industries, the communications, media, publishing and gaming industries as well as other domains such as science, research, education or social, political and philanthropic activities.

Retail, Goods and Services Related Embodiments:

In one embodiment of the present invention, the retail industry may create an incentive to get customers to buy and compare a list of alternative products such as different food items, clothes or skin care products. The initiative could be sponsored by a manufacturer. The desired outcome may be the identification of different times or occasions to use the different products. Another outcome may be the identification of the best distinct use for the goods. Customers would submit their proofs of purchase of all alternatives through the Internet, including their suggestions or choices. Customers choosing the most popular suggestions for each good would then be compensated according to the popularity of the suggestions and to the sponsorship fund. In addition to stimulate sales, such an initiative helps the sponsor to identify the future positioning of its products, including potential product changes that may be required or even the termination of a product line that does not show relevancy for customers.

In one embodiment, customers or retail store owners may be offered to buy a stake in different proposed clothing production alternatives and get a compensation if her investment contribution was amongst the most popular. The compensation may be a redistribution of the total investment made by all participants on all proposed clothing alternatives. The compensation may also be the right to resell the product, the right to a discounted product, the right to get royalties on future sales or even the right to launch another similar clothing creation campaign. For example, a t-shirt manufacturer on the internet could offer for valuation by participants different t-shirt models including different colors, printed logos, image, video snapshots or slogans. Participants could be requested to invest in the model they believe would be the most commercially popular for beach parties. After a computer compilation, the most insightful participants would receive a compensation in cash or maybe in t-shirt(s). The produced t-shirt could also mention "I PRODUCED THIS T-SHIRT at www.IPRODUCEDTHIST-SHIRT.com, so can YOU!"

In one embodiment, customers could be requested to smell different scents, register their preferences on a computer server and invest in the creation of a new kid shampoo perfume. The most insightful contributors would get royalties from future sales. The same approach could be used to create new tastes or dishes. As a result of their contributions and more importantly, of their ownership benefits, the most insightful customers can become direct promoters of products and services.

Branding and Advertising Related Embodiments:

In one embodiment related to the communications and marketing domain, the present invention may be used to create an incentive to get customers to decide which advertisement and/or which sequence of advertisements they want to be exposed to. For example, an advertiser may reserve multiple advertising time slots during a broadcasted program or multiple pages in a printed magazine. In a first advertisement, the advertiser would ask its audience to submit their insights into the most appropriate choice of subjects or products for subsequent advertising time slots or issues. These contributions could be registered on the remote server through Interactive TV, using the Internet, using SMS with mobile phones, through automated phone services or using any other appropriate communication mechanism. Based on the appropriateness of an advertisement in a given advertising context or, on any other desired outcome, the most insightful participants would then be compensated. In a variant embodiment, pre-programmed advertisements would be evaluated by an audience and the audience profile that is the most representative of the complete audience would be compensated. In yet another embodiment, an auction of advertising time slots for different products may be created whereas participants, and not the advertisers, would get to decide which product gets allocated which advertising time slot by using the method and system of the present invention and related incentives. In another embodiment, choices of product placements may be decided using the method of the present invention.

In one embodiment, customers may directly contribute to the creation of an advertisement. Prior to the publication or broadcast of an advertisement, participants would provide their insights relative to a desired outcome. A specific product may or may not already be identified. The most insightful participants would eventually be compensated. In one embodiment, basketball fans could buy "Regular" or "Producer" tickets to attend to a match of their favorite basketball team. A "Producer" ticket could carry a premium fee but would also give its owner a right to create an advertisement to be broadcasted during the game or at another appropriate time or location. For example, the participant could be asked to choose the message to advertise and the player(s) that should deliver the message.

In one embodiment using digital signage, automated call response systems or interactive voice responses services, customers could be requested to give suggestions while waiting for service and get a compensation, not just for their participation but for the value of their contribution based on other customer inputs and on resulting conclusions. Similarly, a billboard on the highway could show a standard or digital advertisement with a digital panel showing questions and choices of answers that could change every minute or so. Using mobile communication devices to reach a remote server, participants could contribute and, based on all contributions and/or choices made during any given minute, a result would be posted on a subsequent billboard or sent directly to the mobile device. For a sponsor, this creates a strong customer incentive to look for the billboard advertisement and to provide valuable market information. For the participant, in addition to the compensation, this represent an entertaining road experience combined to a sense of belonging to a connected crowd of commuters. The level of complexity and variations of such embodiment is only limited by the imagination of one skilled in the art.

Media, Programming and Scheduling Related Embodiments:

In addition and similarly to the example of FIG. 6, other travel or event programming embodiments of the present invention, potentially using different media, can be readily evident for those skilled it the art.

In one embodiment, news, entertainment, information programming or scheduling may be made by participants well in advance or only seconds prior to a unidirectional or interactive broadcast, netcast or webcast or, depending on the media, prior to any form of transmission including publishing. Programs and schedules are just other content that can be created, chosen and assembled based on customer insights while compensating the contributors of the best suited results using the method and system of the present invention. In a variant of such an embodiment, an Internet search engine could get contributors to acquire rights to their most preferred search results from their search inquiries. The search engine and the search service provider could recommend these filtered results and even offer them in a manner similar to the currently offered sponsored links and subsequently reward the insightful contributors.

In one embodiment, news or other content readers may collectively choose which recent and/or archived information, from specific or any content sources, is best suited to the creation of an aggregate information compilation. The resulting content may then be used or published and contributors may be compensated using the method and system of the present invention. As an added feature that can be readily evident for those skilled in the art, weighting or rating factors such as bias, fairness, relevance, affiliation or other qualifiers, could be used in the valuation process and could even be added to the resulting content. In a further embodiment, the content used can represent any information, media or format that can be assembled using the appropriate output or production device.

The present invention is a tool that can convert the traditional subscription and sponsored based media access, which still applies even when co-creation is used, into an content ownership based media distribution.

Copyrighted Material and Other Intellectual Property Related Embodiments:

In one embodiment of the present invention, the media and publishing industry may create the necessary incentive to get customers to themselves protect, promote and even enforce the protection of intellectual property rights. By substituting the standard intellectual property usage rights for different ownership and distribution rights tied to shared benefits, the present invention converts intellectual property customers into intellectual property producers and promoters. As an example, book, music or movie customers may be requested to collectively rate and/or compile stories, songs or movies they have perused, rented or bought while also acquiring or buying rights to some of their choices. A desired outcome of such valuation and compilation contributions could be the identification of which story, song or movie is the most interesting at the present moment. Another desired outcome could be the identification of which of them is the most prone to become a classic in a given category. In an example related to music, a category could be rock, classical, grunge, pop, country or any combination of those and other music qualifiers. Similarly for movies, a category could be qualified as horror, drama, western, comedy, sci-fi, etc. In exchange for their contributions which themselves represent intellectual capital, the most insightful customers could be granted licenses to resell their chosen intellectual property(ies) and potentially, licenses to resell the right to resell their chosen intellectual property(ies). The created compilations can also be fed the a printer, DVD burner or any appropriate output or production device to produce and sell the collectively created product. As readily apparent to those skilled in the art, the present invention can create and even subsidize an open production and distribution mechanism that offers a powerful customer incentive to add value while protecting and promoting intellectual properties in an open world.

Moreover, in a world where comparative product information and knowledge is abundant, regular product and service choices made by customers may be converted into insights contributions through the use of the method and system of the present invention. Consequently, most customer buying decisions regarding tangible or intangible products and services can convey intellectual property rights and related benefits.

In other embodiments, any qualified selection, valuation or compilation of intellectual properties involving participants' insightful contributions, can be considered as "Work For Hire" covered by the method and system of the present invention. As such and with respect to the method and system of the present invention, these individual contributions once combined represent collective work, compilation work, audiovisual work, supplementary work, instructional texts, tests, test answers, translation, atlases, etc. that convey compensation for the most insightful contributors and valuable contributions; the insightfulness and value being defined by appropriate distinctive criteria when compare to the whole of the contributors.

Game Related Embodiments:

Board, video, interactive, Massive Multiplayer Online (MMO) and other game formats may use an embodiment of the present invention to create the necessary incentive to establish the equivalent of game focus groups or test panel initiatives. In a fun and entertaining environment, players could exercise, test and evaluate their insights about real and virtual matters, products or services. For example, players in a board trivia game could be requested to give insights and ratings on given topics and at some point during the game they would be requested to compare their answers with other players. Their investment in their contributions could be subsidized through the purchase of the game. By using a communication system such as the Internet to reach a remote server, contribution from players within a given region or throughout the world could be compiled and compensated. These questions and the tally of their answers could be revised dynamically. Contributors would need to show insightfulness on these questions and would be playing for real compensations. Variants of such a game could require players to develop or identify the best product price ranges or product slogans, or to be posted or already advertised in specific store chains. In addition to identifying fun promotional avenues, such games can convey valuable advertising insights. In return, these games would not only be entertaining but using the method and system of the present invention, they would be rewarding for their insightful players.

In other embodiments for the MMO virtual world, most if not all real word embodiment could apply, including branding and media embodiments, often without some of the real world constraints or restrictions.

In one embodiment, and as readily apparent to those skilled in the art, players or contributors could voluntarily be asked to collectively contribute to the design or to the creation of new games. Insightful contributors would benefit from their contributions as described by the method and system of the present invention.

Educational, Political, Social and Environmental Issues and Diverse Sponsoring Embodiments:

In other embodiments of the present invention related to social and environmental activities, the present invention may create the necessary incentive to attract insightful evaluators in order to review and contribute to the improvement and prioritization of legal, social or environmental initiatives and consequently, to contribute to the positive evolution of our society. By evaluating successful, promising or even inapt social choices, the application of the method and system of the present invention can support the creation of social responsibility programs and improve our society. The use of the present invention could subsidize increased presence and actions from law enforcement officers. In another embodiment, a similar social participation could support or subsidize the creation of billboard messages and proximity cell phone messaging alert, etc . . . to display any message or advertisement of social value. With the recognizance of the social value of the present invention, compensation for aware and alert contributions can become the trigger to increase social responsibility and social pride. A variant embodiment of the present invention could support a road infraction reporting service. In such an embodiment, people would voluntarily pay a given amount to report license plate numbers of witnessed speeding cars or of other wrongful behaviors. Contributors would feel good about finally having some power to react to such dangerous behaviors. They could also collect compensation based on all compiled reports and furthermore on an eventual police apprehension. Offenders could even be liable to compensate reporting contributors and therefore, according to the method and system of the present invention, act as an involuntary sponsor.

In other embodiments, the method and system of the present invention can be a sponsoring tool by giving access to an open world of contributors to any initiative, activity or event. Mobile communication devices could be alerted by a remote server when an event is reported in their vicinity and participants could be requested to collectively rate the event. In yet another embodiment, regular television programming and their ads could get contributions and investments from contributors who would rate their expectations and satisfaction related to the programming. This could happen before, during and even after airing and the programming could be segmented into multiple items and content details for contributions. Other events not related to broadcast media could be sponsored. The present invention provides the necessary motivations and incentives to get anyone to sponsor anything worth developing, evaluating and investing in. The present invention is in full support of the reasoning behind the attribution of patents since it openly gives the necessary motivations and incentives to get everyone involved in innovation while mitigating the creation of controlling forces often resulting from innovation investments by big or dominant entities.

Although the present invention has been described in accordance with the embodiments shown, one of ordinary skill in the art will readily recognize that there could be many variations made to the embodiments without departing from the scope of the present invention. Accordingly, it is intended that all matter contained in the above description and shown in the accompanying drawings shall be interpreted as illustrative and not in a limiting sense. The matter discussed and brought forward by the present invention shall prove to be a shifting thinking approach to markets and values and, as such, shall hopefully be recognized by all for its contribution to a better society.

What is claimed is:

1. A system corresponding to an online collaborative content management system and operating with a data structure that enables developing and evaluating and marketing products based on derivative rights, comprising:
 a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
  a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
  b) one entitled grouping, which entitled groupings each represents a grouping of at least one set from the sets, each entitled grouping being associated with at least one of the entitlement options; and
  c) at least one said conditional entitlement defined by at least one of the entitlement options comprising at least one specific right representing an entitlement related to and/or a permissible use of at least one of the content items once said at least one of the content items is classified as part of one or more valuable product information;
 the system being configured to at least:
 communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;
 receive, in the server, responses from multiple user devices from the plurality of the user devices, and identify in the server as contributions a plurality of the received responses, and store the contributions in the server,
  a) which received responses result from each user device from the multiple user devices receiving at least one of the descriptions of a plurality of given sets and using the described given sets to at least:
   (i) offer to its user an arrangement of content items by using and conveying, in the arrangement, the data structure associations of the described given sets and of their subsets of identified content items, and
   (ii) associate at least one discriminating user rating with at least one of the subsets comprised in each of a plurality of the described given sets,
    each of the subsets associated with a rating representing a rated subset, and each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;

create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicate from the server, to each of at least one of the contributor devices from which at least one of the contributions was received, at least one of the contribution options that associates the received at least one of the contributions with one of the entitlement options;

generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and classify in the server, as said valuable product information, each of one or of a plurality of the content items identified by at least one of the subsets from at least one of the insight groupings;

detect in the server at least one contribution options that each associates one of the entitlement options with one of the contributions that describes one or a plurality of rated subsets which corresponds, according to the described data structure associations, to one or to a plurality of the subsets from one of the insight grouping;

receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met.

2. A system corresponding to an online collaborative content management system and operating with a data structure that enables developing and evaluating and marketing products based on derivative rights, comprising:

a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and b) one entitled grouping, which entitled groupings each represents a grouping of at least one set from the sets, each entitled grouping being associated with at least one of the entitlement options;

the system being configured to at least:

communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server, a) which received responses result from each user device from the multiple user devices receiving at least one of the descriptions of a plurality of given sets and using the described given sets to at least:

(i) offer to its user an arrangement of content items by using and conveying, in the arrangement, the data structure associations of the described given sets and of their subsets of identified content items, and (ii) associate at least one discriminating user rating with at least one of the subsets comprised in each of a plurality of the described given sets, each of the subsets associated with a rating representing a rated subset, and each user rating being indicative of a comparative user evaluation of how well a given subset of identified content items relates to the desired outcome when compared to other subsets within the same described given set, and
each user rating being indicative of at least a user selection or a user tagging of one of the rated subsets of identified content items, and
(iii) generate a response and communicate the generated response to the server which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;
create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
communicate from the server, to each of at least one of the contributor devices from which at least one of the contributions was received, at least one of the contribution options that associates the received at least one of the contributions with one of the entitlement options;
generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and
classify in the server, as valuable product information, each of one or of a plurality of the content items identified by at least one of the subsets from at least one of the insight groupings;
detect in the server at least one contribution options that each associates one of the entitlement options with one of the contributions that describes one or a plurality of rated subsets which corresponds, according to the described data structure associations, to one or to a plurality of the subsets from one of the insight grouping;
receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met;
collect in the server, from a plurality of the user devices, a plurality of granting authorizations, said collecting of a plurality of granting authorizations representing one said granting condition which must be detected to have been met prior to said grant.

3. A system corresponding to an online collaborative content management system and operating with a data structure that enables developing and evaluating and marketing products based on derivative rights, comprising:
a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
b) one entitled grouping, which entitled groupings each represents a grouping of at least one set from the sets, each entitled grouping being associated with at least one of the entitlement options;
the system being configured to at least:
modify in the server, the data structure by changing the described data structure associations of at least one of the data records, and/or by adding at least one entitled grouping to the described data structure associations, and/or by adding at least one data record to the described data structure associations and adding at least one content item each being identified by one of the added data records, and/or by changing in the described data structure associations at least one of the content items identified by at least one of the data records, and/or by adding to the described data structure associations at least one entitlement option and associating it with at least one of the entitled groupings, and/or by removing and/or by changing in the described data structure associations at least one of the entitlement options, while respecting said at least described associations indication;
communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;
receive, in the server, responses from multiple user devices from the plurality of the user devices, and identify in the server as contributions a plurality of the received responses, and store the contributions in the server,
a) which received responses result from each user device from the multiple user devices receiving at least one of the descriptions of a plurality of given sets and using the described given sets to at least:
(i) offer to its user an arrangement of content items by using and conveying, in the arrangement, the data structure associations of the described given sets and of their subsets of identified content items, and
(ii) associate at least one discriminating user rating with at least one of the subsets comprised in each of a plurality of the described given sets,
each of the subsets associated with a rating representing a rated subset, and
each user rating being indicative of a comparative user evaluation of how well a given subset of identified content items relates to the desired outcome when compared to other subsets within the same described given set, and
each user rating being indicative of at least a user selection or a user tagging of one of the rated subsets of identified content items, and
(iii) generate a response and communicate the generated response to the server
which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;
create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
communicate from the server, to each of at least one of the contributor devices from which at least one of the contributions was received, at least one of the contribution options that associates the received at least one of the contributions with one of the entitlement options;
generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and
classify in the server, as valuable product information, each of one or of a plurality of the content items identified by at least one of the subsets from at least one of the insight groupings;
detect in the server at least one contribution options that each associates one of the entitlement options with one of the contributions that describes one or a plurality of rated subsets which corresponds, according to the described data structure associations, to one or to a plurality of the subsets from one of the insight grouping;
receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met.

4. A system corresponding to an online collaborative content management system and operating with a data structure that enables developing and evaluating and marketing products based on derivative rights, comprising:
a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
b) one entitled grouping, which entitled groupings each represents a grouping of at least one set from the sets, each entitled grouping being associated with at least one of the entitlement options; and
c) a plurality of the content items and/or of elements of the described data structure associations, including one or more of the sets and/or a plurality of the subsets of data records, comprising and/or being made up and/or being associated using interactive, structuring, dynamic and/or hypertext type code that describes the data structure associations and configures user devices for offering an arrangement and associating user ratings and generating responses;
the system being configured to at least:
communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server, a) which received responses result from each user device from the multiple user devices receiving at least one of the descriptions of a plurality of given sets and using the described given sets to at least:
  (i) perform said offering to its user of an arrangement of content items by using and conveying, in the arrangement, the data structure associations of the described given sets and of their subsets of identified content items, and
  (ii) perform said associating of at least one discriminating said user rating with at least one of the subsets comprised in each of a plurality of the described given sets,
    each of the subsets associated with a rating representing a rated subset, and
    each user rating being indicative of a comparative user evaluation of how well a given subset of identified content items relates to the desired outcome when compared to other subsets within the same described given set, and
    each user rating being indicative of at least a user selection or a user tagging of one of the rated subsets of identified content items, and
  (iii) perform said generating responses and communicate the generated response to the server
    which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;

create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicate from the server, to each of at least one of the contributor devices from which at least one of the contributions was received, at least one of the contribution options that associates the received at least one of the contributions with one of the entitlement options;

generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and classify in the server, as valuable product information, each of one or of a plurality of the content items identified by at least one of the subsets from at least one of the insight groupings;

detect in the server at least one contribution options that each associates one of the entitlement options with one of the contributions that describes one or a plurality of rated subsets which corresponds, according to the described data structure associations, to one or to a plurality of the subsets from one of the insight grouping;

receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met.

5. A system corresponding to an online collaborative content management system and operating with a data structure that enables developing and evaluating and marketing products based on derivative rights, comprising:

a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
  a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
  b) one entitled grouping, which entitled groupings each represents a grouping of at least one set from the sets, each entitled grouping being associated with at least one of the entitlement options;

the system being configured to at least:

communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server, a) which received responses result from each user device from the multiple user devices receiving at least one of the descriptions of a plurality of given sets and using the described given sets to at least:

(i) offer to its user an arrangement of content items by using and conveying, in the arrangement, the data structure associations of the described given sets and of their subsets of identified content items, and (ii) associate at least one discriminating user rating with at least one of the subsets comprised in each of a plurality of the described given sets, each of the subsets associated with a rating representing a rated subset, and each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;

create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

receive in the server a specified investment related to each of at least one of the contributions, which specified investment represents an indication of at least one of: a receiving of the at least one of the contributions; or a receiving of a confirmation of a transaction made in relation to the at least one of the contributions; or a pre-specified action or transaction;

communicate from the server, to each of at least one of the contributor devices from which at least one of the contributions was received, at least one of the contribution options that associates the received at least one of the contributions with one of the entitlement options;

generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and classify in the server, as valuable product information, each of one or of a plurality of the content items identified by at least one of the subsets from at least one of the insight groupings;

detect in the server at least one contribution options that each associates one of the entitlement options with one of the contributions that describes one or a plurality of rated subsets which corresponds, according to the described data structure associations, to one or to a plurality of the subsets from one of the insight grouping;

receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met.

6. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:

a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item;

b) at least one grouping of at least one of the sets with their comprised subsets of data records, which groupings are each associated with one or more of the derivative rights;

c) at least one said conditional right comprising at least one specific right representing an entitlement related to and/or a permissible use of at least one of the content items once said at least one of the content items is classified as part of one or more valuable product information;

the system being configured to at least:

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses, a) which received responses result from each of the multiple user devices receiving at least one of the descriptions of a plurality of given sets of subsets of identified content items and using the received description of given sets to at least:
     (i) offer to its user an arrangement of the content items reflecting the data structure associations of the received description of given sets of subsets,
     (ii) associate at least one discriminating user rating with each of at least one of the subsets comprised in each of a plurality of the received description of given sets, each of the subsets associated with a rating representing a rated subset,
     (iii) generate and communicate a response to the server, which generated response describes at least one of the rated subset based on the received description of given sets of subsets,
   b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as said valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices.

7. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
   b) one entitled grouping, which entitled grouping each represents a grouping of at least one set from the sets, each entitled grouping being associated with at least one of the entitlement options; and
   c) at least one said conditional entitlement defined by at least one of the entitlement options comprising at least one specific right representing an entitlement related to and/or a permissible use of at least one of the content items once said at least one of the content items is classified as part of one or more valuable product information;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server, a) which received responses result from each user device from the multiple user devices receiving at least one of the descriptions of a plurality of the given sets and using the described given sets to at least:
     (i) offer to its user an arrangement of content items by using and conveying, in the arrangement, the data structure associations of the described given sets and of their subsets of identified content items, and
     (ii) associate at least one discriminating user rating with at least one of the subsets comprised in each of a plurality of the described given sets,
       each of the subsets associated with a rating representing a rated subset, and
       each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as said valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met.

8. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and b) one entitled grouping, which entitled grouping each represents a grouping of at least one set from the sets, each entitled grouping being associated with at least one of the entitlement options;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server, a) which received responses result from each user device from the multiple user devices receiving at least one of the descriptions of a plurality of the given sets and using the described given sets to at least:

(i) offer to its user an arrangement of content items by using and conveying, in the arrangement, the data structure associations of the described given sets and of their subsets of identified content items, and (ii) associate at least one discriminating user rating with at least one of the subsets comprised in each of a plurality of the described given sets, each of the subsets associated with a rating representing a rated subset, and each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met;

collecting in the server, from a plurality of the user devices, a plurality of granting authorizations, said collecting of a plurality of granting authorizations representing one said granting condition which must be detected to have been met prior to said granting.

9. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and b) one entitled grouping, which entitled grouping each represents a grouping of at least one set from the sets, each entitled grouping being associated with at least one of the entitlement options;

modifying in the server the data structure by changing the described data structure associations of at least one of the data records, and/or by adding at least one entitled grouping to the described data structure associations, and/or by adding at least one data record to the described data structure associations and adding at least one content item each being identified by one of the added data records, and/or by changing in the described data structure associations at least one of the content items identified by at least one of the data records, and/or by adding to the described data structure associations at least one entitlement option and associating it in the described data structure associations with at least one of the entitled groupings, and/or by changing and/or by removing in the described data structure associations at least one of the entitlement options, while respecting said at least described associations indication;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server, a) which received responses result from each user device from the multiple user devices receiving at least one of the descriptions of a plurality of the given sets and using the described given sets to at least:
   (i) offer to its user an arrangement of content items by using and conveying, in the arrangement, the data structure associations of the described given sets and of their subsets of identified content items, and
   (ii) associate at least one discriminating user rating with at least one of the subsets comprised in each of a plurality of the described given sets,
      each of the subsets associated with a rating representing a rated subset, and
      each user rating being indicative of a comparative user evaluation of how well a given subset of identified content items relates to the desired outcome when compared to other subsets within the same described given set, and
      each user rating being indicative of at least a user selection or a user tagging of one of the rated subsets of identified content items, and
   (iii) generate a response and communicate the generated response to the server which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met.

10. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
   a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
   b) one entitled grouping, which entitled grouping each represents a grouping of at least one set from the sets, each entitled grouping being associated with at least one of the entitlement options; and
   c) a plurality of the content items and/or of elements of the described data structure associations, including one or more of the sets and/or a plurality of the subsets of data records, being made up and/or being associated using interactive, structuring, dynamic and/or hypertext type code that describes the data structure associations and configures user devices for offering of an arrangement and associating of user ratings and generating responses;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server,
  a) which received responses result from each user device from the multiple user devices receiving at least one of the descriptions of a plurality of the given sets and using the described given sets to at least:
    (i) perform said offering to its user of an arrangement of content items by using and conveying, in the arrangement, the data structure associations of the described given sets and of their subsets of identified content items, and
    (ii) perform said associating of at least one discriminating said user rating with at least one of the subsets comprised in each of a plurality of the described given sets,
      each of the subsets associated with a rating representing a rated subset, and
      each user rating being indicative of a comparative user evaluation of how well a given subset of identified content items relates to the desired outcome when compared to other subsets within the same described given set, and
      each user rating being indicative of at least a user selection or a user tagging of one of the rated subsets of identified content items, and
    (iii) perform said generating responses and communicate the generated response to the server which generated response describes at least one of the rated subsets with its associated rating based on the received descriptions of given sets,
  b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;
creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
communicating from the server, to each of at least one of the contributor devices from which at least one of the contributions was received, at least one of the contribution options that associates the received at least one of the contributions with one of the entitlement options;
generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;
detecting in the server, at least one contribution options that each associates one of the entitlement options with one of the contributions that describes one or a plurality of rated subsets which corresponds, according to the described data structure associations, to one or to a plurality of the subsets from one of the insight groupings;
receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met.

11. A method of operating an online collaborative content management system, using a data structure that enables developing and evaluating and marketing products based on derivative rights, the method using a server and user devices, which user devices each corresponds to a user of the method, the method comprising:
  creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
    a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
    b) one entitled grouping, which entitled grouping each represents a grouping of at least one set from the sets, each entitled grouping being associated with at least one of the entitlement options;
  communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings,
  receiving, in the server, responses from multiple user devices from the plurality of the user devices, and identifying in the server as contributions a plurality of the received responses, and storing the contributions in the server,
a) which received responses result from each user device from the multiple user devices receiving at least one of the descriptions of a plurality of the given sets and using the described given sets to at least:
(i) offer to its user an arrangement of content items by using and conveying, in the arrangement, the data structure associations of the described given sets and of their subsets of identified content items, and
(ii) associate at least one discriminating user rating with at least one of the subsets comprised in each of a plurality of the described given sets,
each of the subsets associated with a rating representing a rated subset, and
each user rating being indicative of a comparative user evaluation of how well a given subset of identified content items relates to the desired outcome when compared to other subsets within the same described given set, and
each user rating being indicative of at least a user selection or a user tagging of one of the rated subsets of identified content items, and
(iii) generate a response and communicate the generated response to the server
which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;
creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
receiving in the server a specified investment related to each of at least one of the contributions, which specified investment represents an indication of at least one of: a receiving of the at least one of the contributions; or a receiving of a confirmation of a transaction made in relation to the at least one of the contributions; or a pre-specified action or transaction;
communicating from the server, to each of at least one of the contributor devices from which at least one of the contributions was received, at least one of the contribution options that associates the received at least one of the contributions with one of the entitlement options;
generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and
classifying in the server, as valuable product information, each of one or of a plurality of the content items identified by at least one of the subsets from at least one of the insight grouping;
detecting in the server, at least one contribution options that each associates one of the entitlement options with one of the contributions that describes one or a plurality of rated subsets which corresponds, according to the described data structure associations, to one or to a plurality of the subsets from one of the insight groupings;
receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met.

12. A method of operating an online collaborative content management system, using a data structure that enables developing and evaluating and marketing products based on derivative rights, the method using a server and user devices, which user devices each corresponds to a user of the method, the method comprising:
creating and storing, in the server, a data structure and data, which data structure describes associations of data records and associations of the data records with the data, which data includes content items and at least one derivative right that defines a conditional right, the data structure at least describing associations indicating:
a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
b) at least one grouping of at least one of the sets with their comprised subsets of data records, which groupings are each associated with one or more of the derivative rights,
c) at least one said conditional right comprising at least one specific right representing an entitlement related to and/or a permissible use of at least one of the content items once said at least one of the content items is classified as part of one or more valuable product information;
communicating from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receiving, in the server, responses from multiple user devices from the plurality of the user devices, and identifying in the server as contributions a plurality of the received responses,
- a) which received responses result from each of the multiple user devices receiving at least one of the description of a plurality of given sets of subsets of identified content items and using the received description of given sets to at least:
  - (i) offer to its user an arrangement of the content items reflecting the data structure associations of the received description of given sets of subsets,
  - (ii) associate at least one discriminating user rating with each of at least one of the subsets comprised in each of a plurality of the received description of given sets, each of the subsets associated with a rating representing a rated subset,
  - (iii) generate and communicate a response to the server, which generated response describes at least one of the rated subset with its associated user rating, based on the received description of given sets of subsets,
- b) which received responses are identified in the server as contributions by each at least describing one or a plurality of rated subsets that corresponds, according to the data structure in the server, to one or a plurality of the subsets comprised in one of the groupings, and which multiple user devices from which the contributions are received represent, in the method, contributor devices;

generating in the server at least one insight grouping, which insight groupings each represents a group of one or of a plurality of the subsets comprised in a given one of the groupings based on (i) the number of described rated subsets that are received in the contributions and that correspond, according to the data structure in the server, to one or a plurality of the subsets comprised in the given one of the groupings, and (ii) the ratings associated with the described rated subsets that are received, and classifying in the server, as said valuable product information, each of one or of a plurality of the content items identified by at least one of the subsets from at least one said insight grouping;

granting in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicating the granted derivative right to the given one of the contributor devices.

13. A system corresponding to an online collaborative content management system and operating with a data structure that enables developing and evaluating and marketing products based on derivative rights, comprising:

a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
- a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
- b) one entitled grouping, which entitled groupings each represents a grouping of at least one set from the sets, each entitled grouping being associated with at least one of the entitlement options; and
- c) at least one said conditional entitlement defined by at least one of the entitlement options comprising at least one specific right representing an entitlement related to and/or a permissible use of at least one of the content items once said at least one of the content items is classified as part of one or more valuable product information;

the system being configured to at least:

communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server,
- a) which received responses result from each user device from the multiple user devices receiving at least one of the descriptions of a plurality of given sets and using the described given sets to at least:
  - (i) offer to its user an arrangement of content items by using and conveying, in the arrangement, the data structure associations of the described given sets and of their subsets of identified content items, and
  - (ii) associate at least one discriminating user rating with at least one of the subsets comprised in each of a plurality of the described given sets,
    each of the subsets associated with a rating representing a rated subset, and
    each user rating being indicative of a comparative user evaluation of how well a given subset of identified content items relates to the desired outcome when compared to other subsets within the same described given set, and
    each user rating being indicative of at least a user selection or a user tagging of one of the rated subsets of identified content items, and
  - (iii) generate a response and communicate the generated response to the server
    which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;

create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicate from the server, to each of at least one of the contributor devices from which at least one of the contributions was received, at least one of the contribution options that associates the received at least one of the contributions with one of the entitlement options;

generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and classify in the server, as said valuable product information, each of one or of a plurality of the content items identified by at least one of the subsets from at least one of the insight groupings;

detect in the server at least one contribution options that each associates one of the entitlement options with one of the contributions that describes one or a plurality of rated subsets which corresponds, according to the described data structure associations, to one or to a plurality of the subsets from one of the insight grouping;

receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met;

provide access to and/or to allow uploading and/or to allow using, in at least one of the user devices or in a third party device, said at least one of the content items classified as part of the valuable product information according to said at least one specific right, after one or more said grant of one of the entitlement options defining said conditional entitlement that comprises said at least one specific right.

14. A system corresponding to an online collaborative content management system and operating with a data structure that enables developing and evaluating and marketing products based on derivative rights, comprising:

a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and b) one entitled grouping, which entitled groupings each represents a grouping of at least one set from the sets, each entitled grouping being associated with at least one of the entitlement options;

the system being configured to at least:

communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server, a) which received responses result from each user device from the multiple user devices receiving at least one of the descriptions of a plurality of given sets and using the described given sets to at least:
(i) offer to its user an arrangement of content items by using and conveying, in the arrangement, the data structure associations of the described given sets and of their subsets of identified content items, and
(ii) associate at least one discriminating user rating with at least one of the subsets comprised in each of a plurality of the described given sets,
each of the subsets associated with a rating representing a rated subset, and
each user rating being indicative of a comparative user evaluation of how well a given subset of identified content items relates to the desired outcome when compared to other subsets within the same described given set, and
each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;

create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicate from the server, to each of at least one of the contributor devices from which at least one of the contributions was received, at least one of the contribution options that associates the received at least one of the contributions with one of the entitlement options;

generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and classify in the server, as valuable product information, each of one or of a plurality of the content items identified by at least one of the subsets from at least one of the insight groupings;

detect in the server at least one contribution options that each associates one of the entitlement options with one of the contributions that describes one or a plurality of rated subsets which corresponds, according to the described data structure associations, to one or to a plurality of the subsets from one of the insight grouping;

receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met;

communicate-one or more content items classified as part of the valuable product information to at least one device including at least one of the user devices and/or at least one production device and/or a manufacturing device, as an input to the production of a usable product or product feature.

15. A system corresponding to an online collaborative content management system and operating with a data structure that enables developing and evaluating and marketing products based on derivative rights, comprising:

a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:

a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and b) one entitled grouping, which entitled groupings each represents a grouping of at least one set from the sets, each entitled grouping being associated with at least one of the entitlement options;

the system being configured to at least:

communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;

receive, in the server, responses from multiple user devices from the plurality of the user devices, and identify in the server as contributions a plurality of the received responses, and store the contributions in the server, a) which received responses result from each user device from the multiple user devices receiving at least one of the descriptions of a plurality of given sets and using the described given sets to at least:
(i) offer to its user an arrangement of content items by using and conveying, in the arrangement, the data structure associations of the described given sets and of their subsets of identified content items, and
(ii) associate at least one discriminating user rating with at least one of the subsets comprised in each of a plurality of the described given sets,
each of the subsets associated with a rating representing a rated subset, and
each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and
(iii) generate a response and communicate the generated response to the server
which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;
create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
communicate from the server, to each of at least one of the contributor devices from which at least one of the contributions was received, at least one of the contribution options that associates the received at least one of the contributions with one of the entitlement options;
generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and
classify in the server, as valuable product information, each of one or of a plurality of the content items identified by at least one of the subsets from at least one of the insight groupings;
detect in the server at least one contribution options that each associates one of the entitlement options with one of the contributions that describes one or a plurality of rated subsets which corresponds, according to the described data structure associations, to one or to a plurality of the subsets from one of the insight grouping;
receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met, at least one said granting condition being based on the ratings associated with one or more of the rated subsets defined in the one of the contributions that is associated with the given one of the entitlement option in the one of the contribution options.

16. A system corresponding to an online collaborative content management system and operating with a data structure that enables developing and evaluating and marketing products based on derivative rights, comprising:
a server, and user devices, which user devices each corresponds to a user of the system, the server containing a data structure and data, which data structure describes associations of data records and of the data contained in the server, which data includes a defined desired outcome and content items and at least one entitlement option, which entitlement options each defines a conditional entitlement, said described associations indicating at least:
a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
b) one entitled grouping, which entitled groupings each represents a grouping of at least one set from the sets, each entitled grouping being associated with at least one of the entitlement options;
the system being configured to at least:
modify in the server, the data structure by changing the described data structure associations of at least one of the data records, and/or by adding at least one entitled grouping to the described data structure associations, and/or by adding at least one data record to the described data structure associations and adding at least one content item each being identified by one of the added data records, and/or by changing in the described data structure associations at least one of the content items identified by at least one of the data records, and/or by adding to the described data structure associations at least one entitlement option and associating it with at least one of the entitled groupings, and/or by removing and/or by changing in the described data structure associations at least one of the entitlement options, while respecting said at least described associations indication, said modifying is triggered in the server by a reception, from one or more of the user devices, of at least one content item and/or of modifying instructions;
communicate, from the server to each user device from a plurality of the user devices, the defined desired outcome and at least one description of a plurality of given sets from the sets from the described data structure associations and of the subsets of data records comprised in the given sets, which subsets of data records identify content items, at least one of the given sets from each of the descriptions corresponding to at least one of the sets comprised in at least one of the entitled groupings;
receive, in the server, responses from multiple user devices from the plurality of the user devices, and identify in the server as contributions a plurality of the received responses, and store the contributions in the server,
a) which received responses result from each user device from the multiple user devices receiving at least one of the descriptions of a plurality of given sets and using the described given sets to at least:
   (i) offer to its user an arrangement of content items by using and conveying, in the arrangement, the data structure associations of the described given sets and of their subsets of identified content items, and
   (ii) associate at least one discriminating user rating with at least one of the subsets comprised in each of a plurality of the described given sets,
      each of the subsets associated with a rating representing a rated subset, and
      each user rating being indicative of a comparative user evaluation of how well a given subset of identified content items relates to the desired outcome when compared to other subsets within the same described given set, and
      each user rating being indicative of at least a user selection or a user tagging of one of the rated subsets of identified content items, and
   (iii) generate a response and communicate the generated response to the server
      which generated response describes at least one of the rated subsets with its associated rating based on the received descriptions of given sets,
b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the system;
create in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;
communicate from the server, to each of at least one of the contributor devices from which at least one of the contributions was received, at least one of the contribution options that associates the received at least one of the contributions with one of the entitlement options;
generate in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled grouping and (ii) the ratings associated with each of the described rated subsets that were received, and
classify in the server, as valuable product information, each of one or of a plurality of the content items identified by at least one of the subsets from at least one of the insight groupings;
detect in the server at least one contribution options that each associates one of the entitlement options with one of the contributions that describes one or a plurality of rated subsets which corresponds, according to the described data structure associations, to one or to a plurality of the subsets from one of the insight grouping;
receive in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;
grant in the server the given one of the entitlement options by validating that the given one of the entitlement options was previously detected in the server, and communicate said grant to the given one of the user devices, said grant and said communicate being executed: (i) without restriction, or (ii) after one or more granting conditions are detected, in the server, to have been met.

17. A method of operating an online collaborative content management system, using a data structure that enables developing and evaluating and marketing products based on derivative rights, the method using a server and user devices, which user devices each corresponds to a user of the method, the method comprising:
creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
   a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
   b) one entitled grouping, which entitled grouping each represents a grouping of at least one set from the sets, each entitled grouping being associated with at least one of the entitlement options; and
   c) at least one said conditional entitlement defined by at least one of the entitlement options comprising at least one specific right representing an entitlement related to and/or a permissible use of at least one of the content items once said at least one of the content items is classified as part of one or more valuable product information;
communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server,
- a) which received responses result from each user device from the multiple user devices receiving at least one of the descriptions of a plurality of the given sets and using the described given sets to at least:
  - (i) offer to its user an arrangement of content items by using and conveying, in the arrangement, the data structure associations of the described given sets and of their subsets of identified content items, and
  - (ii) associate at least one discriminating user rating with at least one of the subsets comprised in each of a plurality of the described given sets,
    - each of the subsets associated with a rating representing a rated subset, and
    - each user rating being indicative of a comparative user evaluation of how well a given subset of identified content items relates to the desired outcome when compared to other subsets within the same described given set, and
    - each user rating being indicative of at least a user selection or a user tagging of one of the rated subsets of identified content items, and
  - (iii) generate a response and communicate the generated response to the server
    - which generated response describes at least one of the rated subsets with its associated rating based on the received descriptions of given sets,
- b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as said valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met;

providing access to and/or allowing uploading and/or allowing using, in at least one of the user devices or in a third party device, said at least one of the content items classified as part of the valuable product information, according to said at least one specific right, after one or more said granting of one of the entitlement options defining said conditional entitlement that comprises said at least one specific right.

18. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
- a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
- b) one entitled grouping, which entitled grouping each represents a grouping of at least one set from the sets, each entitled grouping being associated with at least one of the entitlement options;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server,
 a) which received responses result from each user device from the multiple user devices receiving at least one of the descriptions of a plurality of the given sets and using the described given sets to at least:
  (i) offer to its user an arrangement of content items by using and conveying, in the arrangement, the data structure associations of the described given sets and of their subsets of identified content items, and
  (ii) associate at least one discriminating user rating with at least one of the subsets comprised in each of a plurality of the described given sets,
   each of the subsets associated with a rating representing a rated subset, and
   each user rating being indicative of a comparative user evaluation of how well a given subset of identified content items relates to the desired outcome when compared to other subsets within the same described given set, and
   each user rating being indicative of at least a user selection or a user tagging of one of the rated subsets of identified content items, and
  (iii) generate a response and communicate the generated response to the server
   which generated response describes at least one of the rated subsets with its associated rating based on the received descriptions of given sets,
 b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met;

communicating one or more content items classified as part of the valuable product information, to at least one device including at least one of the user devices and/or at least one production device and/or a manufacturing device, as an input to the production of a usable product or product feature.

19. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
 a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
 b) one entitled grouping, which entitled grouping each represents a grouping of at least one set from the sets, each entitled grouping being associated with at least one of the entitlement options;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server, a) which received responses result from each user device from the multiple user devices receiving at least one of the descriptions of a plurality of the given sets and using the described given sets to at least:
  (i) offer to its user an arrangement of content items by using and conveying, in the arrangement, the data structure associations of the described given sets and of their subsets of identified content items, and
  (ii) associate at least one discriminating user rating with at least one of the subsets comprised in each of a plurality of the described given sets,
    each of the subsets associated with a rating representing a rated subset, and
    each user rating being indicative of a comparative user evaluation of how well a given subset of identified content items relates to the desired outcome when compared to other subsets within the same described given set, and
    each user rating being indicative of at least a user selection or a user tagging of one of the rated subsets of identified content items, and
  (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met, at least one said granting condition being based on the ratings associated with one or more of the rated subsets defined in the one of the contributions that is as associated with the given one of the entitlement option in the one of the contribution options.

20. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and of the data in the server, which data includes a defined desired outcome and content items and at least one entitlement option, which entitlement options each defines a conditional entitlement, said described associations indicating at least:
  a) a plurality of sets of data records, which data records in each of the sets are grouped into a plurality of comprised subsets of data records, which subsets each comprises at least one data record, which data records from the subsets each identifies a content item by containing a content item or by being otherwise associated to a content item, and consequently each of the subsets identifying at least one content item; and
  b) one entitled grouping, which entitled grouping each represents a grouping of at least one set from the sets, each entitled grouping being associated with at least one of the entitlement options;

modifying in the server the data structure by changing the described data structure associations of at least one of the data records, and/or by adding at least one entitled grouping to the described data structure associations, and/or by adding at least one data record to the described data structure associations and adding at least one content item each being identified by one of the added data records, and/or by changing in the described data structure associations at least one of the content items identified by at least one of the data records, and/or by adding to the described data structure associations at least one entitlement option and associating it in the described data structure associations with at least one of the entitled groupings, and/or by changing and/or by removing in the described data structure associations at least one of the entitlement options, while respecting said at least described associations indication, said modifying is triggered in the server by a reception, from one or more of the user devices, of at least one content item and/or of modifying instructions;

communicating from the server to each user device from a plurality of the user devices, the defined desired outcome and at least one description of a plurality of given sets from the sets from the described data structure associations and of subsets of data records comprised in the given sets, which subsets of data records identify content items, at least one of the given sets from each of the descriptions corresponding to at least one of the sets comprised in at least one of the entitled groupings;

receiving, in the server, responses from multiple user devices from the plurality of the user devices, and identifying in the server as contributions a plurality of the received responses, and storing the contributions in the server, a) which received responses result from each user device from the multiple user devices receiving at least one of the descriptions of a plurality of the given sets and using the described given sets to at least:

(i) offer to its user an arrangement of content items by using and conveying, in the arrangement, the data structure associations of the described given sets and of their subsets of identified content items, and (ii) associate at least one discriminating user rating with at least one of the subsets comprised in each of a plurality of the described given sets, each of the subsets associated with a rating representing a rated subset, and each user rating being indicative of a comparative user evaluation of how well a given subset of identified content items relates to the desired outcome when compared to other subsets within the same described given set, and each user rating being indicative of at least a user selection or a user tagging of one of the rated subsets of identified content items, and (iii) generate a response and communicate the generated response to the server which generated response describes at least one of the rated subsets with its associated rating based on the received descriptions of given sets, b) which responses are identified in the server as contributions by each at least describing one or a plurality of rated subsets that corresponds, according to the described data structure associations, to one or a plurality of the subsets comprised in one of the entitled groupings, and which user devices, from which the responses identified as contributions were received, each represents a contributor device of the method;

creating in the server one or more contribution options, which contribution options each defines an association between a given one of the contributions and one of the entitlement options associated with one of the entitled groupings that comprises, according to the described data structure associations, one or a plurality of subsets which corresponds to the one or a plurality of the rated subsets described in the given one of the contributions;

communicating from the server, to each of at least one of the contributor devices from which at least one of the contributions was received, at least one of the contribution options that associates the received at least one of the contributions with one of the entitlement options;

generating in the server at least one insight grouping, which insight groupings each represents a grouping of one or of a plurality of the subsets comprised in a given one of the entitled groupings based on (i) the number of described rated subsets that were received in the contributions and that correspond, according to the described data structure associations, to the one or plurality of the subsets comprised in the given one of the entitled groupings and (ii) the ratings associated with each of the described rated subsets that were received, and classifying in the server, as valuable product information, each of one or of a plurality of the content items identified by at least one of the subsets from at least one of the insight grouping;

detecting in the server, at least one contribution options that each associates one of the entitlement options with one of the contributions that describes one or a plurality of rated subsets which corresponds, according to the described data structure associations, to one or to a plurality of the subsets from one of the insight groupings;

receiving in the server, from a given one of the user devices, a request for granting a given one of the entitlement options that is associated with one of the contributions defined in one of the contribution option communicated to a given one of the contributor devices, which request is indicative that the given one of the user devices was previously communicated, from the server or from the given one of the contributor devices, the one of the contribution options;

granting in the server the given one of the entitlement options by validating that the given one of the entitlement options was previously detected in the server, and communicating said granting to the given one of the user devices, said granting and said communicating being executed: (i) without restriction, or (ii) after one or more granting conditions are detected, in the server, to have been met.

21. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:
  a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item;
  b) at least one grouping of at least one of the sets with their comprised subsets of data records, which groupings are each associated with one or more of the derivative rights;
  c) at least one said conditional right comprising at least one specific right representing an entitlement related to and/or a permissible use of at least one of the content items once said at least one of the content items is classified as part of one or more valuable product information;

the system being configured to at least:
communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;
receive, in the server, responses from multiple user devices from the plurality of the user devices, and identify in the server as contributions a plurality of the received responses,
  a) which received responses result from each of the multiple user devices receiving at least one of the descriptions of a plurality of given sets of subsets of identified content items and using the received description of given sets to at least:
    (i) offer to its user an arrangement of the content items reflecting the data structure associations of the received description of given sets of subsets,
    (ii) associate at least one discriminating user rating with each of at least one of the subsets comprised in each of a plurality of the received description of given sets, each of the subsets associated with a rating representing a rated subset,
    (iii) generate and communicate a response to the server, which generated response describes at least one of the rated subset based on the received description of given sets of subsets,
  b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;
generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as said valuable product information, each of one or of a plurality of the content items identified by at least one of the subsets from at least one said insight grouping;
grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices;
provide access to and/or to allow uploading and/or to allow using, in at least one of the user devices or in a third party device, said at least one of the content items classified as part of the valuable product information, according to said at least one specific right, after one or more said grant of one of the derivative rights that comprises said at least one specific right.

22. An online collaborative content management system operating with a data structure that enables developing and evaluating and marketing products based on derivative rights, comprising:
a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:
  a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
  b) at least one grouping of at least one of the sets with their comprised subsets of data records, which groupings are each associated with one or more of the derivative rights;

the system being configured to at least:
communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;
receive, in the server, responses from multiple user devices from the plurality of the user devices, and identify in the server as contributions a plurality of the received responses,
  a) which received responses result from each of the multiple user devices receiving at least one of the descriptions of a plurality of given sets of subsets of identified content items and using the received description of given sets to at least:
    (i) offer to its user an arrangement of the content items reflecting the data structure associations of the received description of given sets of subsets,
    (ii) associate at least one discriminating user rating with each of at least one of the subsets comprised in each of a plurality of the received description of given sets, each of the subsets associated with a rating representing a rated subset,
(iii) generate and communicate a response to the server, which generated response describes at least one of the rated subset based on the received description of given sets of subsets,
b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition and at least one said granting condition, additional to the first granting condition, have been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and the at least one additional granting condition being based on the ratings associated with one or more of the rated subsets defined in the one of the contributions received by the given one of the contributor devices, and communicate the granted derivative right to the given one of the contributor devices.

23. A method of operating an online collaborative content management system, using a data structure that enables developing and evaluating and marketing products based on derivative rights, the method using a server and user devices, which user devices each corresponds to a user of the method, the method comprising:
creating and storing, in the server, a data structure and data, which data structure describes associations of data records and associations of the data records with the data, which data includes content items and at least one derivative right that defines a conditional right, the data structure at least describing associations indicating:
a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
b) at least one grouping of at least one of the sets with their comprised subsets of data records, which groupings are each associated with one or more of the derivative rights,
c) at least one said conditional right comprising at least one specific right representing an entitlement related to and/or a permissible use of at least one of the content items once said at least one of the content items is classified as part of one or more valuable product information;

communicating from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receiving, in the server, responses from multiple user devices from the plurality of the user devices, and identifying in the server as contributions a plurality of the received responses,
a) which received responses result from each of the multiple user devices receiving at least one of the description of a plurality of given sets of subsets of identified content items and using the received description of given sets to at least:
(i) offer to its user an arrangement of the content items reflecting the data structure associations of the received description of given sets of subsets,
(ii) associate at least one discriminating user rating with each of at least one of the subsets comprised in each of a plurality of the received description of given sets, each of the subsets associated with a rating representing a rated subset,
(iii) generate and communicate a response to the server, which generated response describes at least one of the rated subset with its associated user rating, based on the received description of given sets of subsets,
b) which received responses are identified in the server as contributions by each at least describing one or a plurality of rated subsets that corresponds, according to the data structure in the server, to one or a plurality of the subsets comprised in one of the groupings, and which multiple user devices from which the contributions are received represent, in the method, contributor devices;

generating in the server at least one insight grouping, which insight groupings each represents a group of one or of a plurality of the subsets comprised in a given one of the groupings based on (i) the number of described rated subsets that are received in the contributions and that correspond, according to the data structure in the server, to one or a plurality of the subsets comprised in the given one of the groupings, and (ii) the ratings associated with the described rated subsets that are received, and classifying in the server, as said valuable product information, each of one or of a plurality of the content items identified by at least one of the subsets from at least one said insight grouping, granting in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicating the granted derivative right to the given one of the contributor devices;

providing access to and/or allowing uploading and/or allowing using, in at least one of the user devices or in a third party device, said at least one of the content items classified as part of the valuable product information, according to said at least one specific right, after one or more said granting of one of the derivative rights that comprises said at least one specific right.

24. A method of operating an online collaborative content management system, using a data structure that enables developing and evaluating and marketing products based on derivative rights, the method using a server and user devices, which user devices each corresponds to a user of the method, the method comprising:

creating and storing, in the server, a data structure and data, which data structure describes associations of data records and associations of the data records with the data, which data includes content items and at least one derivative right that defines a conditional right, the data structure at least describing associations indicating:
  a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
  b) at least one grouping of at least one of the sets with their comprised subsets of data records, which groupings are each associated with one or more of the derivative rights;

communicating from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receiving, in the server, responses from multiple user devices from the plurality of the user devices, and identifying in the server as contributions a plurality of the received responses,
  a) which received responses result from each of the multiple user devices receiving at least one of the description of a plurality of given sets of subsets of identified content items and using the received description of given sets to at least:
    (i) offer to its user an arrangement of the content items reflecting the data structure associations of the received description of given sets of subsets,
    (ii) associate at least one discriminating user rating with each of at least one of the subsets comprised in each of a plurality of the received description of given sets, each of the subsets associated with a rating representing a rated subset,
    (iii) generate and communicate a response to the server, which generated response describes at least one of the rated subset with its associated user rating, based on the received description of given sets of subsets,
  b) which received responses are identified in the server as contributions by each at least describing one or a plurality of rated subsets that corresponds, according to the data structure in the server, to one or a plurality of the subsets comprised in one of the groupings, and which multiple user devices from which the contributions are received represent, in the method, contributor devices;

generating in the server at least one insight grouping, which insight groupings each represents a group of one or of a plurality of the subsets comprised in a given one of the groupings based on (i) the number of described rated subsets that are received in the contributions and that correspond, according to the data structure in the server, to one or a plurality of the subsets comprised in the given one of the groupings, and (ii) the ratings associated with the described rated subsets that are received, and classifying in the server, as valuable product information, each of one or of a plurality of the content items identified by at least one of the subsets from at least one said insight grouping;

granting in the server a given one of the derivative rights based on detecting that at least a first granting condition and at least one said granting condition, additional to the first granting condition, have been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and the at least one said granting condition being based on the ratings associated with one or more of the rated subsets defined in the one of the contributions received by the given one of the contributor devices, and communicating the granted derivative right to the given one of the contributor devices.

25. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:
  a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
  b) at least one grouping of at least one of the sets with their comprised subsets of data records, which groupings are each associated with one or more of the derivative rights;

the system being configured to at least:
modify in the server, the data structure by changing the data structure associations of at least one of the data records, and/or by adding at least one grouping to the data structure, and/or by adding at least one data record to the data structure and adding at least one content item each being identified by one of the added data records, and/or by changing in the data structure at least one of the content items identified by at least one of the data records, and/or by adding to the data structure at least one derivative rights and associating it in the data structure with at least one of the groupings, and/or by removing and/or by changing in the data structure at least one of the derivative rights, while respecting said at least described associations;

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses, a) which received responses result from each of the multiple user devices receiving at least one of the descriptions of a plurality of given sets of subsets of identified content items and using the received description of given sets to at least:

(i) offer to its user an arrangement of the content items reflecting the data structure associations of the received description of given sets of subsets, (ii) associate at least one discriminating user rating with each of at least one of the subsets comprised in each of a plurality of the received description of given sets, each of the subsets associated with a rating representing a rated subset, (iii) generate and communicate a response to the server, which generated response describes at least one of the rated subset based on the received description of given sets of subsets, b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices.

26. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:

a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item, b) at least one grouping of at least one of the sets with their comprised subsets of data records, which groupings are each associated with one or more of the derivative rights, c) a plurality of the content items and/or elements of the data structure, including one or more of the sets and/or a plurality of the subsets of data records, comprising and/or being made up and/or being associated using, structuring, dynamic and/or hypertext type code that describes the data structure associations and configure user devices for offering of an arrangement and associating user ratings and generating of responses;

the system being configured to at least:

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses, a) which received responses result from each of the multiple user devices receiving at least one of the descriptions of a plurality of given sets of subsets of identified content items and using the received description of given sets to at least:

(i) perform said offering to its user of an arrangement of the content items reflecting the data structure associations of the received description of given sets of subsets, (ii) perform said associating of at least one discriminating said user rating with each of at least one of the subsets comprised in each of a plurality of the received description of given sets, each of the subsets associated with a rating representing a rated subset, (iii) perform said generating responses and communicate the responses to the server, which generated response describes at least one of the rated subset based on the received description of given sets of subsets, b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices.

27. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:

a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item, b) at least one grouping of at least one of the sets with their comprised subsets of data records, which groupings are each associated with one or more of the derivative rights;

the system being configured to at least:

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses, a) which received responses result from each of the multiple user devices receiving at least one of the descriptions of a plurality of given sets of subsets of identified content items and using the received description of given sets to at least:
   (i) offer to its user an arrangement of the content items reflecting the data structure associations of the received description of given sets of subsets,
   (ii) associate at least one discriminating user rating with each of at least one of the subsets comprised in each of a plurality of the received description of given sets, each of the subsets associated with a rating representing a rated subset,
   (iii) generate and communicate a response to the server, which generated response describes at least one of the rated subset based on the received description of given sets of subsets, b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices;

collect in the server, from a plurality of the user devices, a plurality of granting authorizations, said collecting of a plurality of granting authorizations representing a granting condition, additional to the at least first granting condition, that must also be detected to have been met prior to said grant.

28. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:
a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
b) at least one grouping of at least one of the sets with their comprised subsets of data records, which groupings are each associated with one or more of the derivative rights;

the system being configured to at least:

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses,
a) which received responses result from each of the multiple user devices receiving at least one of the descriptions of a plurality of given sets of subsets of identified content items and using the received description of given sets to at least:
   (i) offer to its user an arrangement of the content items reflecting the data structure associations of the received description of given sets of subsets,
   (ii) associate at least one discriminating user rating with each of at least one of the subsets comprised in each of a plurality of the received description of given sets, each of the subsets associated with a rating representing a rated subset,
   (iii) generate and communicate a response to the server, which generated response describes at least one of the rated subset based on the received description of given sets of subsets,
b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

receive in the server a specified investment related to each of at least one of the contributions, which specified investment represents an indication of at least one of: a receiving of the at least one of the contributions; or a receiving of a confirmation of a transaction made in relation to the at least one of the contributions; or a pre-specified action or transaction;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices.

29. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:
a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item,
b) at least one grouping of at least one of the sets with their comprised subsets of data records, which groupings are each associated with one or more of the derivative rights;

the system being configured to at least:

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses,
a) which received responses result from each of the multiple user devices receiving at least one of the descriptions of a plurality of given sets of subsets of identified content items and using the received description of given sets to at least:
   (i) offer to its user an arrangement of the content items reflecting the data structure associations of the received description of given sets of subsets,
   (ii) associate at least one discriminating user rating with each of at least one of the subsets comprised in each of a plurality of the received description of given sets, each of the subsets associated with a rating representing a rated subset, (iii) generate and communicate a response to the server, which generated response describes at least one of the rated subset based on the received description of given sets of subsets, b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices;

communicate one or more content items, classified as part of the valuable product information, to at least one of the user devices, and/or to at least one third party device including at least one of the user devices and/or at least one production device and/or a manufacturing device, as an input to the production of a usable product or product feature.

30. An online collaborative content management system operating with a data structure that enables developing and evaluating and marketing products based on derivative rights, comprising:

a server and user devices, which user devices each corresponds to a user of the system, the server containing a data structure and data, which data structure describes associations of data records and associations of the data records with the data, which data includes content items and at least one derivative right that defines a conditional right, the data structure at least describing associations indicating:

a) a plurality of sets of data records, which data records in each of the sets are grouped into a plurality of comprised subsets of data records, which subsets each comprises at least one data record that each identifies a content item by containing or by being otherwise associated to a content item, hence which subsets each identifies at least one content item, b) at least one grouping of at least one of the sets with their comprised subsets of data records, which groupings are each associated with one or more of the derivative rights;

the system being configured to at least:

modify in the server, the data structure by changing the data structure associations of at least one of the data records, and/or by adding at least one grouping to the data structure, and/or by adding at least one data record to the data structure and adding at least one content item each being identified by one of the added data records, and/or by changing in the data structure at least one of the content items identified by at least one of the data records, and/or by adding to the data structure at least one derivative rights and associating it in the data structure with at least one of the groupings, and/or by removing and/or by changing in the data structure at least one of the derivative rights, while respecting said at least described associations, said modifying is triggered in the server by a reception, from one or more of the user devices, of at least one content item and/or of at least one information referring to at least one of content item;

communicate from the server to each of a plurality of the user devices at least one description of a plurality of given sets of subsets of data records from the sets from the data structure, which subsets of data records identify content items, at least one of the given sets from each of the descriptions corresponding to at least one of the sets comprised in at least one of the groupings;

receive, in the server, responses from multiple user devices from the plurality of the user devices, and identify in the server as contributions a plurality of the received responses, a) which received responses result from each of the multiple user devices receiving at least one of the descriptions of a plurality of given sets of subsets of identified content items and using the received description of given sets to at least:

(i) offer to its user an arrangement of the content items reflecting the data structure associations of the received description of given sets of subsets, (ii) associate at least one discriminating user rating with each of at least one of the subsets comprised in each of a plurality of the received description of given sets, each of the subsets associated with a rating representing a rated subset, (iii) generate and communicate a response to the server, which generated response describes at least one of the rated subset based on the received description of given sets of subsets, b) which responses are identified in the server as contributions by each at least describing one or a plurality of rated subsets that corresponds, according to the data structure, to one or a plurality of the subsets comprised in one of the groupings, and which multiple user devices from which the contributions are received represent, in the system, contributor devices;

generate in the server at least one insight grouping, which insight groupings each represents a group of one or of a plurality of the subsets comprised in a given one of the groupings based on (i) the number of described rated subsets that are received in the contributions and that correspond, according to the data structure, to one or a plurality of the subsets comprised in the given one of the groupings, and (ii) the ratings associated with the described rated subsets that are received, and classify in the server, as valuable product information, each of one or of a plurality of the content items identified by at least one of the subsets from at least one said insight grouping;

grant in the server a given one of the derivative rights based on detecting that at least a first granting condition has been met, which first granting condition is met when the given one of the derivative rights is associated with one of the groupings that comprises one or a plurality of subsets which correspond (i) to one or a plurality of the rated subsets defined in one of the contributions received by a given one of the contributor devices, and (ii) to one or a plurality of the subsets from one or a plurality of said insight groupings, and communicate the granted derivative right to the given one of the contributor devices.

* * * * *